(12) United States Patent
Okamoto et al.

(10) Patent No.: US 7,043,102 B2
(45) Date of Patent: May 9, 2006

(54) OPTICAL FIBER INTERFEROSENSOR, SIGNAL-PROCESSING SYSTEM FOR OPTICAL FIBER INTERFEROSENSOR AND RECORDING MEDIUM

(75) Inventors: Koji Okamoto, Kawagoe (JP); Koji Hirose, Chofu (JP)

(73) Assignee: Kyowa Electronic Instruments Co., Ltd., Tokyo (JP)

( * ) Notice: Subject to any disclaimer, the term of this patent is extended or adjusted under 35 U.S.C. 154(b) by 452 days.

(21) Appl. No.: 09/955,155

(22) Filed: Sep. 19, 2001

(65) Prior Publication Data
US 2003/0039428 A1  Feb. 27, 2003

(30) Foreign Application Priority Data
Sep. 20, 2000 (JP) .................................. 2000-284624

(51) Int. Cl.
*G02B 6/00* (2006.01)

(52) U.S. Cl. ............................................. 385/12

(58) Field of Classification Search ................ 385/10, 385/11, 12, 18, 90–94
See application file for complete search history.

(56) References Cited

U.S. PATENT DOCUMENTS

| | | | |
|---|---|---|---|
| 6,539,136 B1 * | 3/2003 | Dianov et al. ................ 385/12 |
| 6,647,160 B1 * | 11/2003 | Chi et al. ..................... 385/12 |
| 6,647,161 B1 * | 11/2003 | Hodge ......................... 385/12 |
| 6,701,032 B1 * | 3/2004 | Freeman et al. .............. 385/12 |

* cited by examiner

*Primary Examiner*—Khiem Nguyen
(74) *Attorney, Agent, or Firm*—Venable, LLP; Andrew C. Aitken

(57) ABSTRACT

A low coherence light of wide range is fed into a Fabry-Perot load cell having a measured clearance varied in response to physical quantities such as force and pressure or the like to modulate its wavelength. The measured clearance is calculated by the variable gap Fabry-Perot interferometer and the signal processing part in the optical sensor and further the physical quantities are measured.

17 Claims, 61 Drawing Sheets

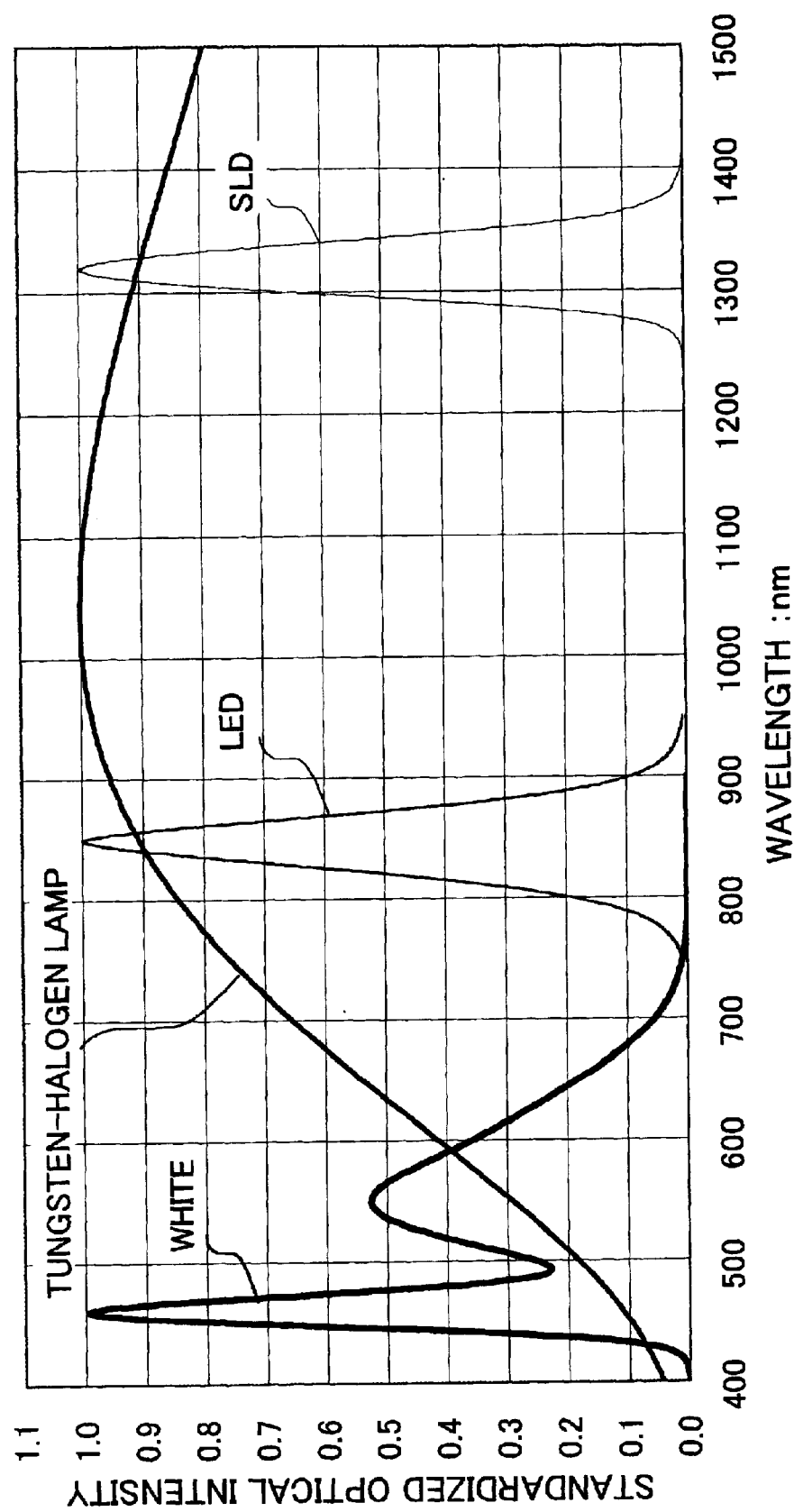

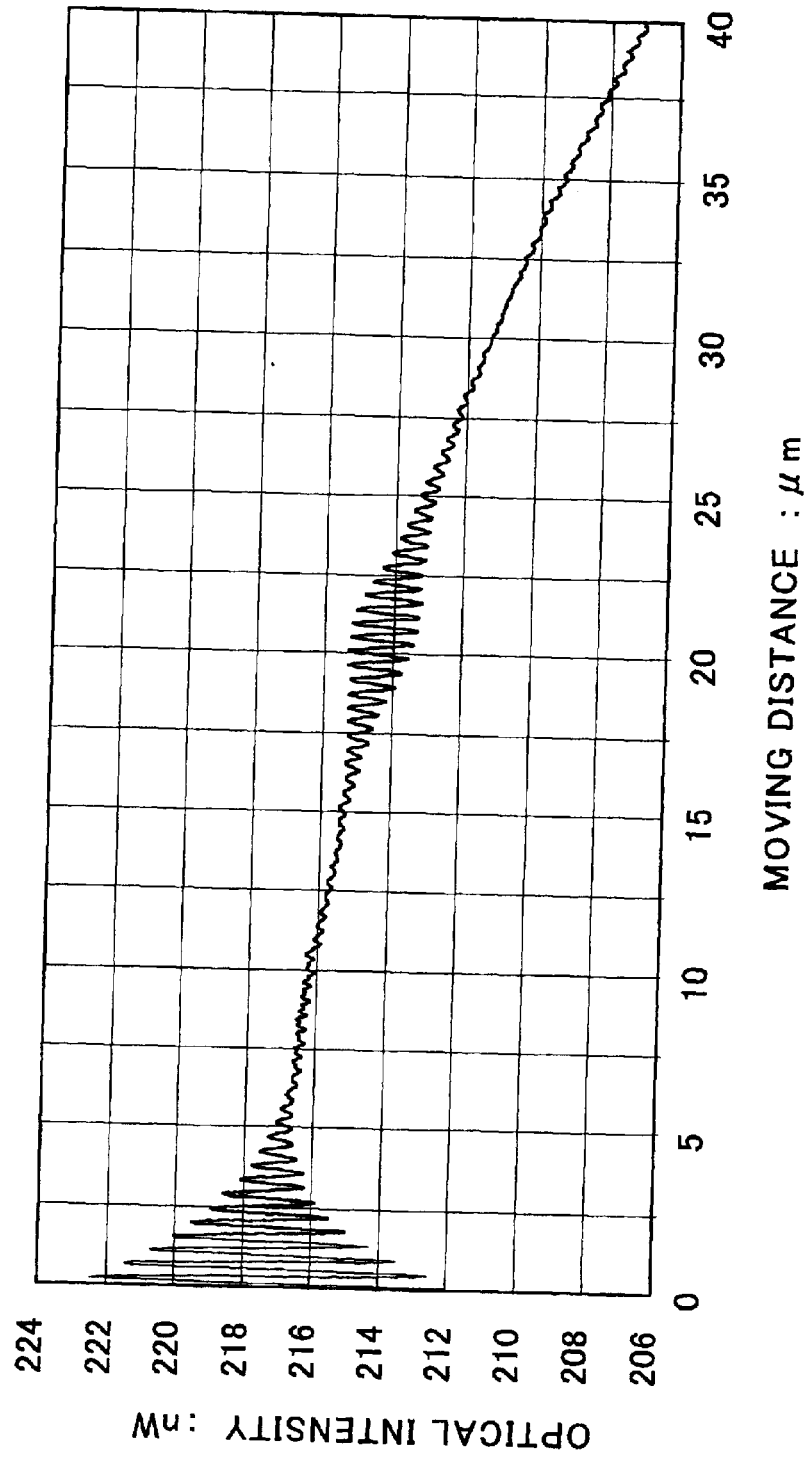

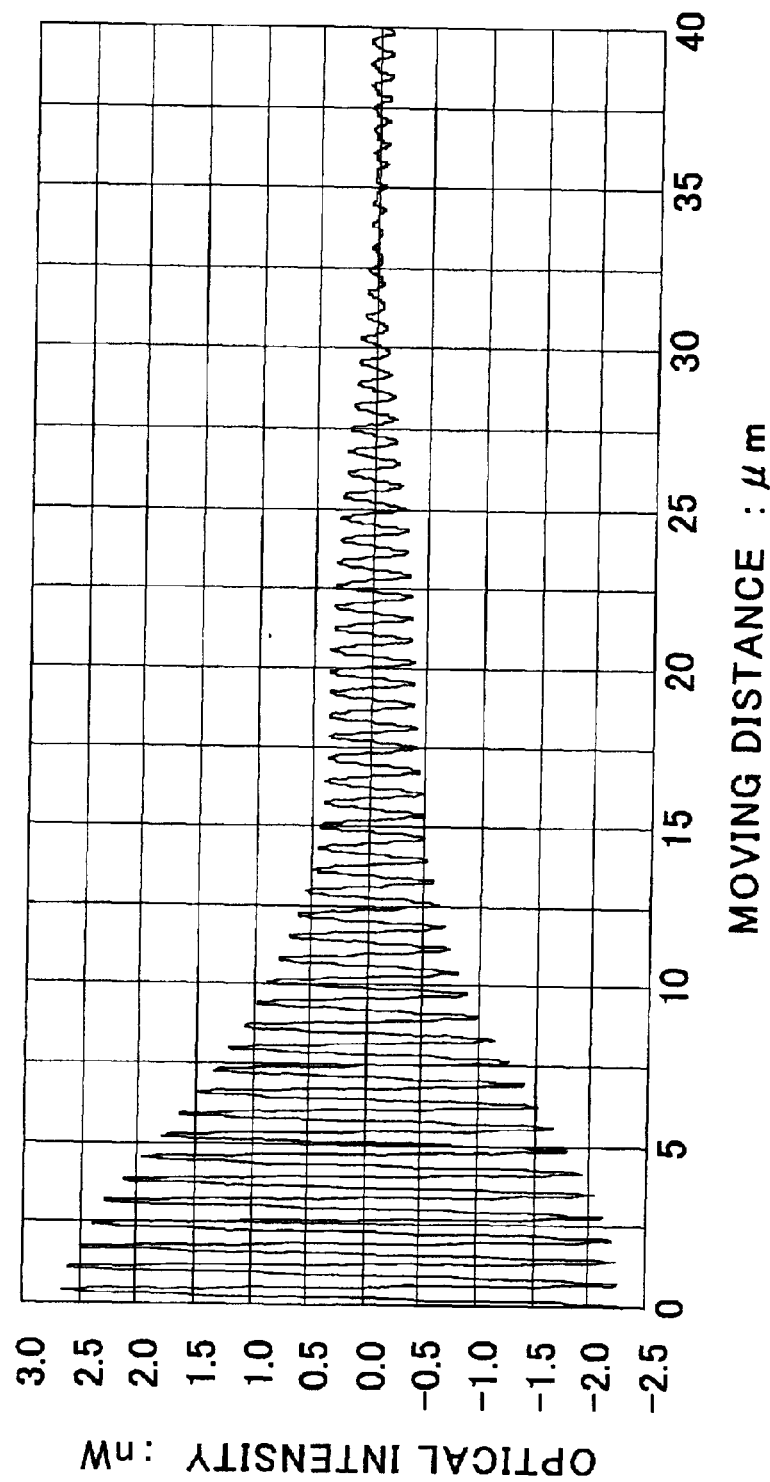

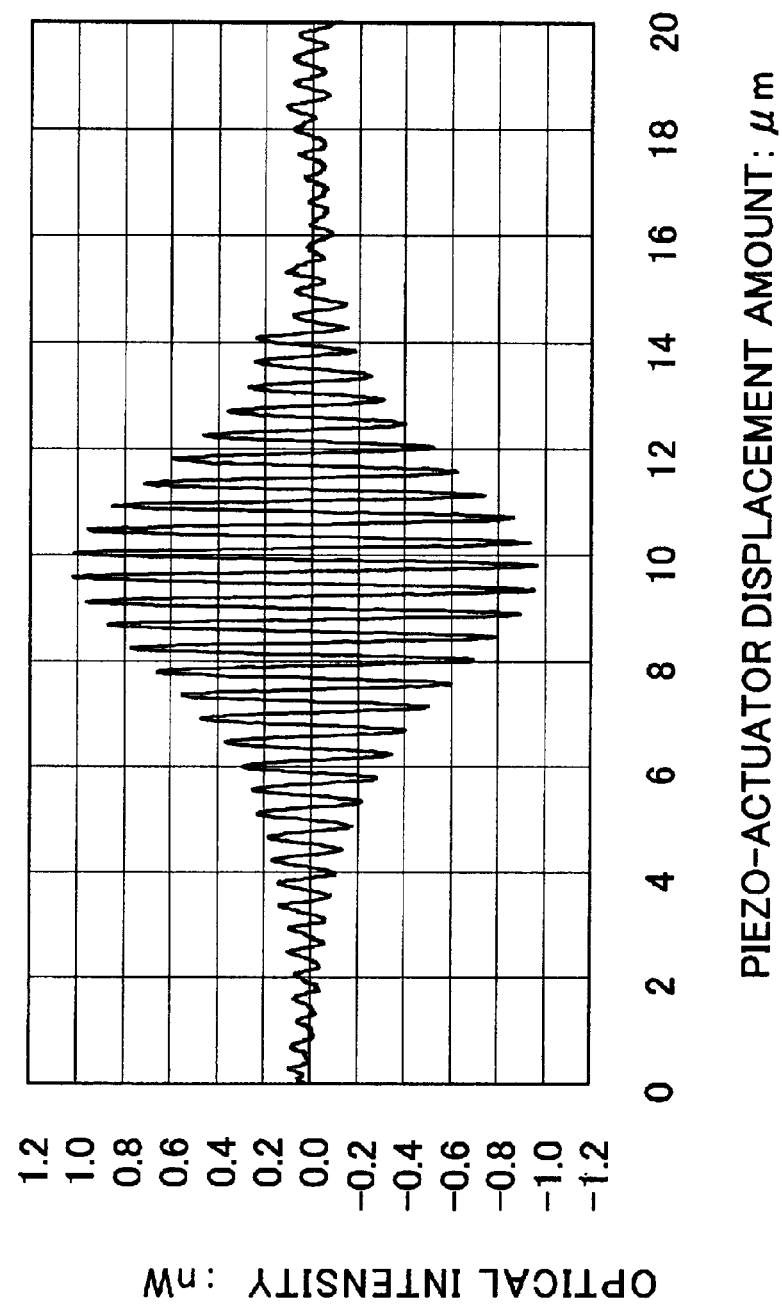

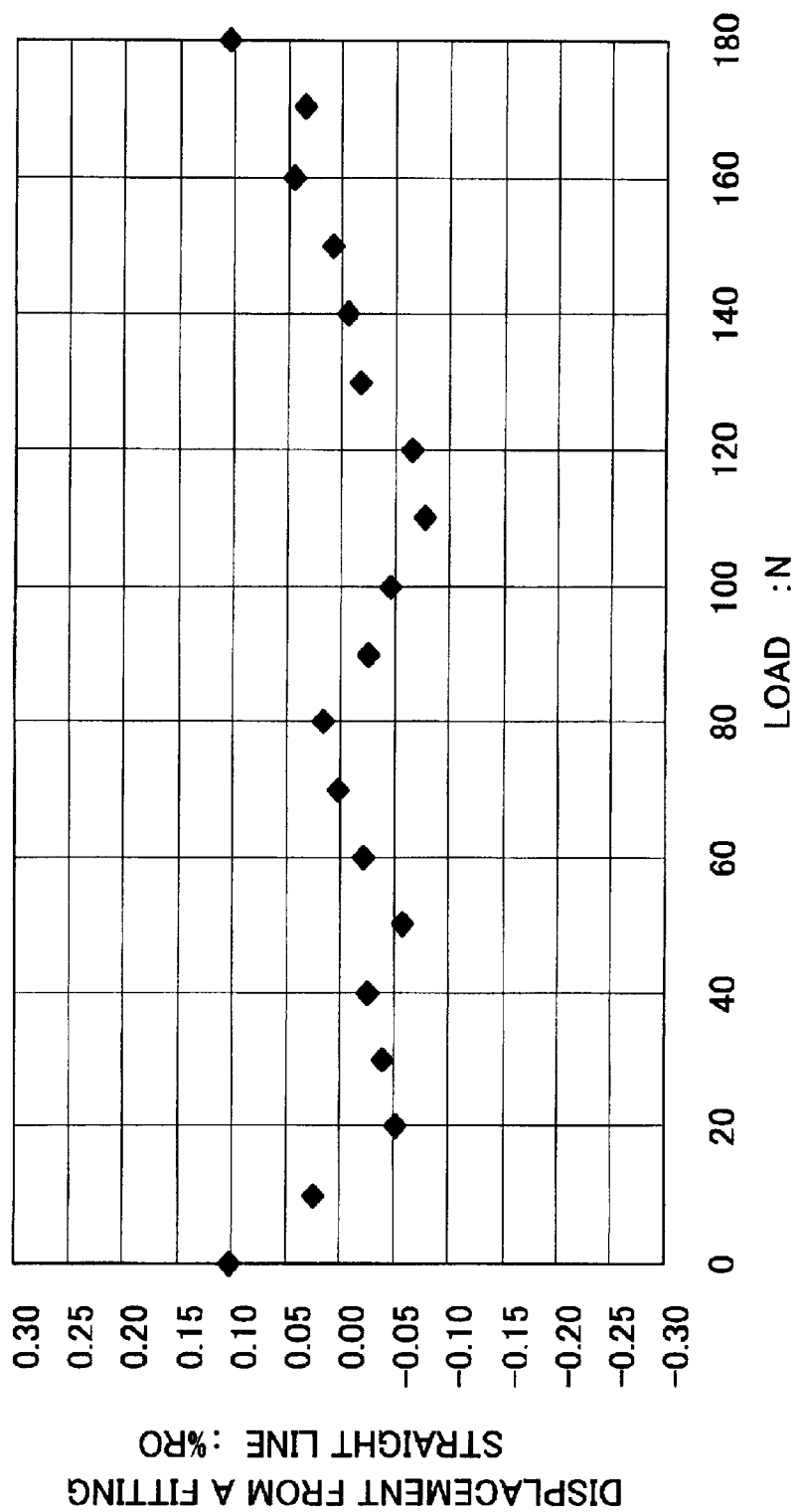

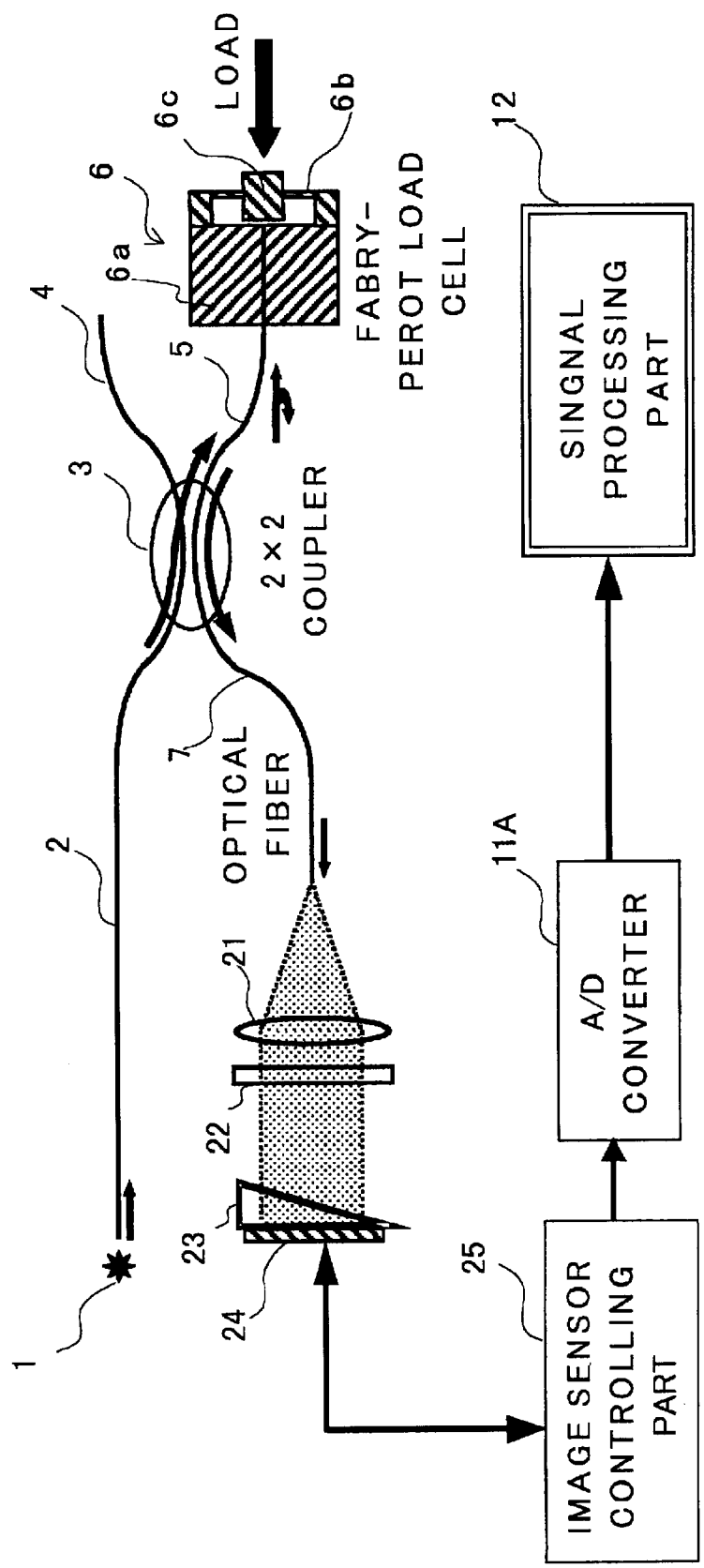

FIG.12

OUTPUT OF CCD TIME-SERIES SIGNAL
$S_{SIG}(n)$

⟨S1⟩ EXTRACTION OF OPTICAL CROSS-CORRELATION SIGNAL
$S_{SIG}(n) \Rightarrow S_{LCOR}(n)$
$S_{LCOR}(n) = S_{SIG}(n) - K \cdot S_{BACK}(n)$ ⟨S2⟩ LPF PROCESSING
$S_{LCOR}(n) \Rightarrow S_{LCOR, LPF}(n)$ ⟨S3⟩ ELIMINATION OF LOW FREQUENCY COMPONENT WITH MINIMUM SQUARE FITTING
$S_{LCOR, LPF}(n) \Rightarrow S_{DC}(n)$ ⟨S4⟩ 90° PHASE SHIFT OF WAVEEFORM BY HIRBERT TRANSFORM
$S_{DC}(n) \Rightarrow S_{90}(n)$
$S_{90}(n) = \hat{H}[S_{DC}(n)]$ ⟨S5⟩ CALCULATION OF AN ENVELOPE (1)
$S_{DC}(n), S_{90}(n) \Rightarrow S_{ENV}(n)$
$S_{ENV}(n) = \sqrt{S_{DC}(n)^2 + S_{90}(n)^2}$ ⟨S6⟩ CALCULATION OF AN ENVELOPE(2) (LPE PROCESSING)
$S_{ENV}(n) \Rightarrow S_{ENV, LPF}(n)$ ⟨S7⟩ CALCULATION OF PEAK POSITION (1) (SMOOTHING DIFFERENTIAL)
$S_{ENV, LPF}(n) \Rightarrow dS_{ENV, LPF}(n)/dn$ ⟨S8⟩ CALCULATION OF PEAK POSITION (2) (CALCULATION OF A ZERO POINT POSITION)
$dS_{ENV, LPF}(X)/dS(X) = 0 \Rightarrow X_{PEAK}$

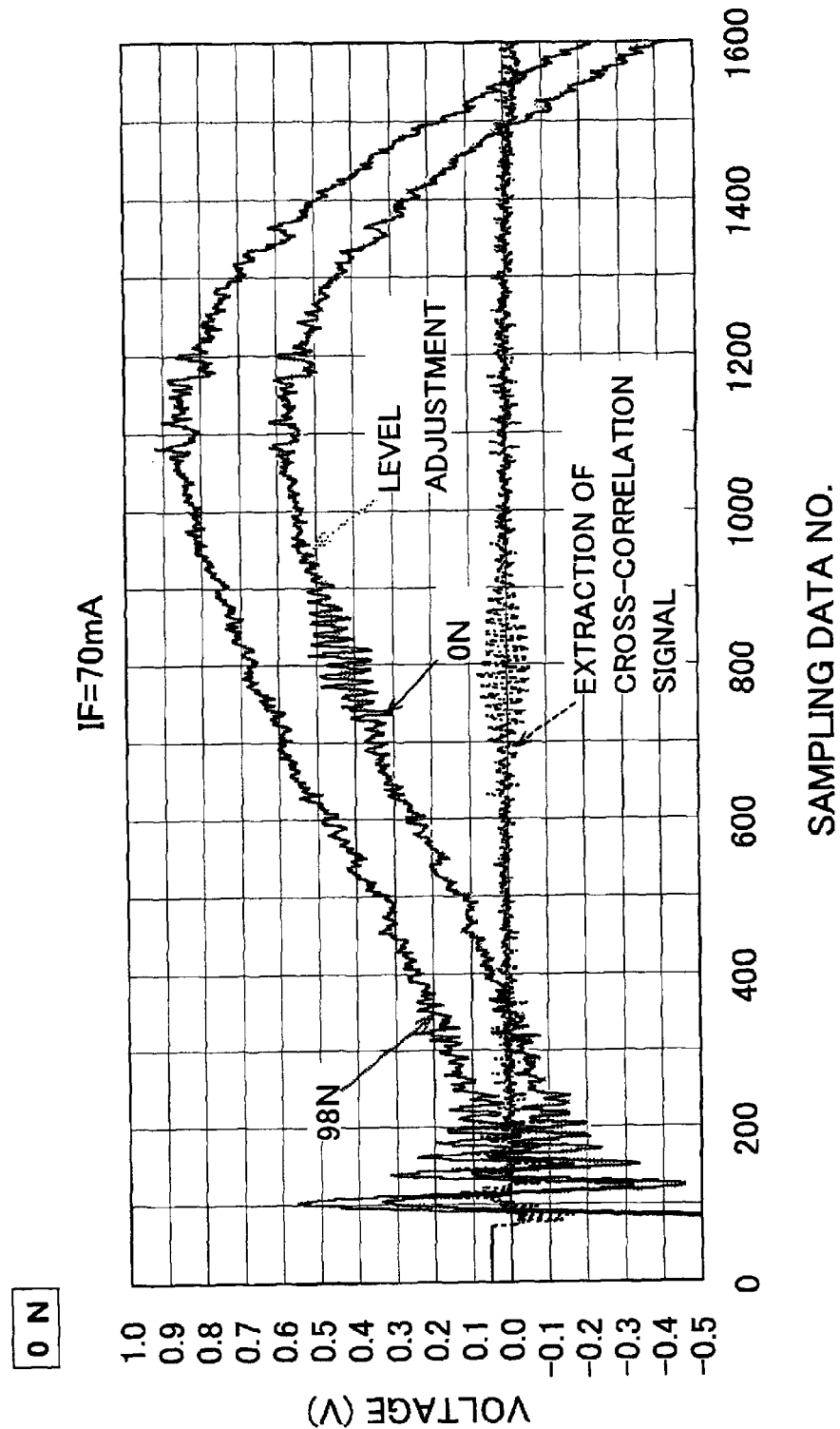

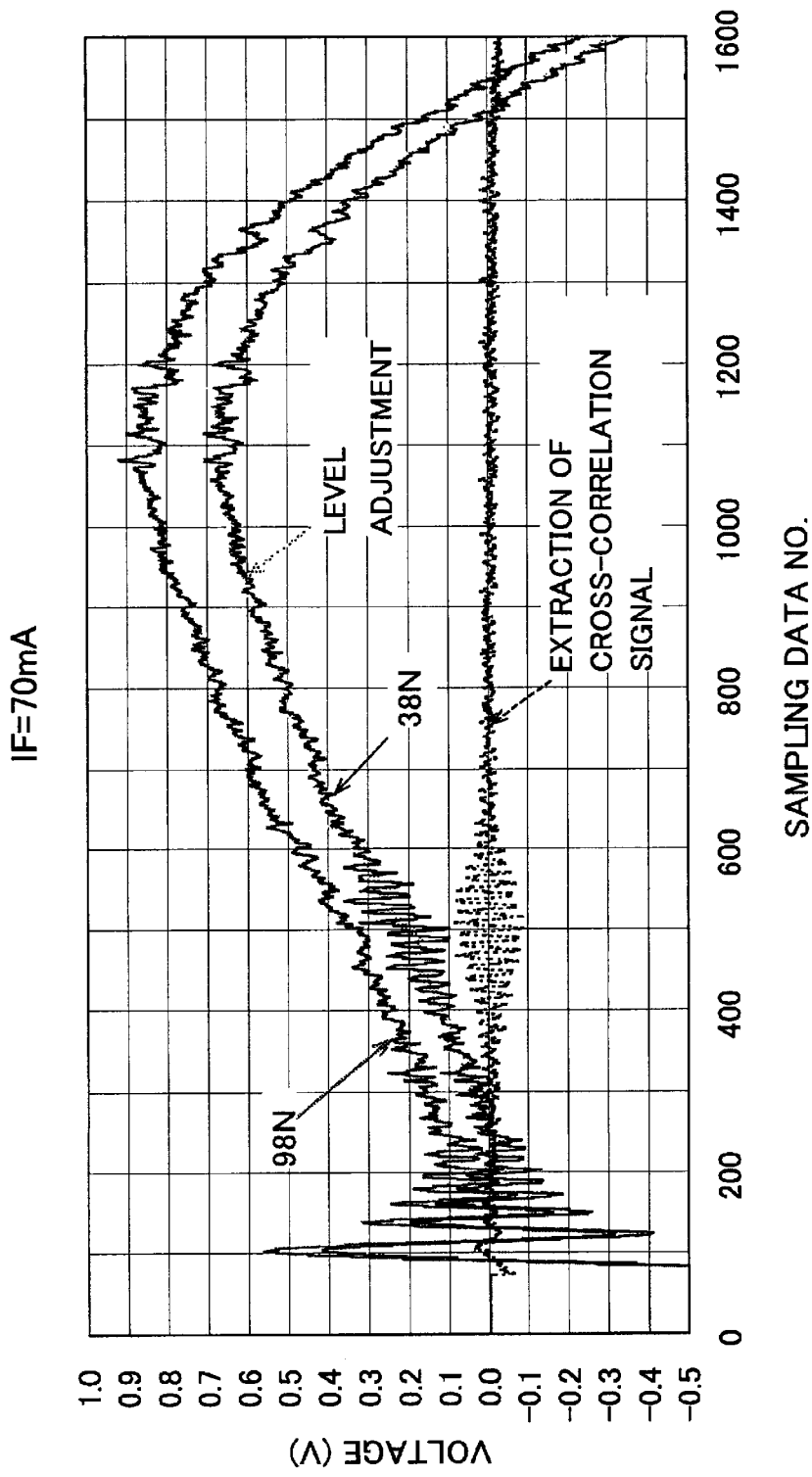

DETECTION OF OPTICAL CROSS-CORRELATION SIGNAL WITH CCD LINEAR IMAGE SENSOR $\overline{S_{LCOR,LPF}^{(n)}}$ AFTER CORRECTION BY A BIASING VALUE    LPF :IF=70 mA

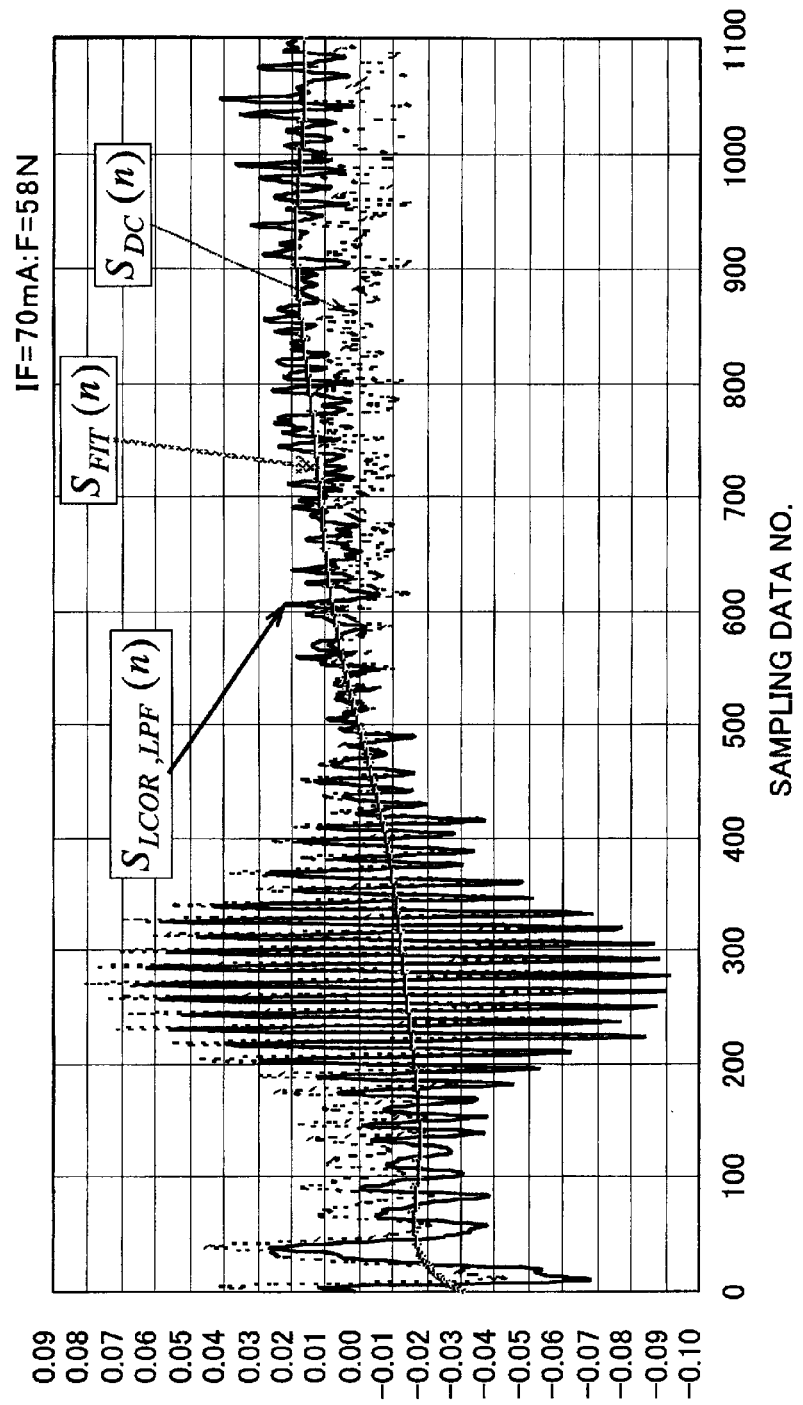
FIG. 20A ANALYSIS OF WHITE INTERFERENCE MEASURED DATA WITH CCD LINEAR IMAGE SENSOR

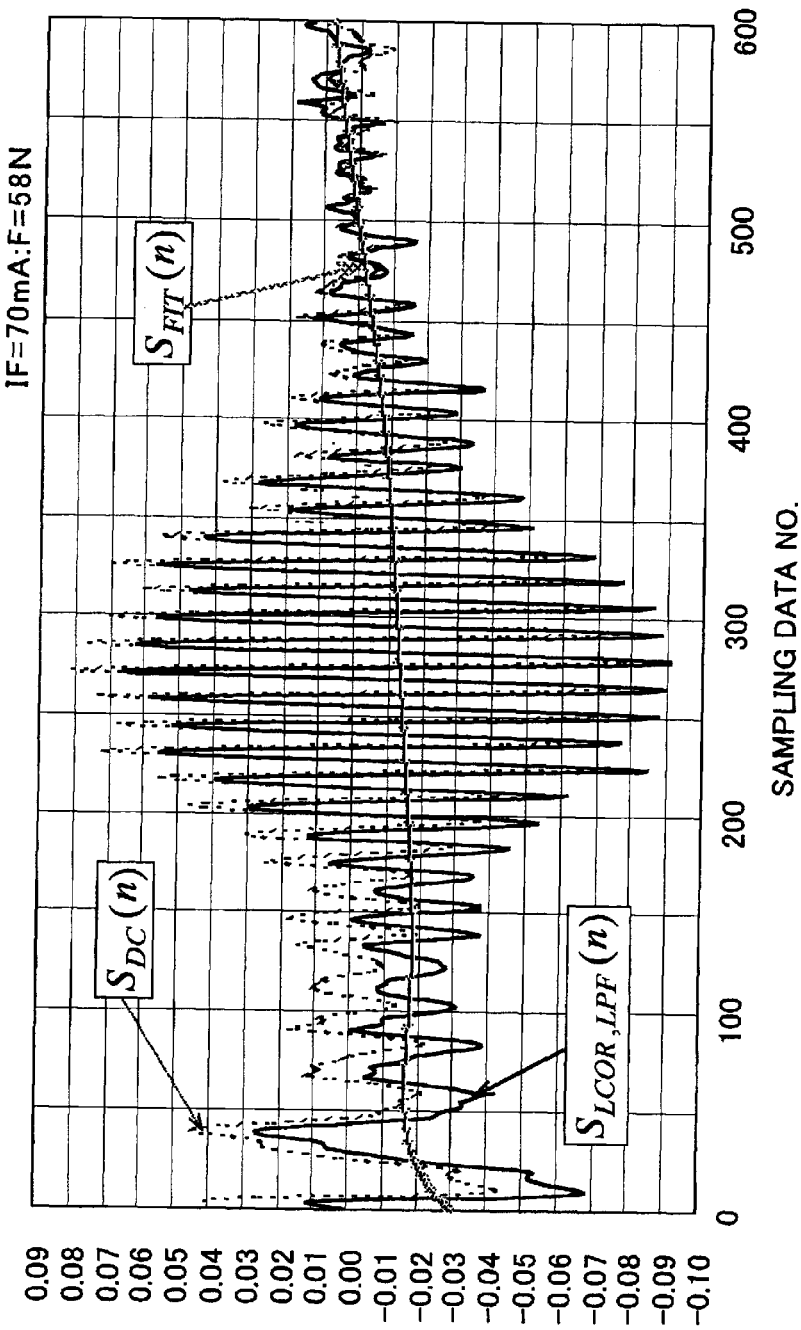

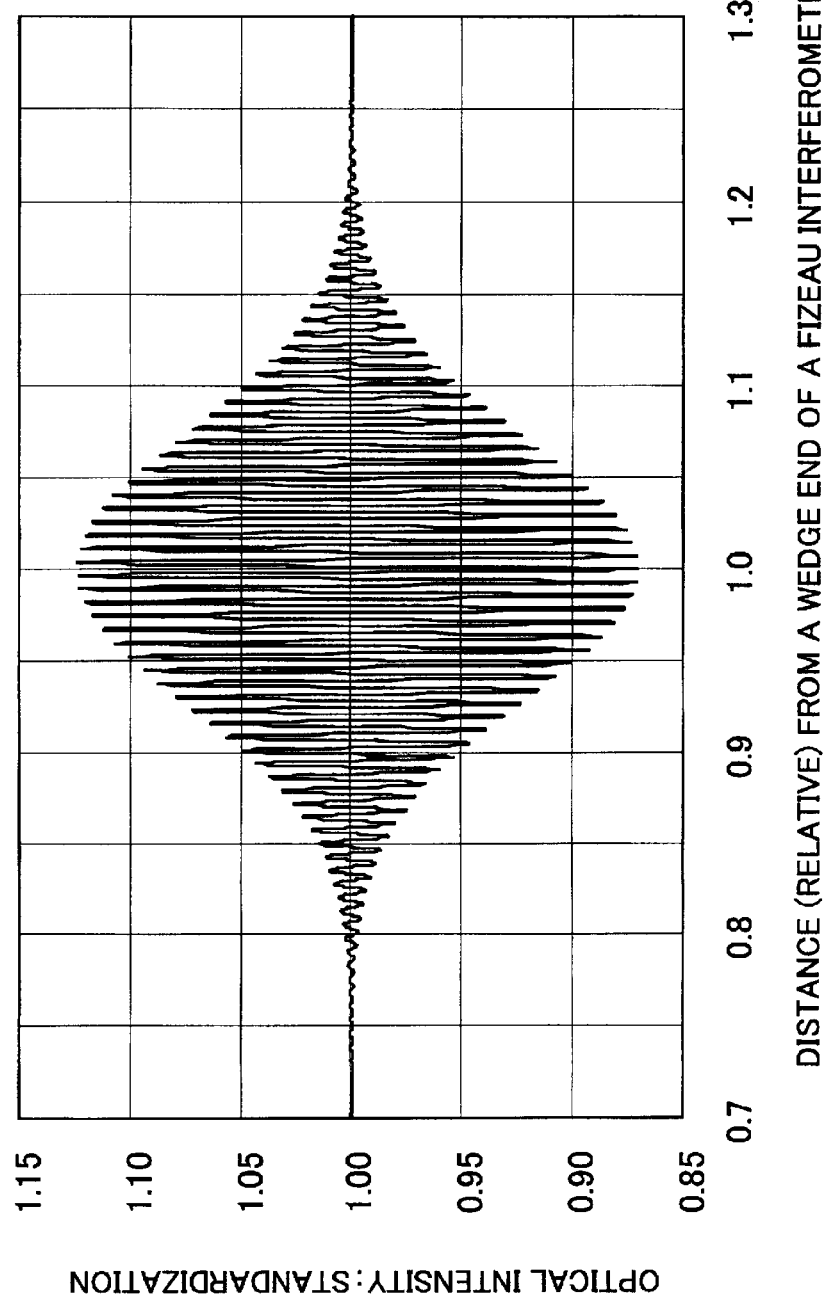

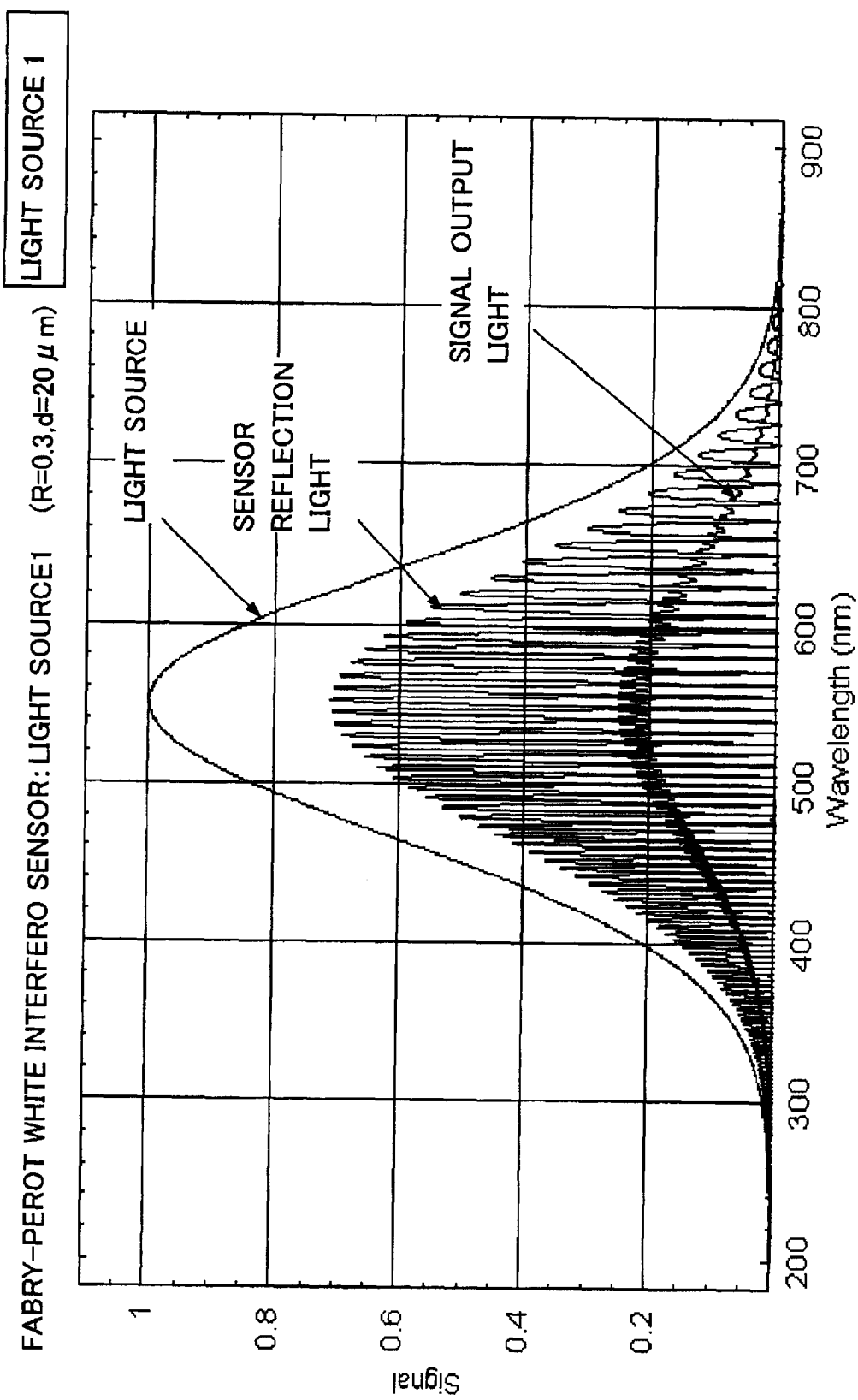

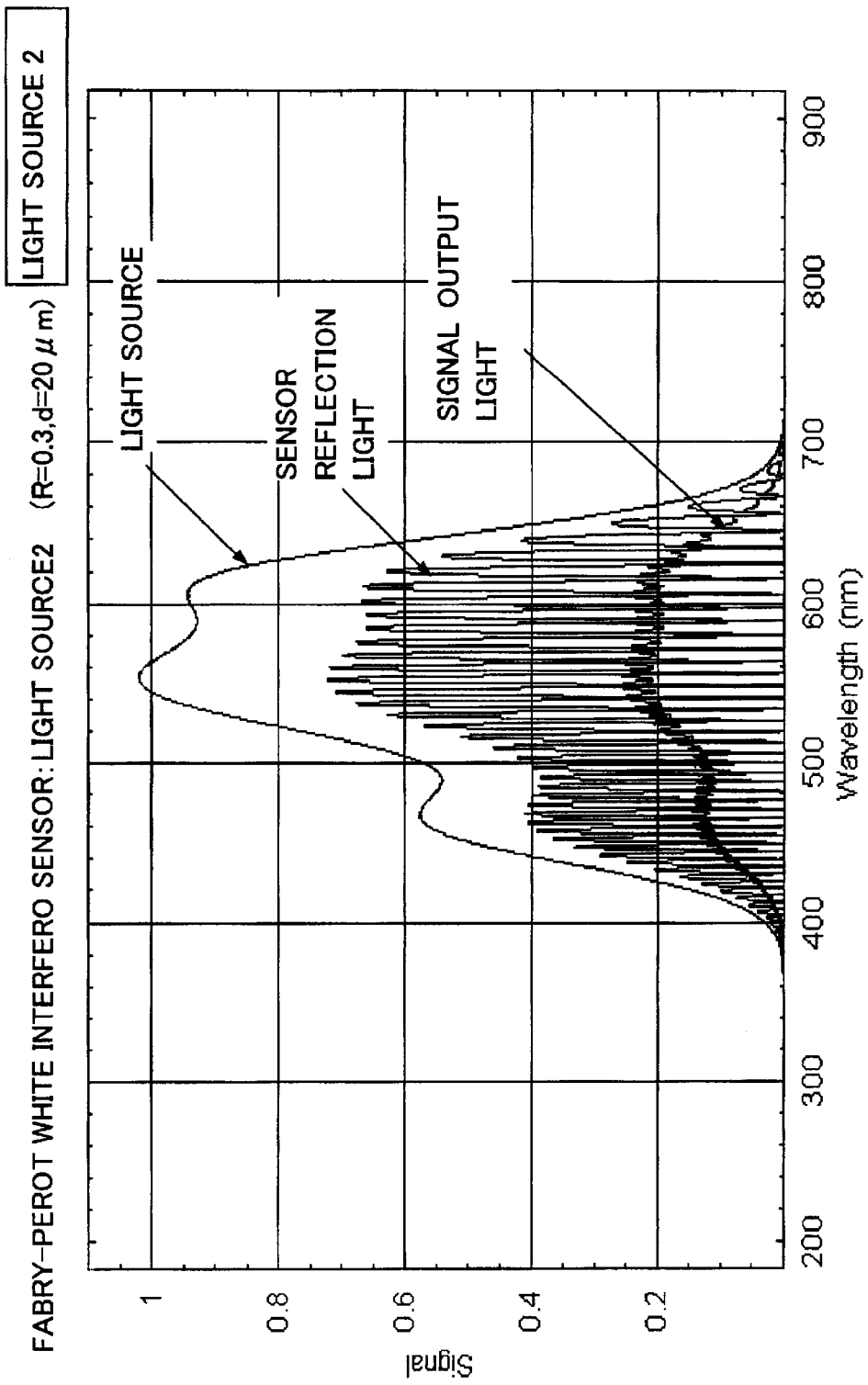

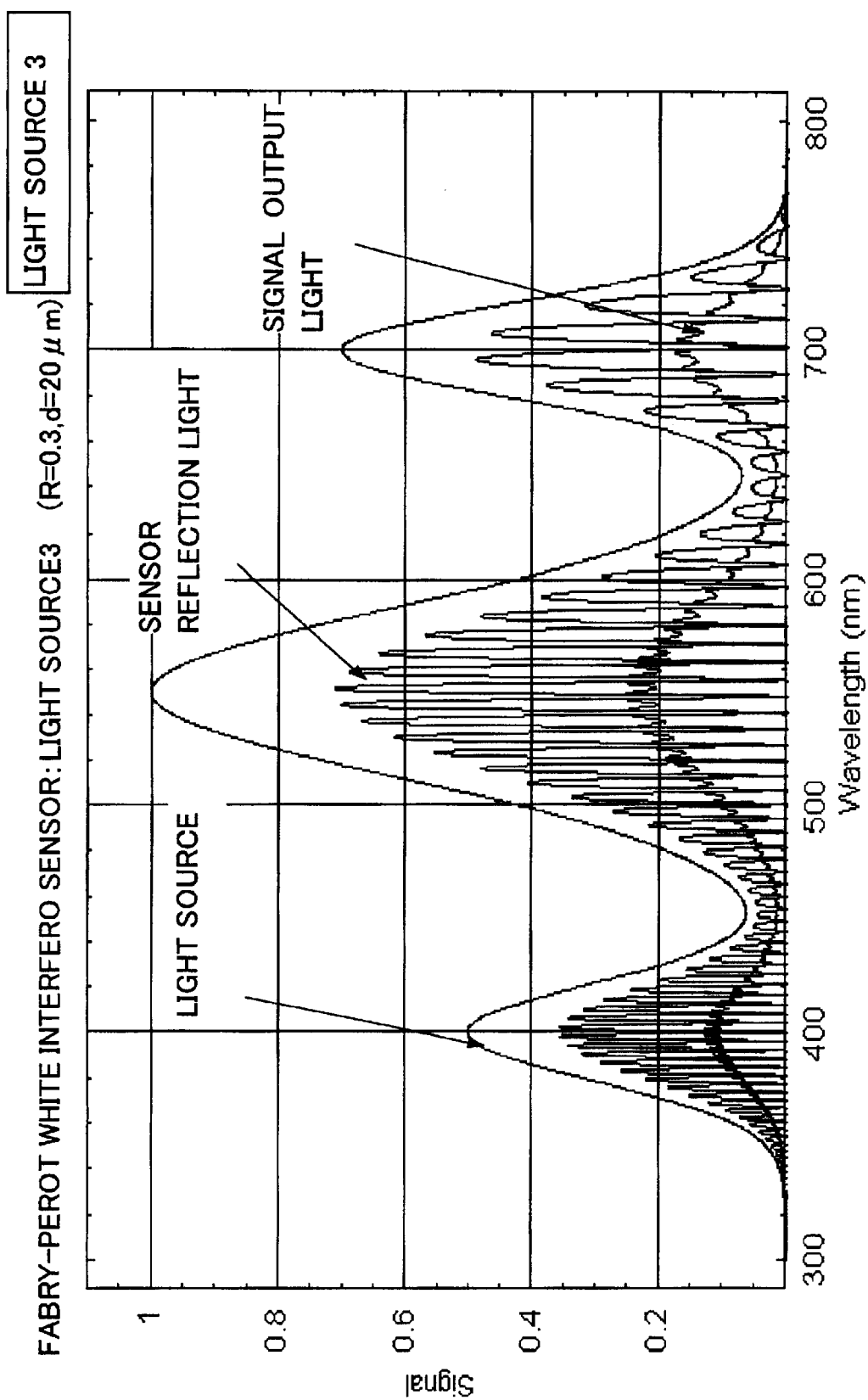

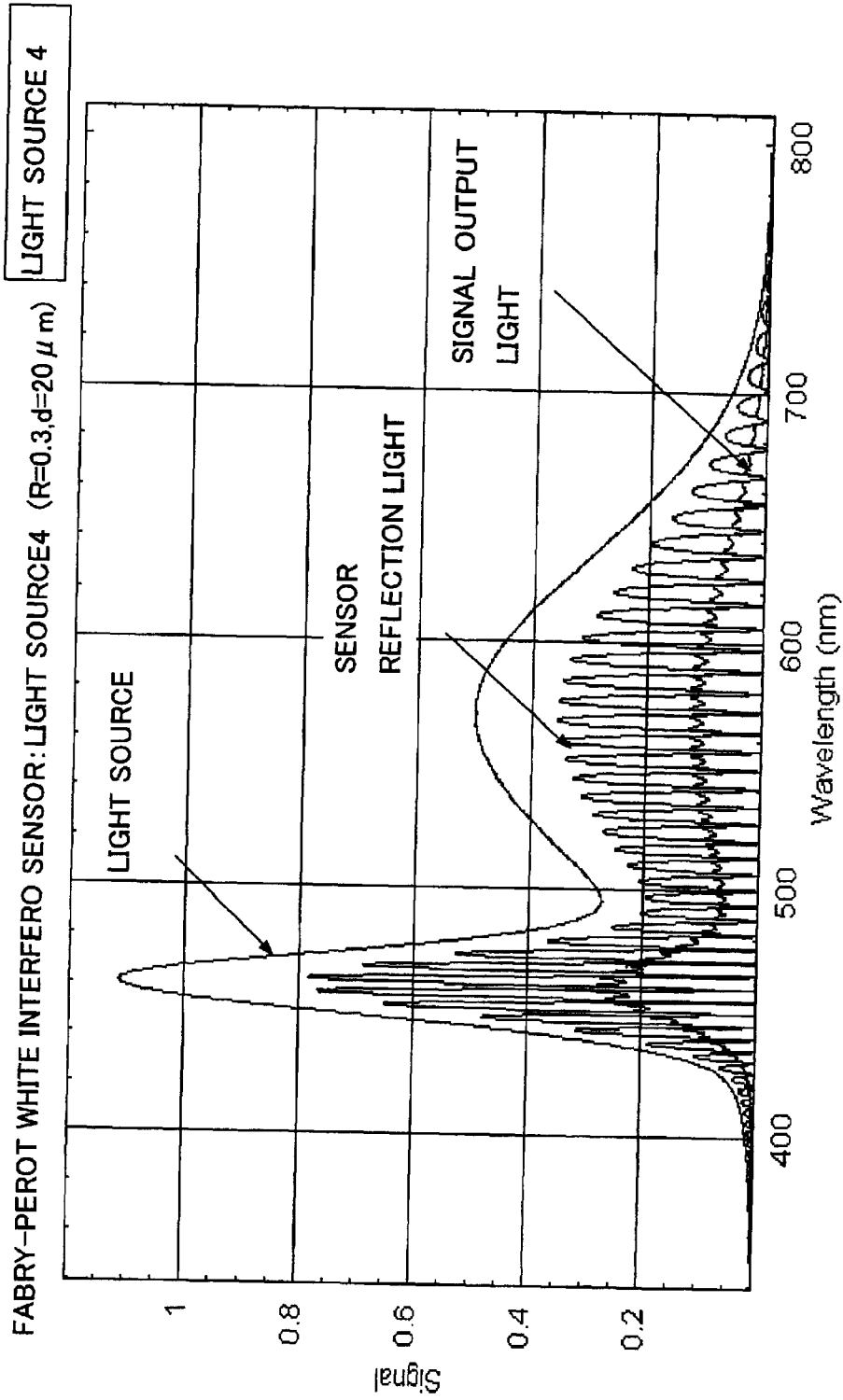

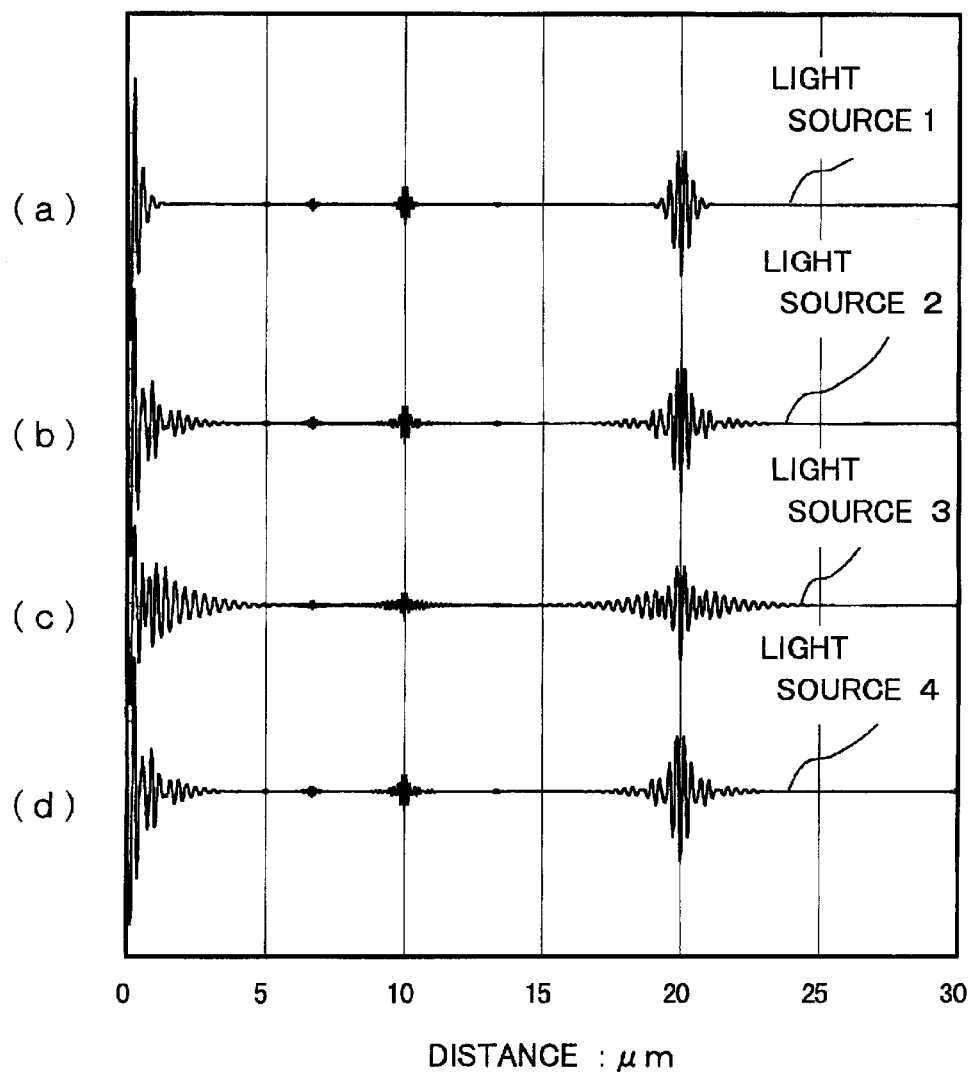

OUTPUT SIGNAL COMPARISON SIMULATION WITH LIGHT SOURCE HAVING FOUR DIFFERENT SPECTRUM DISTRIBUTIONS

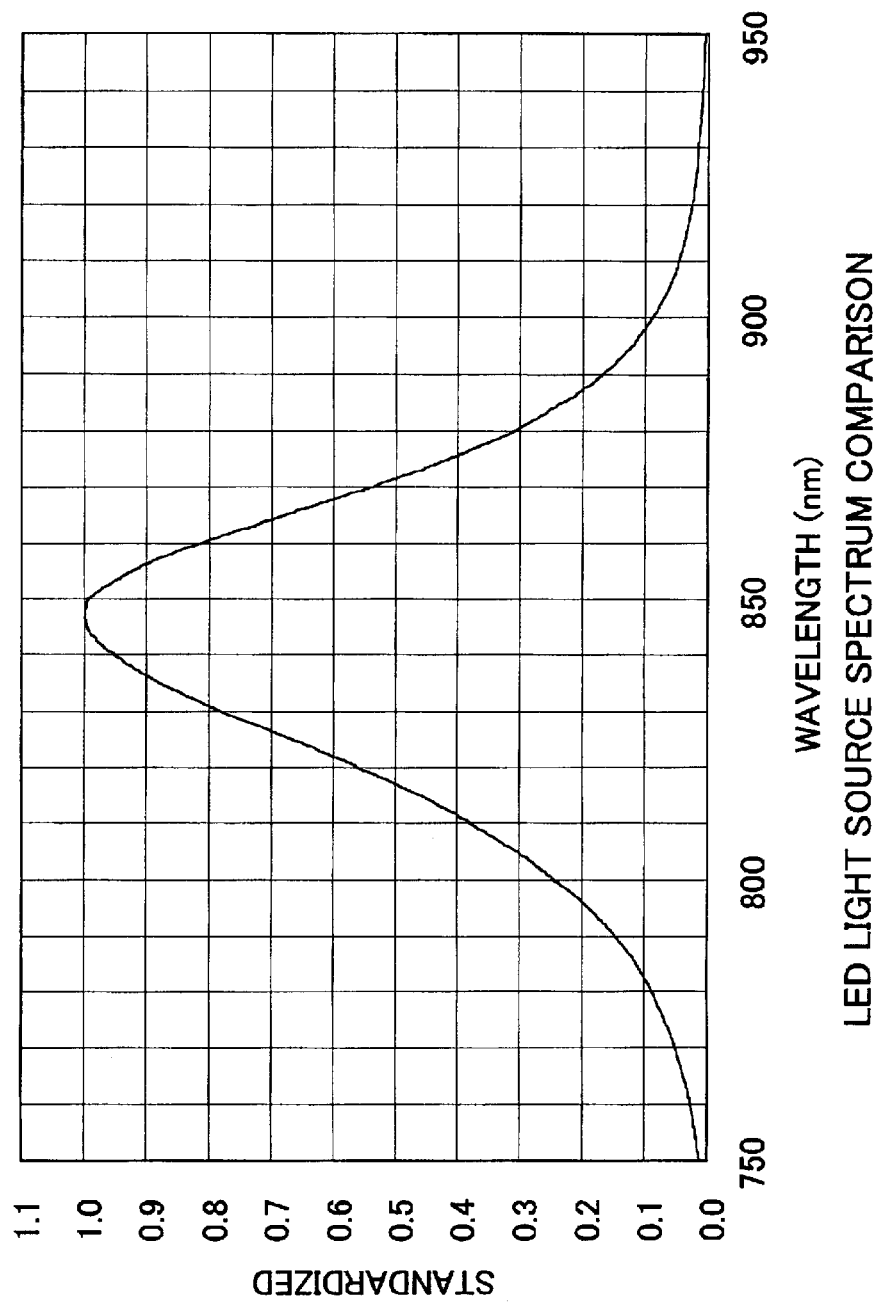
FIG. 39B LED LIGHT SOURCE SPECTRUM COMPARISON

OPTICAL FIBER INTERFEROSENSOR, SIGNAL-PROCESSING SYSTEM FOR OPTICAL FIBER INTERFEROSENSOR AND RECORDING MEDIUM

BACKGROUND OF THE INVENTION

1. Field of the Invention

This invention relates to a Fabry-Perot type optical fiber interferosensor in which light of a low coherence light source is guided to one optical fiber of a sensor having a certain measured clearance, parallel planes are formed, end surfaces of the optical fibers are faced to each other to form partial reflection mirrors at the opposing end surfaces of the optical fibers, either one of a reflection light or through-pass light has a modulated in wavelength in correspondence with a clearance size of the measured clearance and is guided with the optical fibers through multi-reflection at the measured clearance, an optical intensity in time-series corresponding to the variation in clearance is attained with the optical intensity distribution sensor, and either a minimum optical intensity position or a maximum optical intensity position at the optical intensity signal is calculated to measure the measured clearance; and more particularly, an optical fiber interferosensor to perform a signal processing preferable in an optical fiber interfere strain sensor where the measured clearance is varied in response to a displacement of the strain generated segment; a signal processing system for the optical fiber interferosensor; and a recording medium.

2. Description of the Related Art

The optical fiber interferosensor applied with a low coherence light source having a wide range spectrum, i.e. a white light source of multi-wavelengths has a feature not found in the optical fiber interferosensor using a high coherence light source such as a laser light source.

The low coherence interference process is a well-known technology in a classical optics as already described in M. Born and E. Wolf's "Principles of Optics, 6th edition" (Pergamon Press) (Oxford, London, New York, 1980). However, a true value of this process is realized under application to the optical fiber sensor.

In addition, a system in which the low coherence interference process is applied to the optical fiber sensor is already described in a total report such as D. A. Jackson's "Monomode optical fiber interferometers for precision measurement", J.Phys.E: Sci. Instrum., Vol. 18 981–1001 (1985).

In contrast to the low coherence interference process, a high coherence interference process advances as a laser is developed and then a high precision measurement is realized. In this high coherence interference process, a phase difference, i.e. a difference in optical path is measured basically by counting the number of fringes. Due to this fact, if the measuring system is turned off, information stored in it up to now is lost and an absolute optical path difference may not be obtained.

In addition, the high coherence interference process has as its reference value a wavelength of laser acting as a light source. Accordingly, in the case of high coherence interference process, the high precision measurement cannot be realized unless the laser wavelength is highly stabilized.

To the contrary, the low coherence inteference process has some features not found in the high coherence interference process that the absolute optical path difference of the interferometer can be measured and it is hardly influenced by variation in the wavelength spectrum in the light source. This process can be applied to many kinds of physical quantities if the measured parameters can be converted into displacements and further this process enables their absolute measurements to be carried out.

That is, the low coherence interference process is a high precision measuring process overcoming a difficulty in identification of the fringe degree in the high coherence interference process and a problem related to stability in operation of a light source while some features as found in the interference process are being utilized.

A Fabry-Perot type optical fiber interferosensor using the low coherence light source selected from the prior art optical fiber interferosensor has a simple structure, so that this is suitable for a high precision sensor.

As the prior art Fabry-Perot type optical fiber interferosensor applied with a low coherence light source, an optical fiber Fabry-Perot type interference strain sensor system is already indicated in the gazette of U.S. Pat. No. 5,392,117 (issued on Feb. 21, 1995; Belleville et al. "Fabry-Perot optical sensing device for measuring a physical parameter" and the gazette of U.S. Pat. No. 5,202,939 in which a signal light from a sensor having modulated in wavelength is collected in a spatial linear manner at the sensor, the light signal is guided to a Fizeau interferometer, an optical correlation is generated at the Fizeau interferometer to demodulate the light signal and this is detected by a linear image sensor.

One example of the Fabry-Perot type optical fiber interference strain sensor system disclosed in the aforesaid gazette of U.S. Pat. No. 5,392,117 will be described.

In FIGS. 27A and 27B are indicated schematic configurations of a Fabry-Perot type optical interference strain sensor. FIG. 27A shows an entire configuration of the Fabry-Perot type optical interference strain sensor and FIG. 27B schematically shows the measuring system.

As shown in FIG. 28, the Fabry-Perot type interferometer forms optical partial reflection films F1, F2 in a pair of parallel flat planes opposing to each other while a predetermined gap clearance size d (=G) being left, wherein a multi-reflection is carried out by performing a repetitive reflection within the gap and a large number of optical fluxes concern the interference (multi-optical flux interference), resulting in that a wavelength selective characteristic of the optical wave is increased. The present invention to be described later also positively utilizes this feature. In this case, a gap clearance (d) is filled with either vacuum or medium such as air, for example, which is transparent against the light source to be used.

A structure of the Fabry-Perot type optical fiber interference strain sensor will be described as follows.

As shown in FIG. 27($a$), the strain sensor has a basic structure in which partial reflection films F1, F2 composed of a thin film forming a partial reflection mirror are formed at each of the end surfaces of the optical fibers 101, 102 oppositely faced to each other while a gap clearance size G (=d) is being left. In addition, the optical fibers 101, 102 oppositely faced to each other at the sensor part 100 are inserted into a micro-capillary tube 103, arranged with the predetermined clearance size G being present, and further the fibers are melted and fixed to the micro-capillary tube 103 at the part corresponding to a gauge length $L_G$.

When the micro-capillary tube 103 constituting the Fabry-Perot type optical fiber interference strain sensor is fixed to the measured item with adhesive agent or the like, the gauge length $L_G$ is changed in response to deformation of the measured item and correspondingly a gap clearance size G is changed. A strain of the measured item can be measured in reference to a variation of the clearance size G (FIG. 29). Further, in order to use a low coherence light source having a wide wavelength region, as the optical fibers 101, 102, the multi-mode optical fiber is used.

Although both the reflected optical wave and the transmitted optical wave of which wavelengths are modulated at the sensor part 100 can also be used as a signal light, the reflected light will be described as an example.

The modulated in wavelength optical wave reflected at the sensor part 100 and returned back is divided by a [2×2] coupler 107 and is transmitted to an optical signal demodulation processing part 108.

Then, referring now to FIG. 29, a sensing principle of this type of the Fabry-Perot type optical fiber interference strain sensor will be described.

The signal light of which wavelength is modulated and transmitted from the sensor 100 to the optical signal demodulator 108 is radiated into the spatial space, collimated by an optical system 108a composed of a collimate lens system and a light collecting lens system, for example, thereafter the light is collected in a linear manner (a parallel light beam form).

The light signal collected in a linear manner is multireflected at each of the positions of a tapered gap of a wedge type Fabry-Perot interferometer, i.e. a Fizeau interferometer 108b where opposing surfaces are inclined by only a minimum angle γ in a substantial similar manner as that of the aforesaid sensor part 100, an optical correlation with the wavelength spectrum characteristic is generated and the optical intensity becomes minimum at the position of the gap size of the Fizeau interferometer 108b coinciding with the gap clearance size G of the sensor part 100 (in the case of transmittance type, it becomes maximum and in the case of reflection type, it becomes minimum).

This optical intensity signal is detected by a linear image sensor 108c comprised of CCD (Capacitance-Coupled Device) or the like, for example, and a distance from a wedge end of a location where its optical intensity becomes minimum $[L_{min}(d)|_{d=G}]$ is calculated, as shown in FIG. 29, thereby an absolute measurement of the clearance size G at the gap of the sensor part 100 can be carried out with $[G=L_{min}(G)\cdot\tan(g)]$ being applied. A strain ε can be expressed as $$\varepsilon = \frac{\{L_{\min}[G(\varepsilon)] - L_{\min}[G(0)]\} \cdot \tan(\gamma)}{L_G} \quad (1)$$

In this system, when a high coherent light source is used as a light source, the optical correlation signal is dispersed to cause either a minimum or maximum position sensing to become difficult.

In FIG. 30 is illustrated an example of simulation of a sensor system output when the central wavelength $\lambda_0$=850 nm, its full width at half-maximum Δλ is set to 5 nm, 25 nm and 60 nm, respectively. It becomes apparent that as the spectrum full width at half-maximum becomes narrow and the light source becomes a high coherence, the optical correlation signal is expanded, a zero-path length interference region of the Fizeau interferometer 108b is expanded and a minimum position sensing of the optical correlation signal becomes difficult. In FIG. 30, a position of 1.0 at an abscissa corresponds to the gap clearance.

A schematic block diagram of a transmission type system of the aforesaid measuring system is illustrated in FIG. 31 and a schematic block diagram of a reflection type system is shown in FIG. 31, respectively.

In FIGS. 33A and 33B are illustrated an example of output where a signal output in the aforesaid system is simulated. A part enclosed by a dashed line in FIG. 33A corresponds to an optical correlation signal containing a gap clearance information of the sensor part 100. FIG. 33B shows an enlarged optical correlation signal part. A position at 1.0 in the abscissa corresponds to the gap clearance position. In addition, a signal near the zero position adjacent to the wedge end of the Fizeau interferometer 108b enclosed by a one-dotted chain line in FIG. 33A is a signal generated only by the Fizeau interferometer 108b and since it uses a low coherence light source, it is locally present near the position where the gap clearance of the Fizeau interferometer 108b is zero. This is not a signal generated by an optical correlation between the sensor part 100 and the Fizeau interferometer 108b. This signal portion is defined as a zero-pass length interference region.

In FIGS. 34A and 34B are shown measurement block diagrams of a comparison confirmation test about a difference between the optical correlation signal and the zero-pass length interference. In FIG. 34, the gap fixed Fabry-Perot interferometer shown in FIG. 34B is a Fabry-Perot interferometer in which after partial reflection films are formed at the end surfaces of the two optical fibers, they are inserted into micro-capillary tubes, their end surfaces are faced and fixed to each other with a gap being present between them, wherein it has a structure similar to that of the aforesaid Fabry-Perot type optical fiber interference strain sensor shown in FIG. 27 and this may perform to act as a sensor. The gap-variable type Fabry-Perot interferometer shown in FIGS. 34A and 34B are made such that after the partial reflection films ($TiO_2$ thin film, for example) are formed at the end surfaces of the two optical fibers, each of them is faced against a piezo-stage, connected and fixed to each other, its gap clearance is made variable so as to act as a Fizeau interferometer 108b of the optical signal demodulation part 108 shown in FIG. 27A. That is, the Fizeau interferometer 108b operates to measure signal light from the sensor 100 once with an interferometer having a wedge while being spatially expanded and in turn the gap variable type Fabry-Perot interferometer is operated to measure for every gap clearance size while the gap clearance size is being changed in sequence. In this case, as the light source, LED (light emitting diode)(L7560[HAMAMATSU]) was used, as the optical fiber, a multi-mode fiber (GI50/125, NA=0.12) was used and as a piezo-stage, a three-axis nano positioning stage (17ANC001/MD[MELLESGRIOT]) was used.

In FIGS. 35A and 35B are illustrated a variation in output of the optical power meter in the two measuring systems in FIGS. 34A and 34B in the case that the measurement was performed while the gap clearance size of the gap variable Fabry-Perot interferometer being minutely changed at the piezo-stage. As described above, the zero-pass length interference region where the gap clearance size of the gap variable Fabry-Perot interferometer is near zero is present at any type of measuring system, although the optical correlation signal is present only when the gap fixed Fabry-Perot interferometer acting as a sensor is present, and the minimum position of the signal corresponds to the gap clearance size of the gap fixed type Fabry-Perot interferometer. A result similar to these systems can be indicated also by simulation.

In order to attain the output signals indicated in FIGS. 40A, 40B in the practical sensor measuring system and realize a high precision measuring system, it is necessary to attain, as signal output waveforms of time-series in the linear image sensor, a clear waveform having a less amount of fluctuation and variation of a low frequency as well as a high S/N ratio (a signal to noise ratio).

In order to realize the foregoing, it becomes necessary to perform an adjustment (a fine adjustment) of high precision alignment in the optical system including a collimate lens, a focusing lens, a Fizeau interferometer and a linear image sensor and the like. Further, the linear image sensor shows a tendency that a high sensing noise is generated and the sensing system may become complicated.

In view of the foregoing, it may be considered to realize the high-precision sensor measuring system by attaining a signal acting as a background having the optical correlation signal separated from the measuring range (a rated range of the sensor), performing a series of signal processing on the basis of that data and removing non-required signals such as fluctuation and noise of low frequency or the like. In this optical fiber interference sensor, a load characteristic data of wider range than the measuring range at the time of calibration is attained and as data, the data of measurement range is utilized as background data. This method has some effects that a high precision measuring system can be realized by an adjustment of a convenient optical system and the cost can be reduced.

However, in this system, if the wavelength spectrum regions in the light sources are the same to each other, the output signal waveforms of the sensor system are scarcely changed. That is, in FIGS. 36A to 38 are indicated examples of simulation of the sensor system output signal waveforms (FIGS. 37 and 38) from the light source having four different wavelength spectra distribution (FIG. 36) where the light source wavelength spectrum regions are approximately the same to each other. In addition, this fact is also confirmed in an actual experiment as shown in FIGS. 39A, 39B and 40.

That is, FIGS. 36A, 36B, 36C and 36D show a result of simulation of a wavelength spectrum distribution, a reflection signal spectrum from a sensor and a wavelength spectrum after passing through the variable gap Fabry-Perot interferometer for the light source 1, the light source 2, the light source 3 and the light source 4 having four different wavelength spectrum distributions with substantial same light source wavelength spectrum regions. In view of the wavelength spectrum, the waveforms in regard to these four light sources (the light source 1 to the light source 4) are made substantially different from each other. Then, (a), (b), (c) and (d) in FIG. 37 and (a), (b), (c) and (d) in FIG. 38 illustrate results of simulation of light intensity outputs against the gap clearances of the signal lights from the light source 1 to the light source 4 passed through the variable gap Fabry-Perot interferometer. In this case, the sensor gap clearance was 20 μm. As apparent from FIG. 38, irrespective of the fact that the wavelength spectrum shapes of the light source 1 to the light source 4 are substantially made different, the optical correlation signal waveforms in regard to the light source 1 to the light source 4 are remarkably similar to each other.

FIGS. 39A and 39B illustrate a wavelength spectrum distribution of the two LED light sources (L7560 [HAMAMATSU] and RLE8P4-002[DAIDO STEEL CO., LTD.], and FIGS. 40A and 40B illustrate a result of measurement performed by experiment of these optical correlation signals. The wavelength spectrum of RLE8P4-002 is shifted to a long wavelength side as compared with that of the other L7560, a spread of the spectrum is slightly narrow, so that the corresponding optical correlation signal waveforms are spread, although they are quite similar optical correlation output waveforms irrespective of the fact that the spectrum waveforms are different from each other.

As described above, the fact that the quite similar optical correlation output waveforms can be attained irrespective of different spectrum waveform becomes a quite important factor in view of realizing a high precision sensor. That is, even if the light source wavelength spectrum is varied by a certain degree due to an external disturbance such as a temperature or the like, the optical correlation signal waveform is not changed and a gap clearance position of the sensors can be measured in a stable manner. Further, a wide setting of the wavelength spectrum distribution of the light source causes the optical correlation signal not to be expanded and influence of non-required noise component is reduced. Accordingly, it is not necessary to provide a high stable state of the light source and it becomes possible to realize the high precision sensor system in less-expensive manner.

SUMMARY OF THE INVENTION

The present invention has been invented in view of the foregoing circumstances, and it is an object of the present invention to provide an optical fiber interference sensor, a signal processing system for the optical fiber interference sensor and a recording medium in which influence caused by non-required signal components such as fluctuation and noise of the low frequency can be removed or restricted effectively by a simple configuration and the high precision result of measurement can be attained by an easy or convenient adjustment of the optical system or by an easy signal processing of the sensing signal.

An object of the present invention is to provide an optical fiber interference sensor capable of attaining a high precision result of measurement even with a simple configuration including the signal processing system, in particular.

In addition, an object of the present invention is to provide an optical fiber interference sensor capable of effectively performing a measurement in particular in the case that a non-required component of high frequency is contained in the measured signal.

An additional object of the present invention is to provide, in particular, an optical fiber interference sensor in which the high precision measurement can be realized by a simple configuration.

An additional object of the present invention is to provide, in particular, an optical fiber interference sensor capable of removing or restricting a non-required component more effectively.

An additional object of the present invention is to provide, in particular, an optical fiber interference sensor capable of realizing either removal or restriction of a non-required component by a simple and effective processing.

An additional object of the present invention is to provide, in particular, an optical fiber interference sensor capable of realizing either removal or restriction of a non-required component by a simple and effective processing.

An additional object of the present invention is to provide, in particular, an optical fiber interference sensor capable of performing either removal or restriction of a non-required component more effectively and realizing a high precision measurement.

An additional object of the present invention is to provide, in particular, an optical fiber interference sensor capable of realizing a high precision measurement by a simple configuration.

An additional object of the present invention is to provide, in particular, a signal processing system of an optical fiber interference sensor capable of attaining a result of high precision measurement even with a simple configuration including a signal processing system.

An additional object of the present invention is to provide, in particular, a signal processing system for an optical fiber interference sensor capable of performing an effective measurement even in the case that the measured signal contains a high frequency non-required.

An additional object of the present invention is to provide, in particular, a recording medium capable being read by a computer having a program recorded to enable a result of high precision measurement to be carried out even by a simple configuration including also a signal processing system as to the signal processing of the optical fiber interference sensor by the computer.

An additional object of the present invention is to provide, in particular, a recording medium capable being read by a computer having a program recorded to enable an effective measurement to be carried out even in the case that the measured signal contains a non-required component of high frequency as to the signal processing of the optical fiber interference sensor by the computer.

In particular, an additional object of the present invention is to provide an optical fiber interference sensor capable of attaining a result of high precision measurement by a simple configuration.

In addition, an additional object of the present invention is to provide an optical fiber interference sensor, in particular, capable of effectively removing or restricting a non-required component of a high frequency and a low frequency.

In addition, an further object of the present invention is to provide an optical fiber interference sensor, in particular, capable of effectively removing or restricting a non-required component of a high frequency and a low frequency.

An additional object of the present invention is to provide an optical fiber interference sensor, in particular, capable of removing or restricting a non-required component more effectively.

An additional object of the present invention is to provide an optical fiber interference sensor, in particular, capable of removing or restricting a non-required component effectively and realizing measurement of high precision.

An additional object of the present invention is to provide an optical fiber interference sensor, in particular, capable of removing or restricting a non-required component more effectively and realizing measurement of high precision.

An additional object of the present invention is to provide a signal processing system for an optical fiber interference sensor, in particular, capable of realizing a result of high precision of measurement even with a simple configuration.

An additional object of the present invention is to provide a recording medium capable of being read with a computer having a program recorded therein to enable a result of high precision of measurement to be attained even with a simple configuration of measuring system in regard to a signal processing by the optical fiber interference sensor with a computer.

BRIEF DESCRIPTION OF THE DRAWINGS

Preferred embodiments of the present invention will be described in detail based on the followings, wherein:

FIG. 4 is a wavelength spectrum diagram for showing a wavelength component distribution after the optical fiber of the light source used for an actual measurement of the optical reflection type Fabry-Perot optical fiber interference load cell in FIG. 1.

FIG. 5B illustrates real data of signal outputs of the optical power meter in the LED light sources applied when a load weight is applied in the optical reflection type Fabry-Perot optical fiber interference load cell in FIG. 1.

FIGS. 7A and 7B and 7C show comparison of signal outputs with a background signal being removed.

FIG. 7A illustrates the signal waveforms with a background signal being removed in regard to the light source of the tungsten halogen lamp in the optical reflection type Fabry-Perot optical fiber interference load cell in FIG. 1.

FIG. 7B illustrates the signal waveforms with a background signal being removed in regard to the LED light source in the optical reflection type Fabry-Perot optical fiber interference load cell in FIG. 1.

FIG. 7C illustrates the signal waveforms with a background signal being removed in regard to the SLD light source in the optical reflection type Fabry-Perot optical fiber interference load cell in FIG. 1.

FIGS. 8A, 8B and 8C show comparison of optical cross-correlation signals with a background signal being removed.

FIG. 8A illustrates in detail the optical correlation signal waveforms with the background signal being removed in regard to the light source of the tungsten halogen lamp in the optical reflection type Fabry-Perot optical fiber interference load cell in FIG. 1.

FIG. 8B illustrates in detail the optical correlation signal waveforms with the background signal being removed in regard to the LED light source in the optical reflection type Fabry-Perot optical fiber interference load cell in FIG. 1.

FIG. 8C illustrates in detail the optical correlation signal waveforms with the background signal being removed in regard to the SLD light source in the optical reflection type Fabry-Perot optical fiber interference load cell in FIG. 1.

FIGS. 9A and 9B are views for showing a gap clearance against the load weight and a result of data processing after making in a trial base the measuring system shown in FIG. 1 and performing a signal processing in the optical reflection type Fabry-Perot optical fiber interference load cell in FIG. 1.

FIG. 9A shows a gap clearance against the load weight.

FIG. 9B shows a result of data processing on displacement from a fitting straight line.

FIG. 10 is a block diagram for showing a configuration of the optical reflection type Fabry-Perot optical fiber interference load cell using a wedge type Fabry-Perot interferometer in accordance with a second preferred embodiment and a fourth preferred embodiment of the present invention.

FIG. 12 is a flow chart for showing a flow of signal processing mainly at a signal processing part while a configuration of the optical reflection type Fabry-Perot optical fiber interference load cell is being employed in a fourth preferred embodiment.

FIG. 18A is a view for showing an optical correlation signal extraction process against the loads in the optical reflection type Fabry-Perot optical fiber interference load cell in FIG. 10 with the load at (a) being 0.0N, the load at (b) being 38N and the load at (c) being 73, respectively.

FIG. 18B is a view for showing an optical correlation signal extraction process against the loads in the optical reflection type Fabry-Perot optical fiber interference load cell in FIG. 10 with the load at being 38N and the load.

FIG. 20A is a view for showing an example of waveform in the optical reflection type Fabry-Perot optical fiber interference load cell in FIG. 10, wherein it shows an example of waveform with the low frequency component being removed from the optical correlation signal by a minimum square fitting.

FIG. 20B is a view for showing an example of waveform in the optical reflection type Fabry-Perot optical fiber interference load cell in FIG. 10, wherein it shows an abscissa of the waveform diagram in FIG. 20A in its enlarged size.

FIG. 27A is a view for showing an entire configuration of the prior art Fabry-Perot optical fiber interference strain sensor.

FIG. 27B is a schematic view for illustrating a measuring system of the prior art.

FIG. 33B is an enlarged view of a part in FIG. 33A.

FIG. 34A is a measuring block diagram for showing measuring system without fixed gap type Fabry-Perot interferometer.

FIG. 34B is a measuring block diagram for showing measuring system with fixed gap type Fabry-Perot interferometer.

FIGS. 36A, 36B, 36C and 36D are waveform diagrams for comparing a spectrum distribution in various kinds of light sources Nos. 1, 2, 3 and 4, respectively.

FIG. 36A is a waveform diagram for comparing a spectrum distribution in various kinds of light sources 1.

FIG. 36B is a waveform diagram for comparing a spectrum distribution in various kinds of light sources 2.

FIG. 36C is a waveform diagram for comparing a spectrum distribution in various kinds of light sources 3.

FIG. 36D is a waveform diagram for comparing a spectrum distribution in various kinds of light sources 4.

FIG. 37 is a waveform diagram for showing a result in which signal outputs caused by difference in light source spectra are compared and simulated.

FIGS. 39A and 39B are waveform diagrams for comparing the spectrum distribution in the light emitting diode light source.

FIG. 39A is a waveform diagram for showing the wavelength spectrum measurement [L7560 (Hamamatsu)].

FIG. 39B is a waveform diagram for showing the wavelength spectrum measurement [RLE8P4-002 (Daido Steel Co., Ltd.)].

FIG. 40A is a waveform diagram for showing optical cross-corelation signal meansurement [L7560 (Hamamatsu)].

FIG. 40B is a waveform diagram for showing optical cross-corelation signal meansurement [RLE8P4-002 Daido Steel Co., Ltd.)].

DESCRIPTION OF THE PREFERRED EMBODIMENTS

Figure 1:
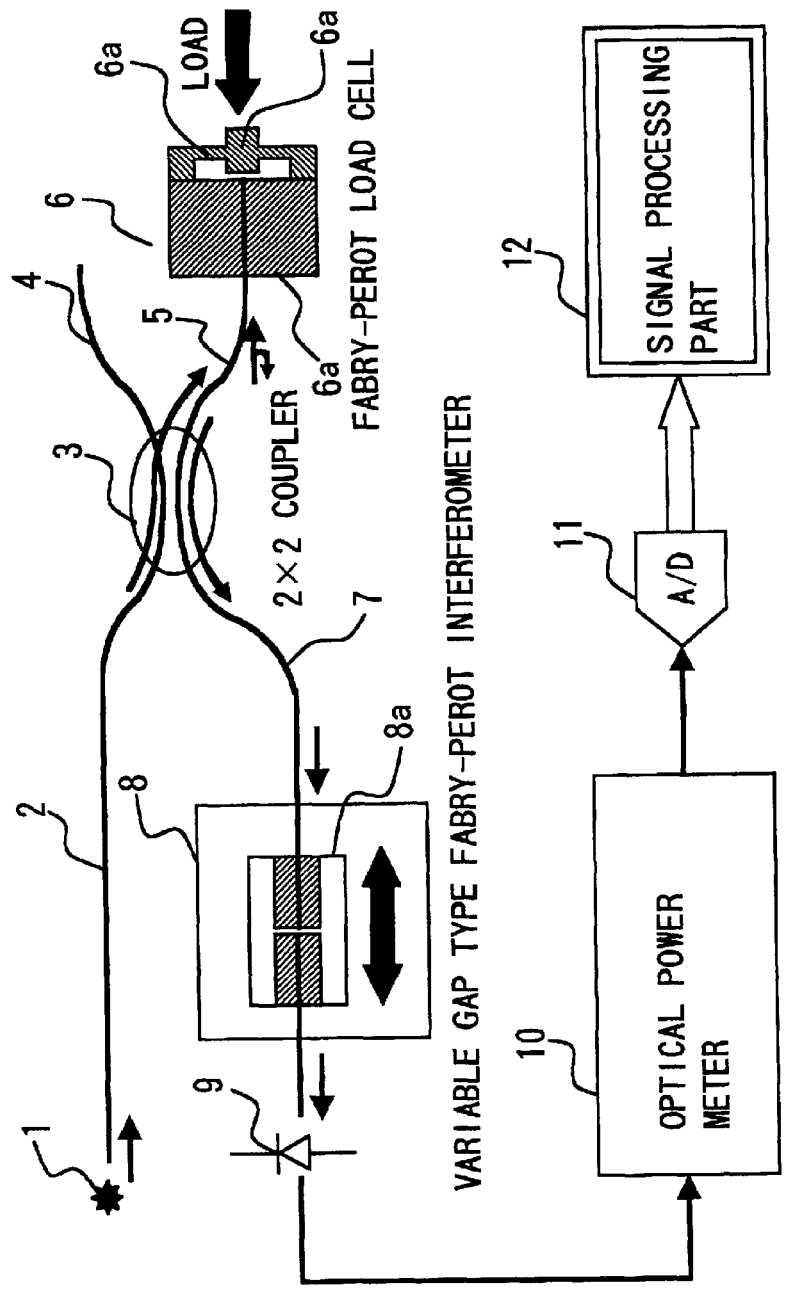
FIG. 1 is a block diagram for showing a configuration of an optical reflection type Fabry-Perot optical fiber interference load cell to which an optical fiber interference sensor in accordance with a first preferred embodiment of the present invention.

Referring now to the drawings, the optical fiber interference sensor of the present invention will be described in detail as follows in reference to its preferred embodiments.

The optical fiber interference sensor in accordance with the preferred embodiments of the present invention sufficiently localizes an optical correlation signal including a gap clearance information in the sensor system output signals, simplifies a waveform signal processing and realizes a high-speed response as a sensor by using a light source having a wide wavelength spectrum distribution such as a halogen lamp and a white LED or the like, for example. This optical fiber interference sensor can realize a high precision measuring system having a simple configuration by using a light source having a wide range wavelength spectrum and performing a simple signal processing. And it has the effect that the cost can be reduced.

Figure 2:
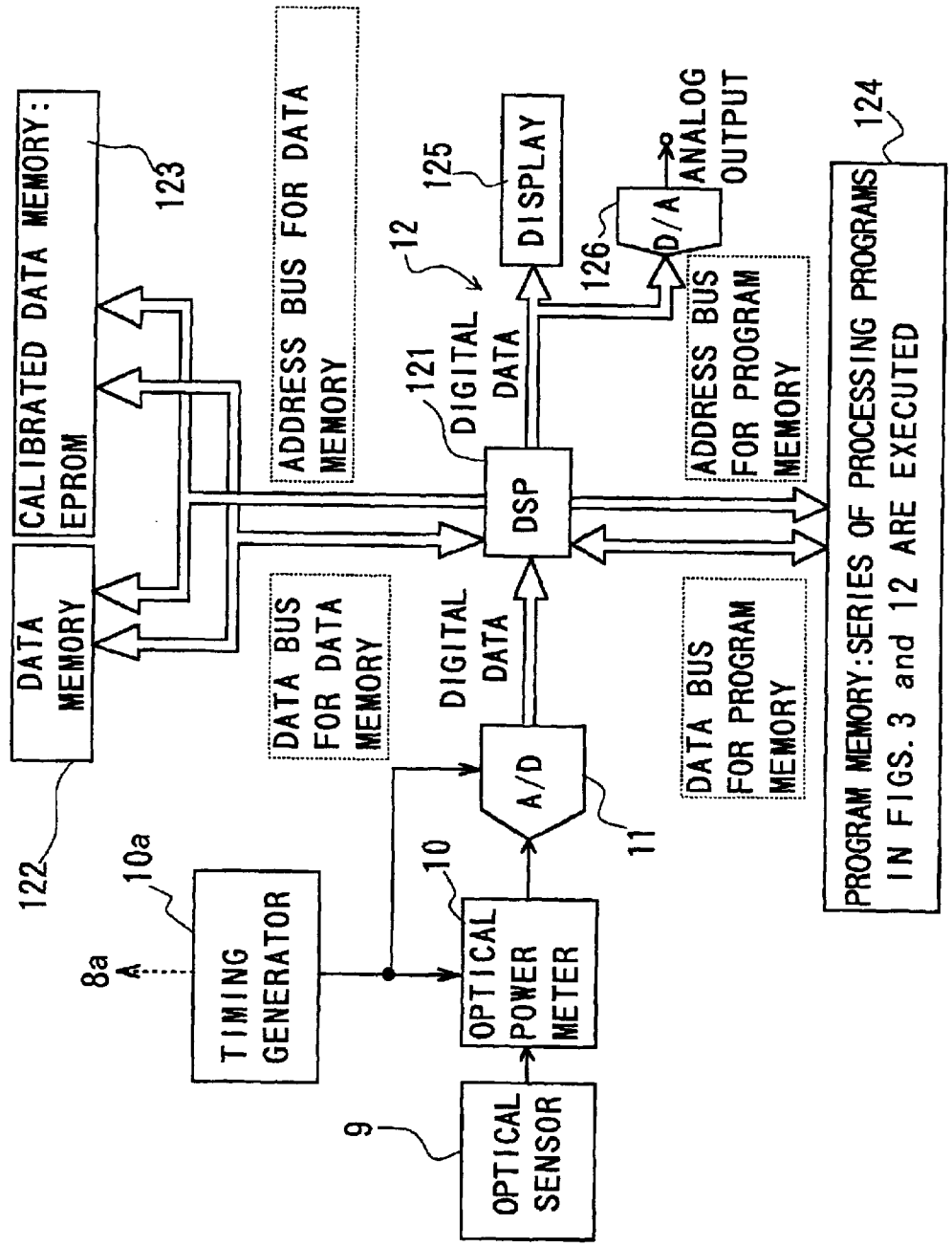
FIG. 2 is a block diagram for showing a detailed configuration of a signal processing part of the optical reflection type Fabry-Perot optical fiber interference load cell in FIG. 1.

FIGS. 1 and 2 illustrate a configuration of an optical fiber interference sensor constituted as an optical reflection type Fabry-Perot optical fiber interference load cell in accordance with the first preferred embodiment of the present invention. FIG. 1 schematically illustrates an entire configuration and FIG. 2 shows a practical configuration of a signal processing part.

The optical reflection type Fabry-Perot optical fiber interference load cell acting as an optical fiber interference sensor in accordance with the present invention shown in FIG. 1 is comprised of a light source 1, a first optical fiber 2, a [2×2] coupler 3, a second optical fiber 4, a third optical fiber 5, a Fabry-Perot load cell 6, a fourth optical fiber 7, a variable gap type Fabry-Perot interferometer 8, an optical sensor 9, an optical power meter 10, an A/D (analog-digital) converter 11 and a signal processing part 12.

FIG. 2 practically illustrates a configuration of the signal processing part 12 in FIG. 1, wherein FIG. 2 shows a configuration of segments of signal processing ranging from the optical sensor 9 to the signal processing part 12. The signal processing part 12 is comprised of a DSP (a digital signal processor) 121, a data memory 122, a calibration data memory 123, a program memory 124, a display 125 and a D/A (a digital analog) converter 126.

In FIG. 1, the light source 1 may not generate a high coherence light such as a laser or the like, but generate a wide range low coherence light such as white light and the like. As this light source 1, a tungsten halogen lamp and a white LED or the like, for example, can be used. The first optical fiber 2 is an optical fiber for use in guiding the low coherence light from the light source 1 to the [2×2] coupler 3.

The [2×2] coupler 3 has first to fourth ports, wherein light incident from the first port is branched and outputted to the second port and the third port with an intensity ratio of 50%/50%. In addition, the [2×2] coupler 3 may output light incident from the third port to the fourth port. Although the first optical fiber 2 is connected to the first port of the [2×2] coupler 3 as described above, each of the second optical fiber 4, the third optical fiber 5 and the fourth optical fiber 7 is connected to each of the second port, the third port and the fourth port. Since the output light from the second port of the [2×2] coupler 3 is proportional to the input light of the first port, the output of the second port is fed back to a control part (not shown) of the light source 1, for example, through the second optical fiber 4, and is utilized in controlling of light emission of the light source 1. The output light at the third port of the [2×2] coupler 3 is guided to the Fabry-Perot load cell 6 through the third optical fiber 5. The output light corresponding to a measured clearance in the Fabry-Perot load cell 6 is guided to the [2×2] coupler 3 through the third optical fiber 5. The [2×2] coupler 3 guides the output light of the Fabry-Perot load cell 6 guided to the third port through the third optical fiber 5 to a variable gap Fabry-Perot interferometer 8 at a signal demodulation part through the fourth optical fiber 7 connected to the fourth port.

The Fabry-Perot load cell 6 is a load cell having a Fabry-Perot interferometer acting as a Fabry-Perot optical interference sensor assembled therein, wherein it has a base 6a, a diaphragm 6b and a load feeding part 6c. The other end of the third optical fiber 5 having one end connected to the third port of the [2×2] coupler 3 is fixed by an adhesion and the like to the base of the Fabry-Perot load cell 6, and a partial reflection film is formed at the extremity end surface of the third optical fiber 5. The Fabry-Perot load cell 6 has a partial reflection film formed to be faced against the end surface of the third optical fiber 5 where the partial reflection film is formed, and the diaphragm 6b deformed by a load of weight and the like is arranged with a predetermined gap, i.e. the measured clearance being present. The partial reflection film formed at the portion of the diaphragm 6b facing against the end surface of the optical fiber is a thin film, for example, that may reflect a part of the incident light and absorb the residual part of it. The Fabry-Perot interferometer described above is constituted by the gap portion facing while forming the aforesaid predetermined gap clearances.

When a load is applied to the Fabry-Perot load cell 6, the diaphragm 6b is deformed to cause a gap clearance size to be changed. The load can be calculated by sensing the variation in clearance size of the gap. That is, light guided by the third optical fiber 5 to the Fabry-Perot load cell 6 of the Fabry-Perot interferometer is multi-reflected at the gap formed by the opposing partial reflection surfaces and it is modulated in its wavelength in response to the clearance size of the gap. The optical wave modulated in its wavelength, i.e. the light signal is reflected at the sensor of the Fabry-Perot load cell 6, returns back to the third optical fiber 5 and is inputted from the third port to the [2×2] coupler 3.

The fourth optical fiber 7 may guide the wavelength-modulated optical signal inputted into the [2×2] coupler 3 from the Fabry-Perot load cell 6 to the variable gap type Fabry-Perot interferometer 8 at the optical signal demodulation part from the fourth port of the [2×2] coupler 3.

The variable gap type Fabry-Perot interferometer 8 has a variable gap clearance interferometer 8a and the gap clearance of this variable gap type Fabry-Perot interferometer 8a can be changed by a Piezo-actuator (not shown), for example. It is possible to attain an optical correlation signal near the sensor gap of the Fabry-Perot load call 6 by changing the gap clearance.

That is, the incident light in the variable gap type Fabry-Perot interferometer 8 is multi-reflected at each of the positions of the gap varied by the Piezo-actuator to generate an optical correlation with the wavelength spectrum characteristic, the optical intensity becomes minimum at a position where it is coincided with the clearance size of the gap in the Fabry-Perot load cell 6 and it is detected by the optical sensor 9 as an optical correlation signal. This optical correlation signal is given from the optical sensor 9 to the optical power meter 10 and measured there. In this case, the variable gap type Fabry-Perot interferometer 8 is comprised of a Piezo-actuator for operating the variable gap type interferometer 8a, the optical power meter 10 and a timing generator 10a for giving a signal defining an operating timing in a synchronous manner to the A/D transformation part 11 (refer to FIG. 2).

The optical power meter 10 may measure the output from the optical sensor 9. The A/D converter 11 converts the optical correlation signal read by the optical sensor 9 and processed by the optical power meter 10 into a digital information in response to a timing signal supplied from the timing generator 10a of the variable gap type Fabry-Perot interferometer 8.

The signal processing part 12 processes a signal A/D converted by the A/D converter 11 to attain a result of measurement. The signal processing part 12 extracts the desired optical correlation signal from the signal in time-series attained from the optical sensor 9 through the optical power meter 10, removes a high frequency noise component of the optical correlation signal through a low-pass filter processing, differentiates the signal having high frequency non-required component removed to attain a zero-cross point where the differentiated value crosses with the level zero.

Then, each of the segments constituting the signal processing part 12 shown in FIG. 2 will be described as follows.

DSP (a digital signal processor) 121 executes a series of signal processings (refer to the flow-chart of FIG. 3) in accordance with a flow of program written into a program memory 124. DSP 121 may access the data memory 122 and the calibration data memory 123 at the stage of signal processing operation as required. In place of this DSP 121, a similar function may be accomplished under application of a general type of MPU (a micro processor unit).

The data memory 122 is constituted by RAM (a random access memory), for example, wherein it stores various kinds of data such as digitalized image information data given by the A/D converter 11 and the intermediate data related to the signal processing operation of DSP 121 through accessing operation of DSP 121. The calibration data memory 123 is constituted by EPROM (an erasable programmable read only memory: removable P-ROM) and stores calibration data acting as background in measurement of the Fabry-Perot load cell 6 constituting the Fabry-Perot interferometer. In the program memory 124 is stored a program in advance where DSP 121 may execute a series of digital processings shown in FIG. 3.

The display 125 displays a result of processing of DSP 121 and information generated by this processing to a user as desired as information in regard to the processing at DSP 121. A D/A (a digital-analog) converter 126 may convert the result of processing at DSP 121 and information generated by the processing from the digital values to the analog values and output them.

That is, the series of digital signal processings at the signal processing part 12 are carried out by the DSP 121 while accessing the data memory 122 and the calibration data memory 123 as desired properly along with a flow of processing written into the program memory 124.

In the following description, a constitution of the measuring system applied in the measurement of actual measured data will be described.

As the Fabry-Perot optical fiber interference sensor, the optical reflection type Fabry-Perot optical fiber interference load cell 6 shown in FIG. 1 was used. In this case, the gap clearance of the optical reflection type Fabry-Perot optical fiber interference load cell 6 is about 23 μm. In addition, as the optical power meter 10, AQ2140 (AQ2730 SENSOR UNIT)[ANDO] was used.

Then, a summary of the sensor system will be described. As the low coherence light source used as the light source 1, a tungsten halogen lamp was used and for a sake of comparison, the measurement was performed when the LED light source (L7560[HAMAMATSU]) and SLD (a semiconductor laser device) light source (AS3B381FX[ANRITSU]) were used. In FIG. 4 is illustrated a wavelength spectrum after wave guiding of the optical fiber (G150/125, NA=0.12) in the low coherence light source used in this experiment. In addition, for a sake of reference only, this figure shows the wavelength spectrum in the LED light source (L7560 [HAMAMATSU]) and SLD light source (AS3B381FX [ANRITSU]). This figure also shows a wavelength spectrum of the white LED light source (NSPW300BS[NICHIA]). Although the white interference measurement using the white LED light source was tried, it was found that an optical intensity of the optical fiber wave guided light was quite weak and although the interference caused by the wavelength spectrum was confirmed, the optical correlation signal could not be detected. It can be considered that the optical correlation signal detection using this white LED light source can be performed if the wave guided optical intensity of the optical fiber is increased under application of the most-suitable collimate lens and a condensing lens or the like or the optical sensor 9 of high precision is used.

In addition, as the A/D converter 11 for use in A/D converting an output signal from the optical power meter 10, the A/D converter with the number of quantitative bit of 12 bits and sampling frequency of 200 kHz (ADC-150A [KYOWA], 12 Bit, 200 kHz) was used. An output from the A/D converter 13 was inputted into PC (a personal computer) acting as the signal processing part 12 through GBIB general-purpose interface.

When the actual measured data was measured, PC was used in place of DSP 121 to perform a similar signal processing. That is, as to the signals inputted into PC, a signal processing program to be described latter in accordance with the method of the present invention was made through an application development software (Lab VIEW [NATIONAL INSTRUMENTS] and then executed.

As already described above, when a certain load is applied to the Fabry-Perot load cell 6, the diaphragm 6b is deformed to cause a gap clearance size to be changed and the changing of a gap clearance is detected to calculate the applied load. In this case, the Fabry-Perot load cell 6 applied to the actual measurement displaces by about 3 μm in respect to 9.807N (1 kgf).

Figure 5A:
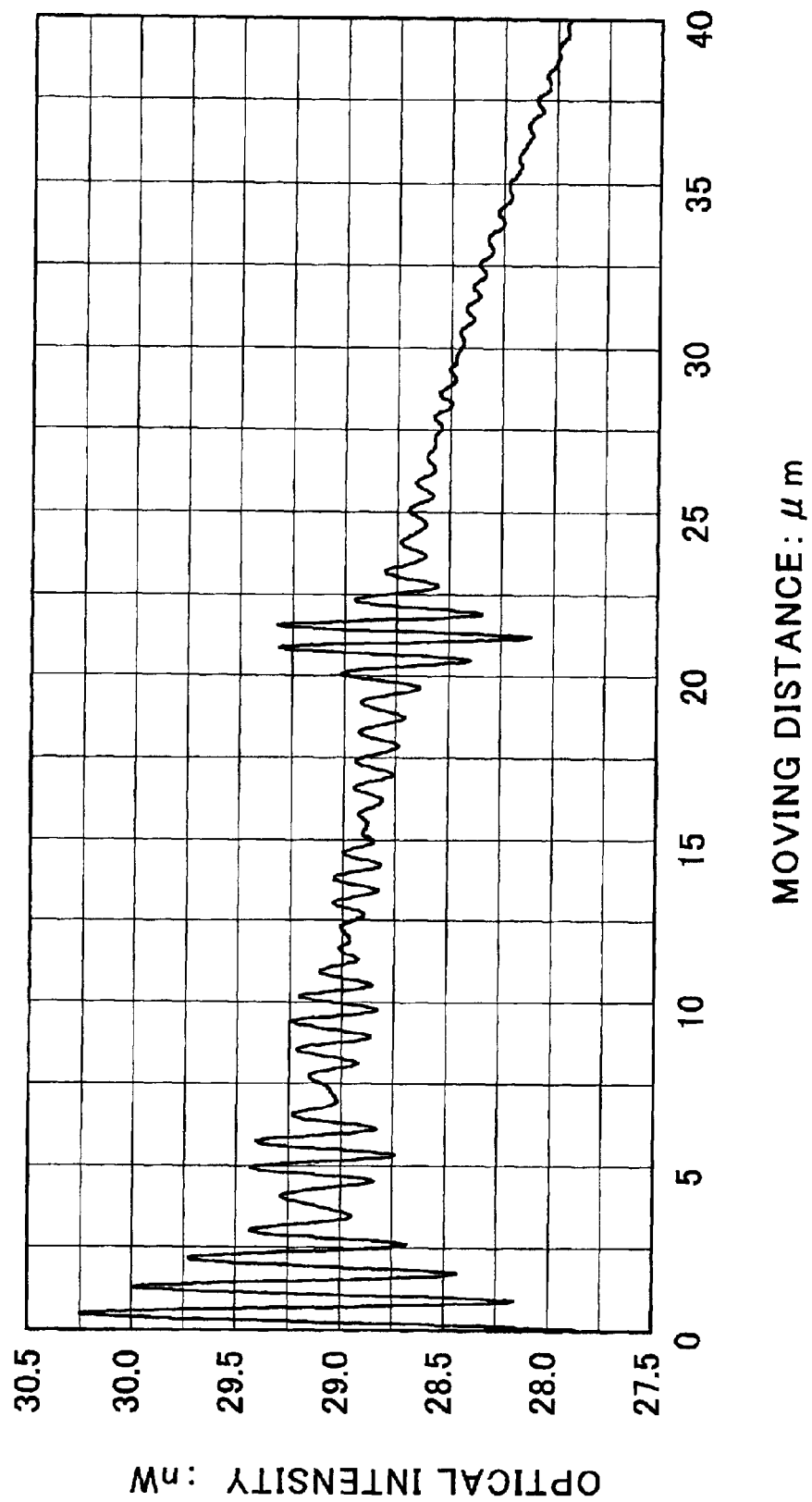
FIG. 5A illustrates real data of signal outputs of the optical power meter in the light source of the tungsten halogen lamp applied when a load weight is applied in the optical reflection type Fabry-Perot optical fiber interference load cell in FIG. 1.
Figure 5C:
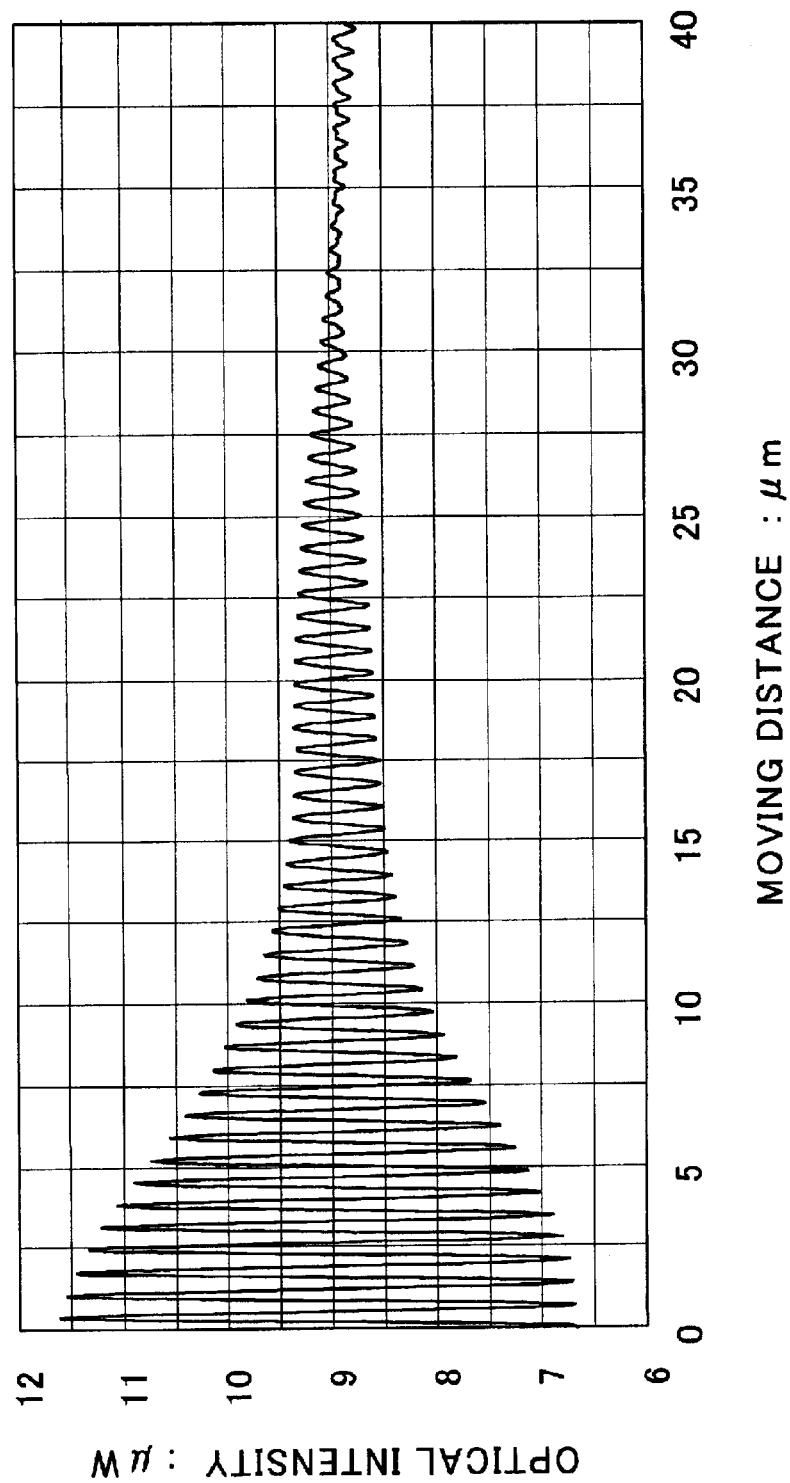
FIG. 5C illustrates real data of signal outputs of the optical power meter in the SLD light source applied when a load weight is applied in the optical reflection type Fabry-Perot optical fiber interference load cell in FIG. 1.
Figure 6A:
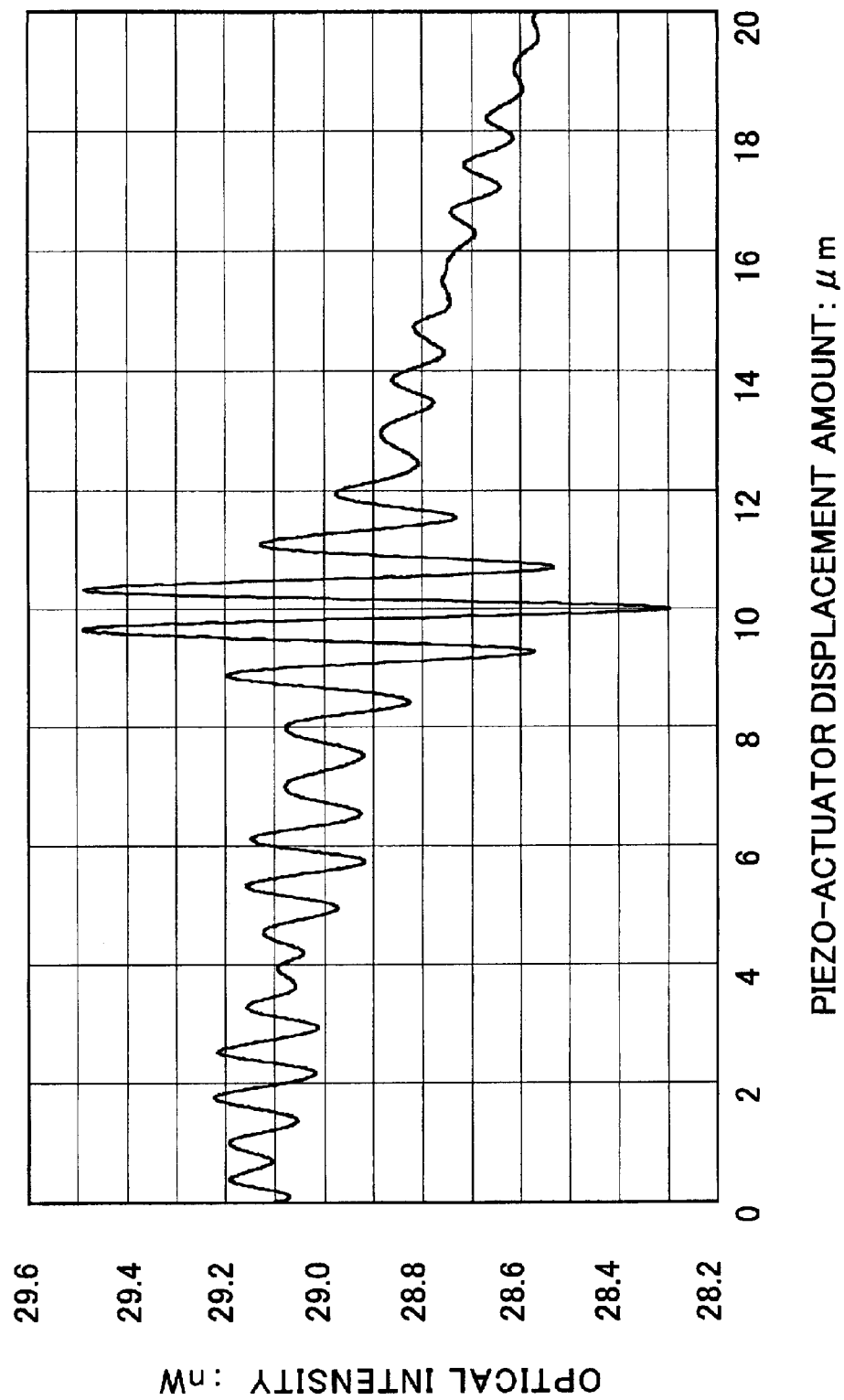
FIG. 6A illustrates the optical cross-correlation signal waveforms extracted from output signal data in time-series in regard to the light source of the tungsten halogen lamp in the optical reflection type Fabry-Perot optical fiber interference load cell in FIG. 1.
Figure 6B:
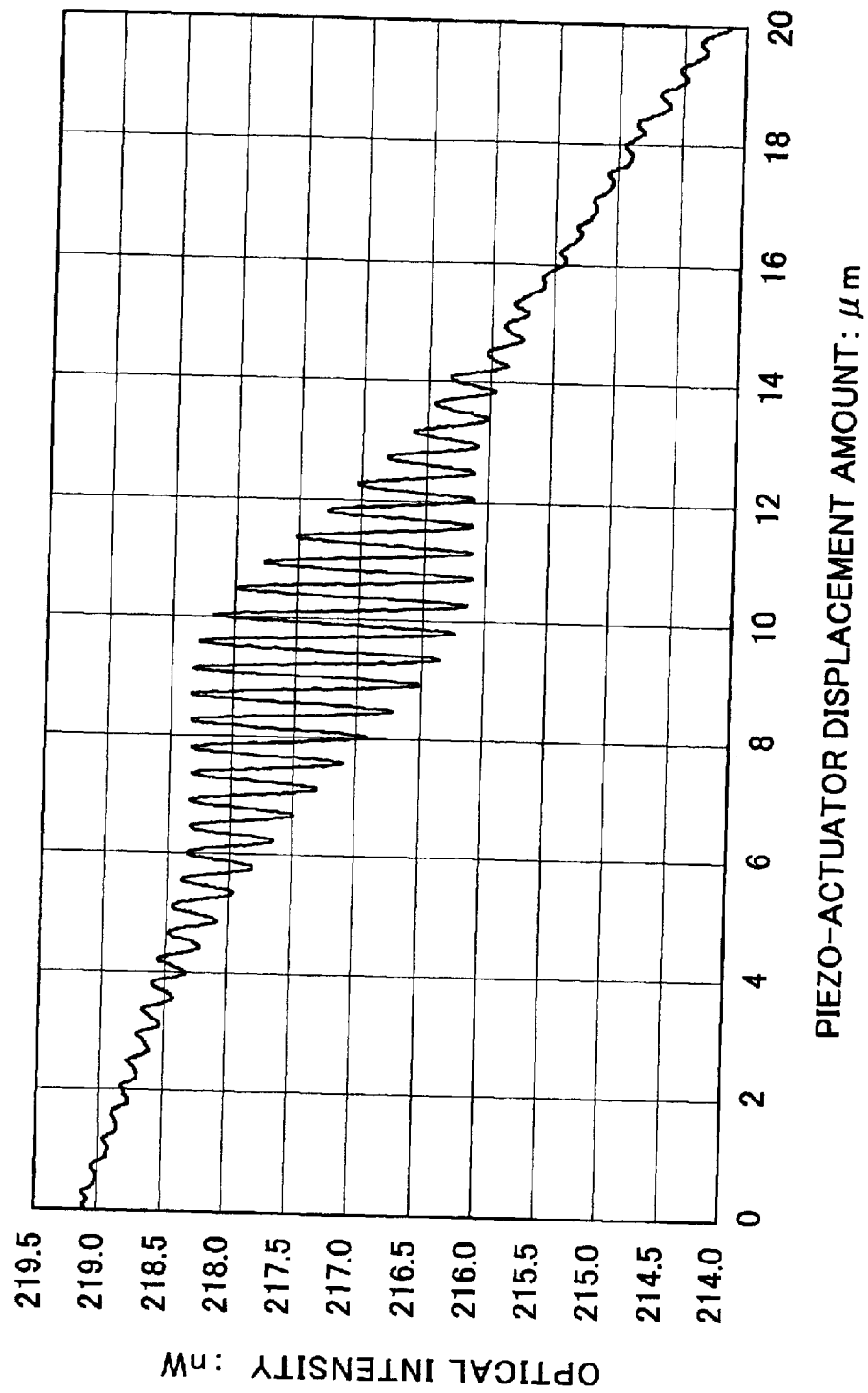
FIG. 6B illustrates the optical cross-correlation signal waveforms extracted from output signal data in time-series in regard to each of the LED light source in the optical reflection type Fabry-Perot optical fiber interference load cell in FIG. 1.
Figure 6C:
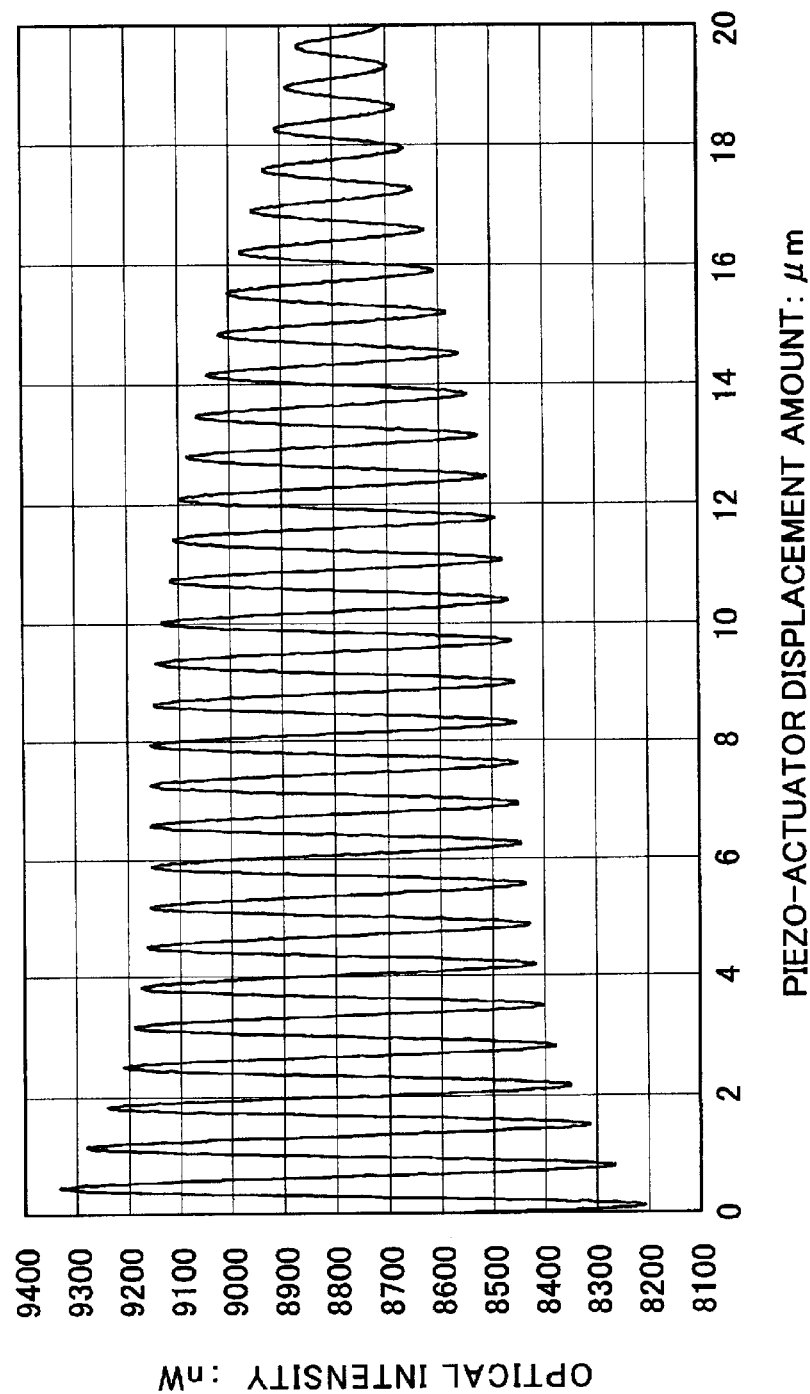
FIG. 6C illustrates the optical cross-correlation signal waveforms extracted from output signal data in time-series in regard to each of the SLD light source in the optical reflection type Fabry-Perot optical fiber interference load cell in FIG. 1.

In FIGS. 5A, 5B and 5C are indicated optical intensity signals in all scanning range including an interference of zero-pass length under an arrangement of different three light sources, i.e. FIG. 5A shows a tungsten halogen lamp, FIG. 5B shows LED, and FIG. 5C shows SLD, respectively. In addition, in FIG. 6A, FIGS. 6B and 6C are indicated enlarged optical correlation signal portions (near a moving distance 22 μm in FIGS. 5A, 5B and 5C, respectively). Although the background optical intensity is changed in response to a gap clearance variation caused by a load applied to the sensor and also to a gap clearance (a moving distance) of the variable gap type Fabry-Perot interferometer, this intensity is corrected by a method to be described later to enable a high precision sensor to be realized.

In the case that the light source having a wide range wavelength spectrum such as a tungsten halogen lamp and a white LED light source as shown in FIG. 4 is used in this sensor system, a quite localized optical correlation signal can be attained as apparent from FIGS. 6A and 6B. To the contrary, as apparent from FIG. 6C, the SLD light source has a long coherence length to cause the optical correlation signal to be expanded and at this sensor gap clearance, the interference signal of the zero-pass length and the optical correlation signal are overlapped to each other, resulting in that the signals can not be separated.

In turn, although the optical correlation signal is locally present in the LED light source, its coherence length is long as compared with that of the tungsten halogen lamp light source, it includes much amount of vibration components contained in the optical correlation signal, resulting in that it becomes necessary to perform a complicated signal processing for attaining a minimum value. To the contrary, in the case of the tungsten halogen lamp light source, a complicated waveform processing is not required and the minimum position of the optical correlation signal waveform can be easily detected and a sensor gap clearance can be calculated in a high precision manner within a short period of time.

Figure 3:
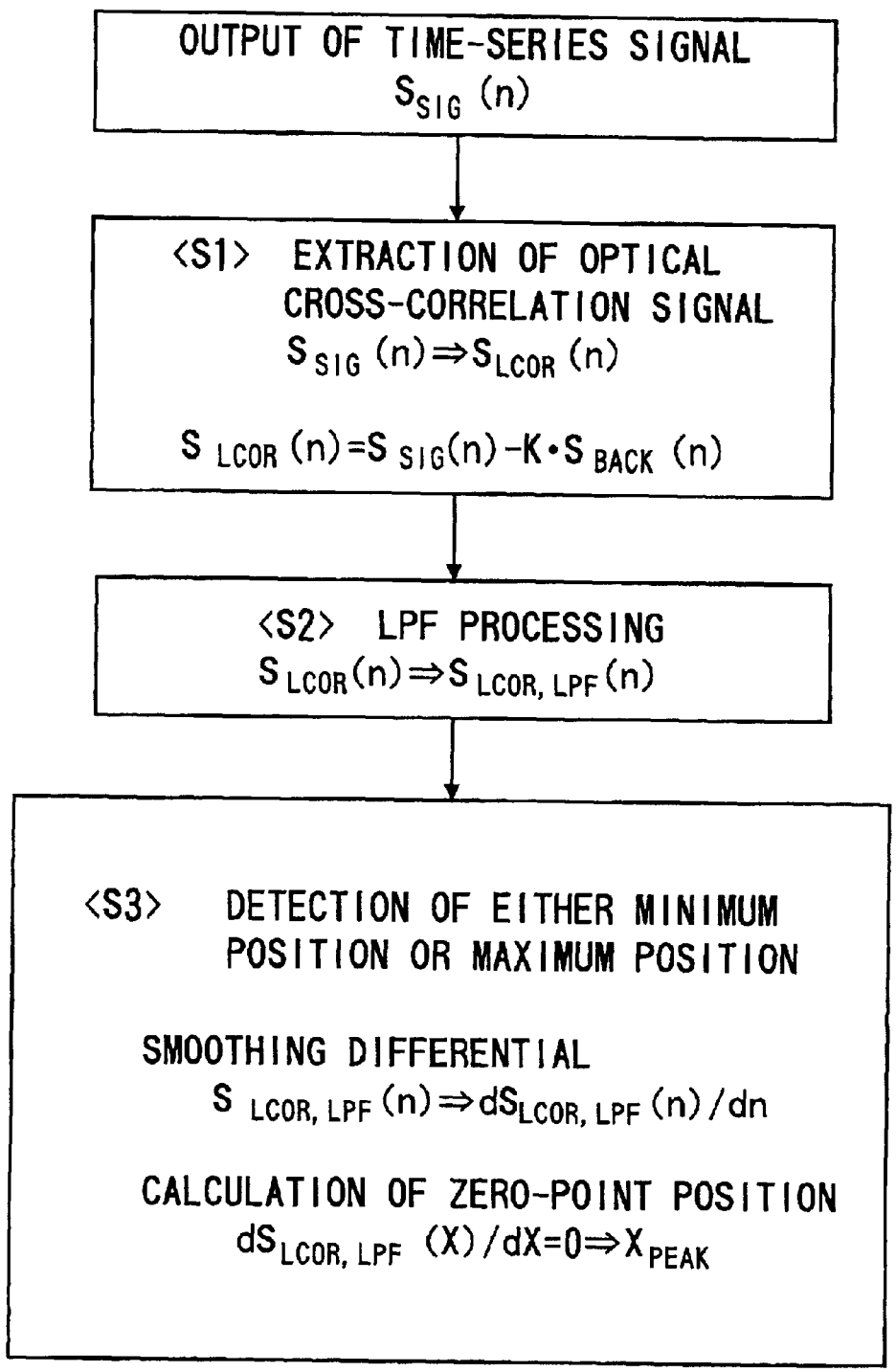
FIG. 3 is a flow chart for showing a flow of signal processing mainly at the signal processing part of the optical reflection type Fabry-Perot optical fiber interference load cell in FIG. 1.

Next, referring now to FIG. 3, there will be described as follows about a signal processing of the sensor in accordance with the method of the present invention in the signal processing part 12, mainly in the optical reflection type Fabry-Perot optical fiber interference load cell of the optical fiber interference sensor shown in FIGS. 1 and 2, respectively. FIG. 3 is a flow-chart for a signal processing, and in other words, this is a schematic diagram for showing schematically an algorism for the processing. In this case, the fact that the light source 1 having the wide range wavelength spectrum such as the tungsten halogen lamp light source and the white LED light source shown in FIG. 4 is used becomes substantially an important factor in the present invention.

Referring to FIG. 3, there will be described more practically the signal processing method for sensing the minimum optical correlation signal position in reference to the optical correlation signal output practical data of the optical power meter 10. In the following description, the output signal data is meant by the output signal data after it is A/D converted with the A/D converter 13, wherein the step Nos. such as "S1" and "S2" or the like denote a processing step indicated by applying the same symbol to FIG. 3.

<Step S1: Extraction of Optical Correlation Signal>

As apparent from FIGS. 5A, 5B and 5C and FIGS. 6A, 6B and 6C, the signal waveform contains a background signal varied in response to a variation of gap clearance under the load applied to the sensor and a gap clearance (a moving distance) of the variable gap Fabry-Perot interferometer 8a. A high precision sensor gap clearance measurement can be carried out by removing the background signal and by extracting only the optical correlation signal waveform having no biasing component.

Figure 7A:
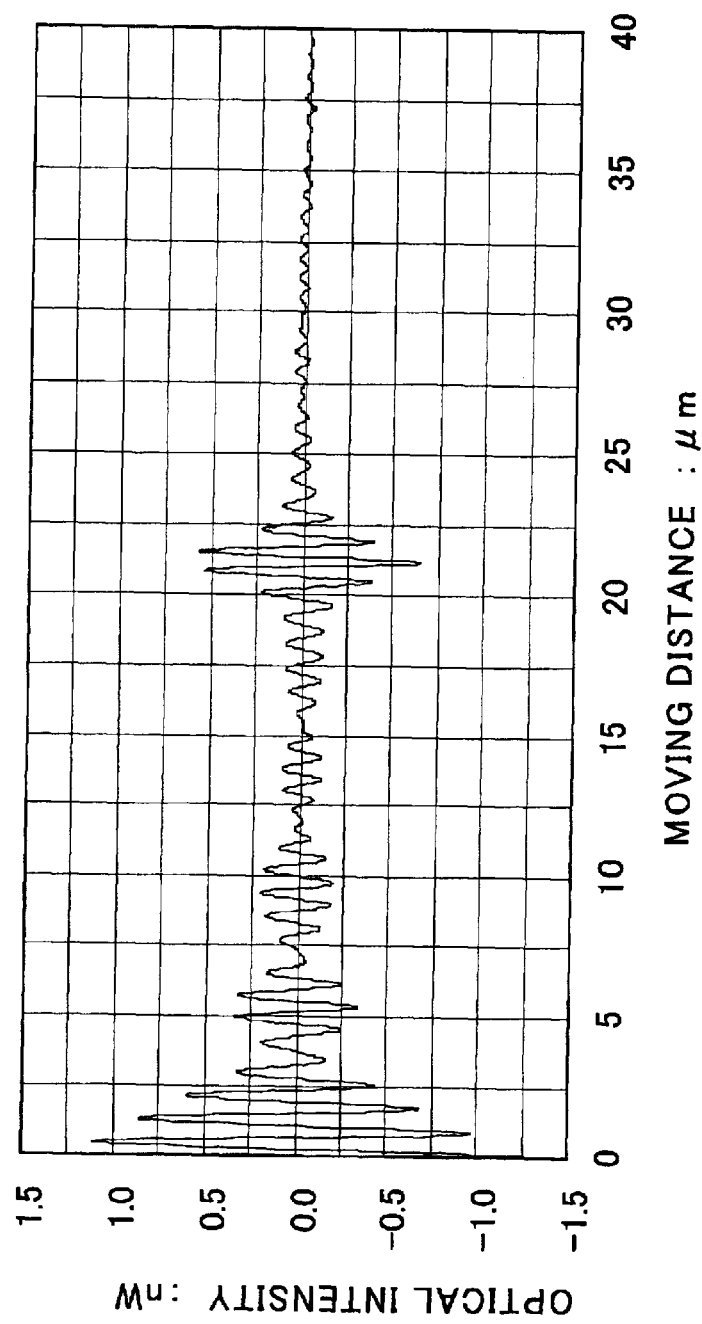
Figure 7B:
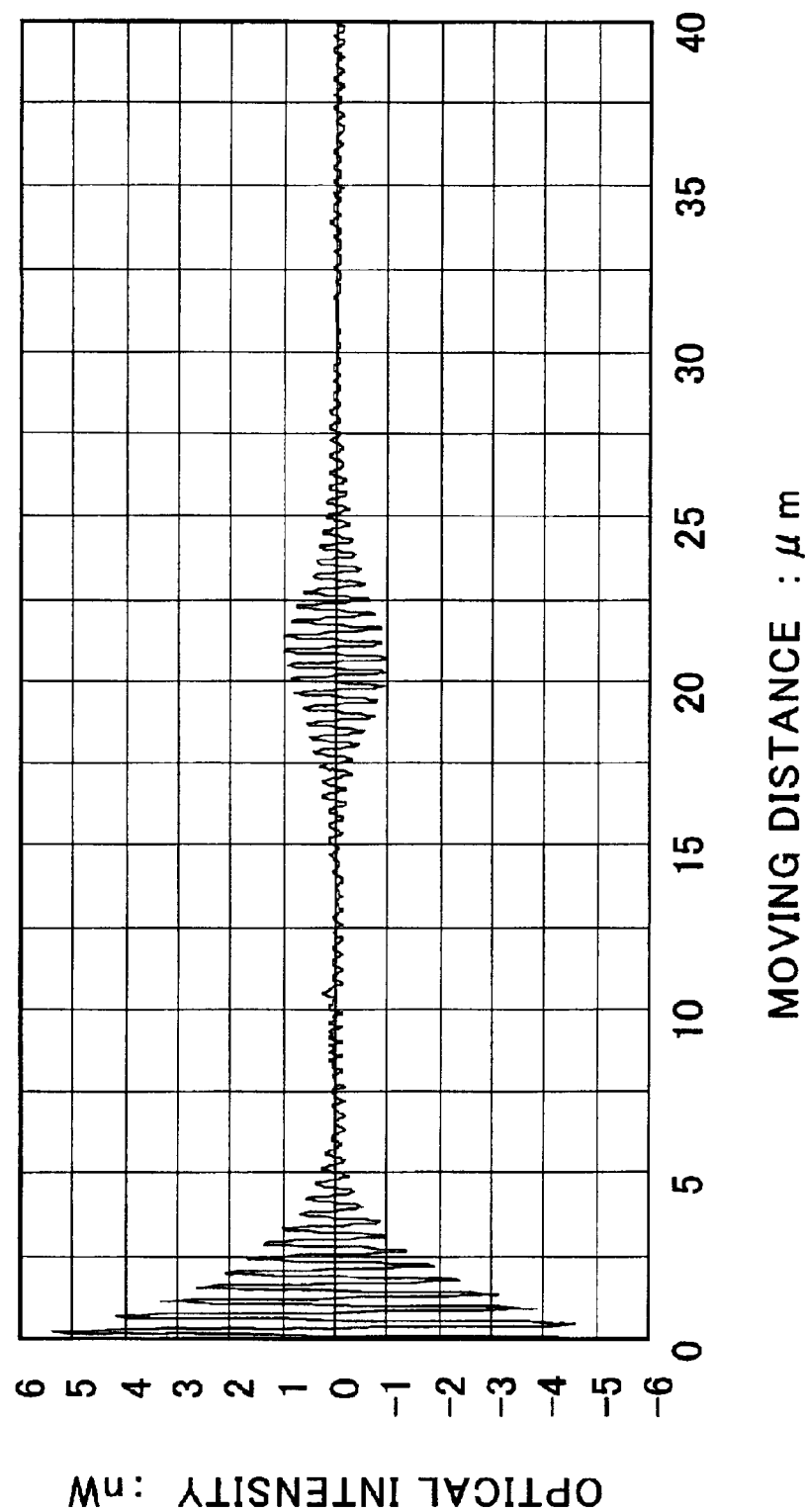
Figure 8A:
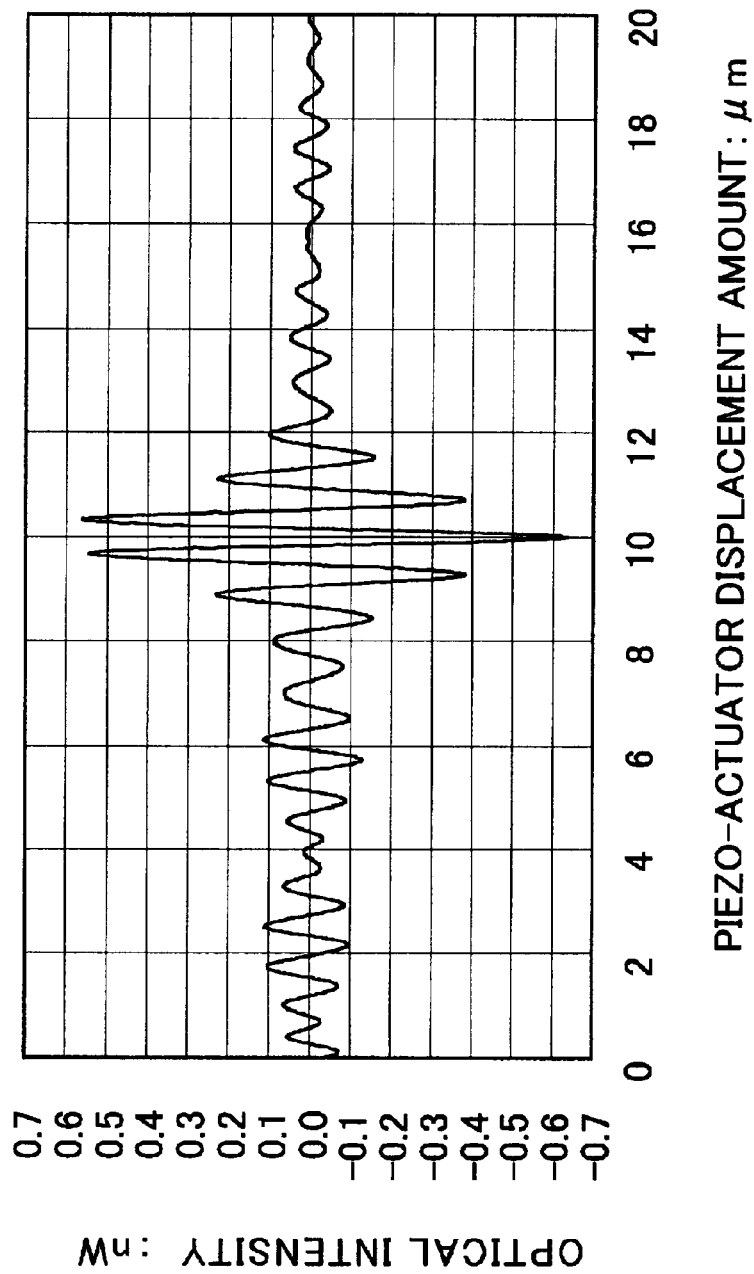
Figure 8C:
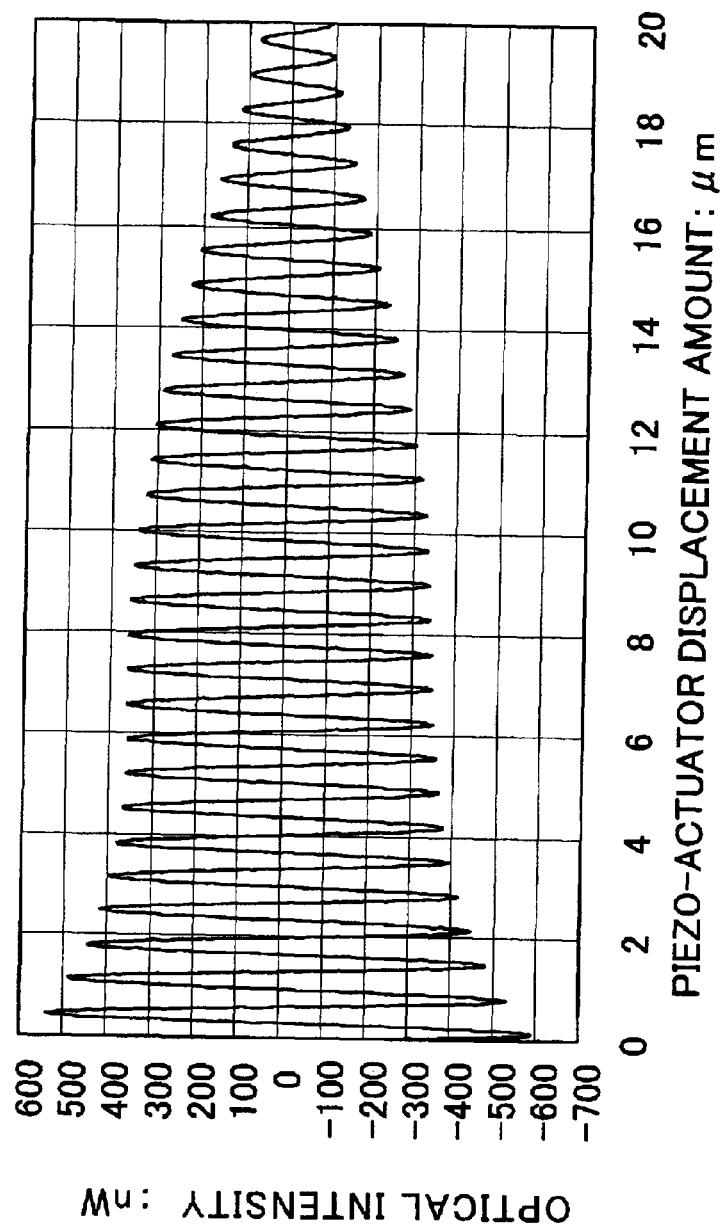

In FIGS. 7A, 7B and 7C and in FIGS. 8A, 8B and 8C are shown a process for extracting the optical correlation signal $[S_{LCOR}(n)]$ from the output signal data $[S_{SIG}(n)]$ in time-series, where (n) denotes a data No. of the signal data in time-series.

In order to extract the optical correlation signal, at first, a coefficient K is multiplied by the background signal $S_{BACK}(n)$ so as to cause it to be coincided with a low frequency fluctuation level of the signal output practical data where a load is added to the background signal level (signals $K \cdot S_{BACK}(n)$). After this operation, the level adjustment data is subtracted from the signal indicating the output signal practical data added with a load to extract the optical correlation signal $S_{LCOR}(n)$.

This process is expressed by a mathematical expression to read as follows.

$$S_{LCOR}(n) = S_{SIG}(n) - K \cdot S_{BACK}(n) \quad (2)$$

In this preferred embodiment, since the variable gap Fabry-Perot interferometer is used at the optical signal demodulation part, it is not necessary to condense the light spatially in a linear form as found in a wedge type Fabry-Perot interferometer (a Fizeau interferometer) and a background signal noise is relatively low. In view of this fact, the least square multinomial fitting was used for removing the background signal in this preferred embodiment. Further, in the case of performing this background signal removing processing, a high pass filter (HPF) processing may be used in place of the least square fitting.

The least square fitting is well known in the art as one of the methods for specifying the type of function and adapting the measured data to a curved line and this is widely utilized. That is, the least square fitting is a method in which the curved line is adapted in reference to a standard where a square sum of a certain reference value is made minimum. As the reference value, a square sum of difference between the data and the value estimated by an adapted curved line, i.e. a square sum of difference is taken, a coefficient of the curved line making it minimum, i.e. a fitting coefficient is calculated by calculation of numerical value.

In this case, this least square fitting is used for removing the background signal from the measured data. The optical correlation signal to be extracted is a component equally vibrated in an upward or downward direction in regard to a predetermined reference value. Accordingly, in the case that the background signal is overlapped on the optical correlation signal, a curved line expressing the background signal is calculated by the least square fitting to pick up a difference between it and the original signal, resulting in that an appropriate optical correlation signal can be attained. That is, the background signal $S_{BACK,FIT}(n)$ is estimated by the least square multinomial fitting. This $S_{BACK,FIT}(n)$ is a curved line expressing a background signal calculated in reference to the measured data under application of the least square fitting, and a curve equation (a multinomial) such as an equation (3), for example, is used.

$$S_{BACK,FIT}(x) = A_0 + A_1 \cdot x + A_2 \cdot x^2 + \ldots + A_{10} \cdot x^9 + A_{11} \cdot x^{10} \quad (3)$$

where, $A_m$ (m=0, 1, . . . , 10) is a coefficient of a curved line equation and it is calculated in reference to the measured data under application of the least square method. Then, $S_{LCOR}(n)$ was calculated under an assumption that $K \cdot S_{BACK}(n) = S_{BACK,FIT}(n)$ is applied in the equation (2).

Further, this optical correlation signal extraction can also be carried out not by dependent on this least square multinomial fitting, but by using the actual measured practical waveform data not contained in the measurement range of the sensor requiring the optical correlation signal and extracting this signal as the background signal in reference to the equation (2).

<Step S2: LPF Processing>

Then, in the case that much amount of high frequency non-required component are contained in the optical correlation signal $[S_{LCOR}(n)]$ extracted as described above, the high frequency non-required component is removed by a low pass filter (LPF). In the experiment, noise component is less in its amount, so that the LPF processing is not carried out.

<Step S3: Calculation of Minimum Position or Maximum Position>

As apparent from FIG. 8A, when the tungsten halogen lamp light source is used, a quite localized optical correlation signal waveform can be attained, so that it is not necessary to attain an envelope of the waveform and to calculate the minimum value of the envelope and further it is possible to specify the minimum value directly from either the optical correlation signal waveform or the signal having its high frequency non-required component removed. Due to this fact, it is not required to perform the signal processing such as a Hilbert transform and a high speed response of the sensor caused by reduction in the signal processing time can be realized.

As the simplest method for detecting either the minimum or maximum position (in this case, sensing of a valley position of the waveform, i.e. the minimum position), it is satisfactory to check in sequence its inclination, i.e. a difference between it and the value just before it along the optical correlation signal waveform and search for a position where an extreme value is found. If the waveform is a sufficient smooth waveform, either the minimum or maximum position can be detected through this method, although it is frequently found that a quite large number of extreme values appear due to influence of noise in the actual waveform. In such a case as above, it is necessary to apply a suitable smoothing processing also for a calculation of difference to attain an inclination of the waveform.

As the smoothing processing, various kinds of methods can be applied, although a smoothing differentiating method by Savitzky and Golay, for example, can be applied. In this case, a zero position of the smoothing differentiated signal waveform becomes an extreme value. Its details are described in a document entitled "Waveform Data Processing for Scientific Measurement" edited by Shigeo Minami, CQ Publishing Co., Ltd. (1986).

That is, the smoothing differentiating processing is carried out for attaining either the minimum or maximum position of the signal $[S_{LCOR,LPF}(n)]$ processed with LPF at the step S2. The smoothing differentiating processing is a method for calculating the differentiated waveform of the observed waveform, i.e. the measurement data in reference to a multinomial adaptation smoothing method, wherein the smoothing operation is also performed concurrently in the differentiated waveform to be calculated.

In this case, the multinomial adaptation smoothing method is one of the smoothing methods for removing the high frequency signal component from the observed waveforms and smoothing the waveform. A smoothing value of one measuring point is calculated by adapting it to a multinomial equation through a least square method using the measured values near both sides of this measuring point. This is calculated in sequence for every measuring point to calculate an entire smoothing waveform.

Then, the zero point position is calculated in signals in time-series differentiated in smoothing. That is, the point where the bipolar waveforms of the signals in time-series smoothing differentiated cross with a base line of level zero corresponds to either the minimum position or the maximum position.

Figure 9A:
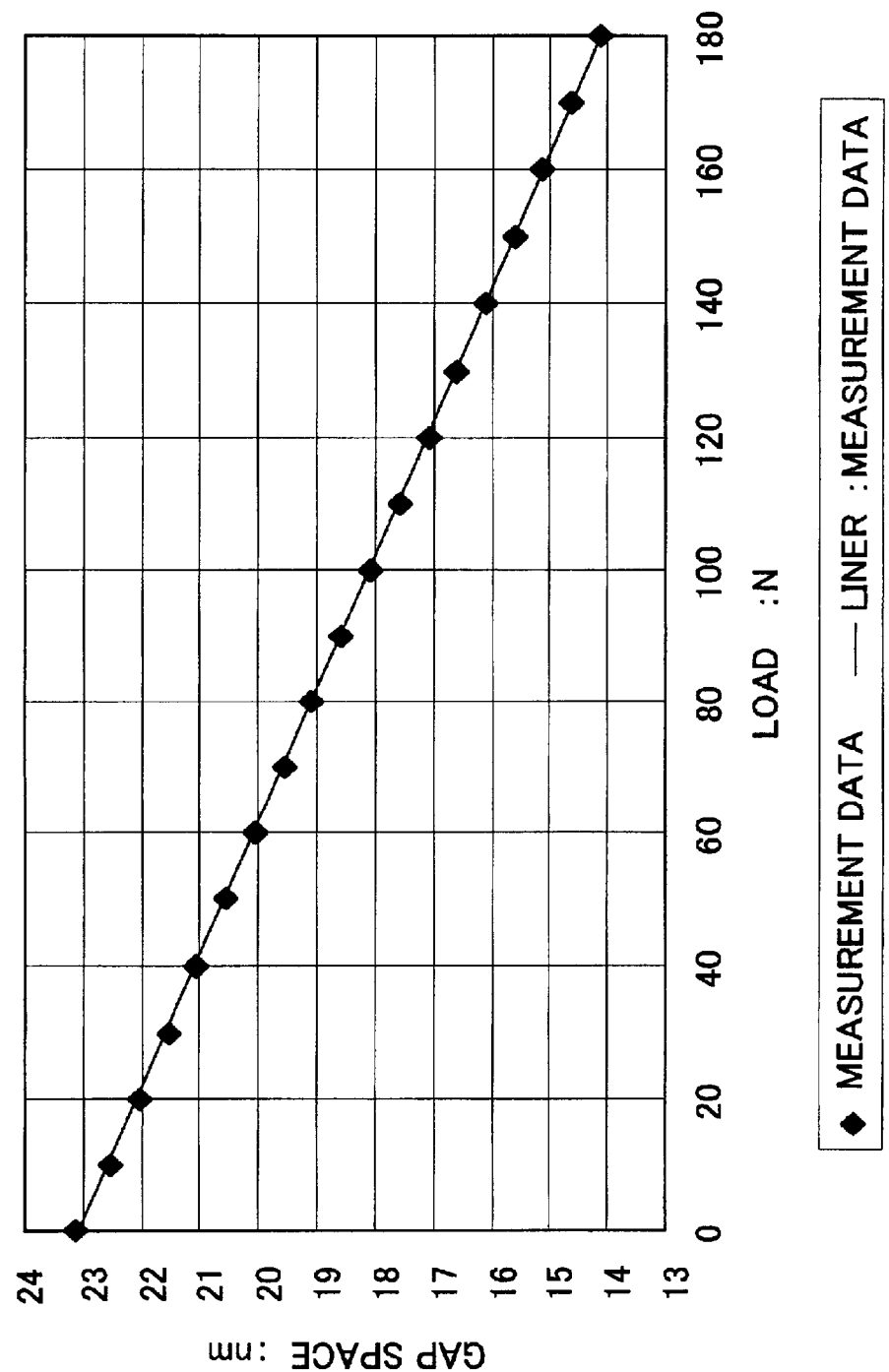

In FIG. 9 are shown a test and a result of data processing where the optical reflection type Fabry-Perot load cell is formed in trial in accordance with the aforesaid description, the aforesaid signal processing is carried out under application of the measuring system shown in FIG. 1 and either the minimum position or the maximum position of the optical correlation signal in regard to a load weight is attained.

The aforesaid method is not restricted to the configuration shown in FIG. 1, but application of either the wedge type Fabry-Perot interferometer (a Fizeau interferometer) or a Mickelson type interferometer as an interferometer at the signal demodulation part enables the operation similar to the aforesaid one to be carried out.

FIG. 10 shows a configuration of an optical fiber interference sensor system constituted as an optical reflection type Fabry-Perot optical fiber interference load cell in accordance with a second preferred embodiment of the present invention in which the wedge type Fabry-Perot interferometer is applied as an interferometer at the signal demodulation part.

In FIG. 10, the light source 1, the first optical fiber 2, [2×2] coupler 3, the second optical fiber 4, the third optical fiber 5, the Fabry-Perot load cell 6 and the fourth optical fiber 7 are similar to those shown in FIG. 1, and in place of the configuration of the signal demodulating part comprised of the variable gap Fabry-Perot interferometer 8, optical sensor 9 and optical power meter 10, there is provided a signal demodulating part comprised of a collimate lens 21, focusing lens 22, Fizeau interferometer 23, linear image sensor 24 and image sensor control part 25.

The A/D converter 11A and the signal processing part 12A in FIG. 10 are similar to the A/D converter 11 and the signal processing part 12 of FIG. 1 in their substantial function, although a signal format given by the linear image sensor 24 and the image sensor control part 25 is slightly different from an output of the optical power meter 10, so that they are deformed to perform a processing corresponding to the signal format.

That is, the fourth optical fiber 7 guides the modulated in wavelength optical signal inputted from the Fabry-Perot load cell 6 to [2×2] coupler 3, to the collimate lens 21 at the optical signal demodulation part from the fourth port of the [2×2] coupler 3 and causes it to be incident.

The collimate lens 21 collimates the light incident from the fourth optical fiber 7. The focusing lens 22 is comprised of a cylindrical lens and the like, for example, so as to cause the light collimated by the collimate lens 21 to be condensed in a linear manner and incident to the Fizeau interferometer 23. These collimate lens 21 and the focusing lens 22 constitute a light condensing optical system for condensing light flux radiated from the extremity end of the fourth optical fiber 7.

The Fizeau interferometer 23 is a wedge type Fabry-Perot interferometer forming a wedge, i.e. a wedge-like gap, wherein the partial reflection surfaces do not form any gap while their parallel planes being oppositely faced, but the partial reflection surfaces are oppositely faced with an inclination angle of minute angle, thereby the gap clearance is gradually changed by displacement. This Fizeau interferometer 23 is arranged such that a linear direction of light condensed by the focusing lens 22 is coincided with a slant direction, i.e. the linear direction is crossed at a right angle with an equal gap line.

At the Fizeau interferometer 23, the light condensed in a linear manner multi-reflects at each of the positions of the wedge-like gap to generate an optical correlation with a wavelength spectrum characteristic and the optical intensity becomes minimum at a position where the gap coincides a clearance size of the gap at the Fabry-Perot load cell 6. The Fizeau interferometer 23 can be manufactured by applying two parallel planer substrate plates of which double-surfaces are ground, for example, forming a film of partial reflection film composed of inductor thin film or the like at one surface of each of these parallel planer substrates, oppositely facing these partial reflection films and abutting them to each other with a fine line being held at one end to form a wedge-like gap.

As the linear image sensor 24, a linear CCD (a charge-coupled device) image sensor, i.e. a CCD line sensor, for example, is applied to detect a position where an optical intensity becomes minimum by the Fizeau interferometer 23 in a linear light image condensed by the focusing lens 22. In this case, the CCD line sensor moves in sequence an electrical charge generated by light radiated against an array light receiving part arranged in a linear manner, like BBD (a bucket brigade device), by giving a clock signal to an electrode arranged there, and takes it out as an electrical signal in sequential manner. Accordingly, the outputs of the CCD line sensor become time-series signals. Since the signals are read out in sequential, as a scan rate is higher, a high-speed response becomes possible.

The image sensor control part 25 drives and controls the linear image sensor such as a CCD line sensor or the like and outputs image information in lines, i.e. the optical intensity distribution information along a straight line in time-series. This image sensor control part 25 stores a timing generator (not shown) and supplies a timing signal such as an operating clock or the like to each of the segments within the linear image sensor 24, the A/D converter 11A and the image sensor control part 25, for example. This image sensor control part 25 becomes a CCD control part when the linear image sensor 24 is a CCD line sensor, for example. The linear image sensor 24 executes reading and outputting the image information in response to a timing signal supplied from the timing generator at the image sensor control part 25.

The image sensor control part 25 operates in accordance with a timing signal such as a clock of the timing generator, and is constituted by a pre-amplifier/clamp circuit for amplifying and clamping an input signal; a correlation double sampling circuit for correlation double sampling the clamped signal; an off-set adjustment part for adjusting an off-set of the correlation double sampled signal; and a gain adjustment circuit for adjusting a gain of output and the like.

The A/D converter 11A converts the image information read by the linear image sensor 24 and processed by the image sensor control part 25 into digital information in response to a timing signal supplied from the timing generator at the image sensor control part 25.

The signal processing part 12A processes the signal A/D converted by the A/D converter 11A to attain a result of measurement. The signal processing part 12A extracts a desired optical correlation signal from a signal in time-series attained through the image sensor control part 25 from the linear image sensor 24, removes the high frequency noise component of the optical correlation signal by low-pass filter processing and attains either the minimum or maximum position of the signal through smoothing differentiation and zero-cross sensing and the like.

Figure 11:
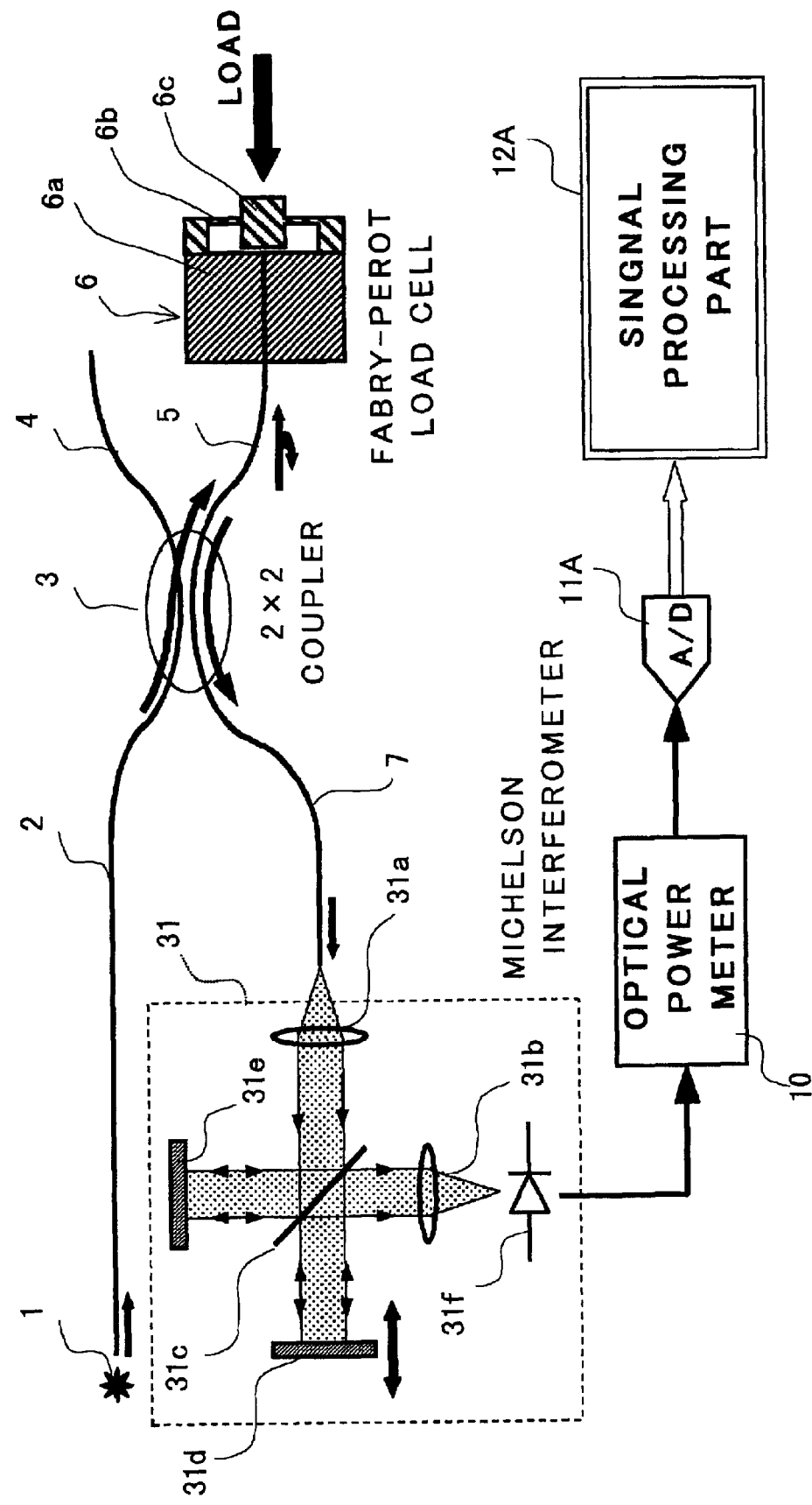
FIG. 11 is a block diagram for showing a configuration of the optical reflection type Fabry-Perot optical fiber interference load cell using a Mickelson interferometer in accordance with a third preferred embodiment of the present invention.

FIG. 11 shows a configuration of the optical fiber interference sensor system constituted as an optical reflection type Fabry-Perot optical fiber interference load cell in accordance with a third preferred embodiment of the present invention with the interferometer at the signal demodulating part being applied as a Mickelson interferometer.

In FIG. 11, the light source 1, the first optical fiber 2, the [2×2] coupler 3, the second optical fiber 4, the third optical fiber 5, the Fabry-Perot load cell 6, the fourth optical fiber 7 and the optical power meter 10 are similar to those shown in FIG. 1 and there is provided a Mickelson interferometer 31 in place of the configuration comprised of variable gap Fabry-Perot interferometer 8 and optical sensor 9 as shown in FIG. 1.

The Mickelson interferometer 31 has a first lens 31a, a second lens 31b, a beam splitter 31c, a first mirror 31d, a second mirror 31e and an optical sensor 31f.

The Mickelson interferometer 31 operates such that an incident light (an output light from the optical fiber 7) is at first changed into a parallel light with the first lens 31a and the light is branched into two directions by the beam splitter 31c where they are crossed to each other at a right angle. Each of the branched lights is reflected by the first mirror (a reflection mirror) 31d and by the second mirror 31e and returns back again to the beam splitter 31c. The two lights returned back to the beam splitter 31c overlap to each other and incident to the optical sensor 31f. One of the mirrors, the second mirror 31d, for example, is moved by a Piezo-actuator (not shown), thereby an optical correlation signal similar to that described above can be attained at a location near the part where an optical path difference between the two branched optical paths corresponds to the gap clearance of the Fabry-Perot load cell 6 acting as a sensor. This optical correlation signal is given from the optical sensor 31f to the optical power meter 10.

The optical power meter 10 measures the output of the optical sensor 31f of the Mickelson interferometer 31. Further, the A/D converter 11A and the signal processing part 12A in FIG. 11 may be similar that shown in FIG. 10.

Next, referring to the drawings, the optical fiber interference sensor in accordance with a fourth preferred embodiment of the present invention will be described in detail as follows.

The optical fiber interference sensor in accordance with the fourth preferred embodiment of the present invention takes a signal acting as a background where the optical correlation signal is separated from a measuring range (a rated range of the sensor) for a calibration of sensor, performs a processing of a series of signals on the basis of that data, removes the non-required signals such as a low frequency fluctuation and noise or the like and realizes a high precision sensor measuring system. In the case of the optical fiber interference sensor, it takes the load characteristic data having a wider range than the measured range at the time of calibration and utilizes data in the measurement range as the background data. This method has some advantages that a high precision measurement system can be realized through adjustment of the convenient optical system and a cost reduction can be attained.

Referring to FIGS. 10 and 2, there will be described a configuration of an optical fiber interference sensor constituted as the optical reflection type Fabry-Perot optical fiber interference load cell in accordance with a fourth preferred embodiment of the present invention. FIG. 10 schematically shows an entire configuration of the fourth preferred embodiment and although a practical configuration of the signal processing part is similar to that shown in FIG. 2, function and configuration of the signal processing part 12 are different from that of the former one, so that the differing points will be mainly described.

That is, the optical power meter 10 and the executing content of a program written into the program memory 124 in the configuration of the signal processing part 12 shown in FIG. 2 are different from that of the aforesaid first or second preferred embodiment.

In place of the aforesaid optical power meter 10, it is assumed that this is described as an image sensor control part 10.

That is, the image sensor control part 10 drives and controls the optical sensor 9 such as a linear image sensor like CCD line sensor or the like to output the line-like image information, i.e. the optical intensity distribution information along the straight line in a time-series basis. As shown in FIG. 2, this image sensor control part 10 stores the timing generator 10a, and supplies a timing signal such as an operation clock or the like to each of the segments in the optical sensor 9, the A/D converter 11 and the image sensor control part 10, for example. If the optical sensor 9 is the CCD line sensor, for example, this image sensor control part 10 becomes a CCD control part. The optical sensor 9 executes both reading and outputting of the image information in response to the timing signal supplied from the timing generator 10a of the image sensor control part 10.

The image sensor control part 10 is comprised of a pre-amplifier/clamp circuit operated in accordance with a timing signal such as a clock of the timing generator 10a or the like and amplifying and clamping an input signal, for example; a correlation double sampling circuit for correlation double sampling the clamped signal; an off-set adjusting part for adjusting the offset of the correlation double sampled signal; and a gain adjustment circuit for adjusting a gain of the output and the like.

The A/D converter 11 converts image information read by the optical sensor 9 and processed at the image sensor control part 10 into digital information in response to a timing signal supplied from the timing generator 10a of the image sensor control part 10.

The signal processing part 12 processes the signal A/D converted by the A/D converter 11 to attain a result of measurement. The signal processing part 12 extracts the desired optical correlation signal from the signal of time-series attained from the optical sensor 9 through the image sensor control part 10, removes the high frequency noise component of the optical correlation signal through a low pass filter processing, removes the low frequency non-required component through a least square fitting method, removes the high frequency non-required component and the low frequency non-required component, converts its output by a Hilbert transform and shifts its phase by 90°. A square root of square sum of a signal having the non-required component removed and an output having its phase shifted by 90° is calculated in reference to a signal having the high frequency non-required component and the low frequency non-required component removed and a signal shifted by 90° by a Hilbert transform, an envelope component attained by removing the high frequency non-required component by low-pass filter processing is differentiated to attain a zero-cross point where the differentiated value crosses with the level zero.

Then, referring to FIG. 2, there will be described about each of the segments constituting the fourth signal processing part 12.

DSP (a digital signal processor) 121 executes a series of signal processing (refer to the flow chart in FIG. 12 and the schematic diagram of processing in FIG. 13) in accordance with the flow of program written in the program memory 124. DSP 121 may access as desired the data memory 122 and the calibration data memory 123 during the stage of execution of the signal processing. In place of this DSP 121, a similar function may be executed under application of the general-purpose MPU (a micro processor unit).

The data memory 122 is constituted by a RAM (a random access memory), for example, wherein various kinds of digitalized image information data given from the A/D converter 11 and intermediate data related to the signal processing operation of the DSP 121 are stored by access operation of the DSP 121. The calibration data memory 123 is constituted by EPROM (an erasable programmable read only memory), for example, so as to store calibration data acting as a background for measurement of the Fabry-Perot load cell 6 constituting a Fabry-Perot interferometer. The program memory 124 may store in advance a program in which DSP 121 may execute a series of digital processing shown in FIG. 12 or FIG. 13.

The display 125 may display a result of processing at DSP 121 as well as information generated in cooperation with the processing so as to provide them to a user as information as desired in regard to the processing at DSP 12. D/A converter 126 converts the result of processing of the DSP 121 as well as information generated in regard to the processing from a digital value to an analogue value and outputs it.

That is, the series of digital signal processing at the signal processing part 12 are executed by the DSP 121 while accessing the data memory 122 and the calibration data memory 123 as required properly in accordance with a flow of processing written into the program memory 124.

In the following description, a configuration of the measurement system used in the case of indicating the actual measured data will be described.

Figure 14:
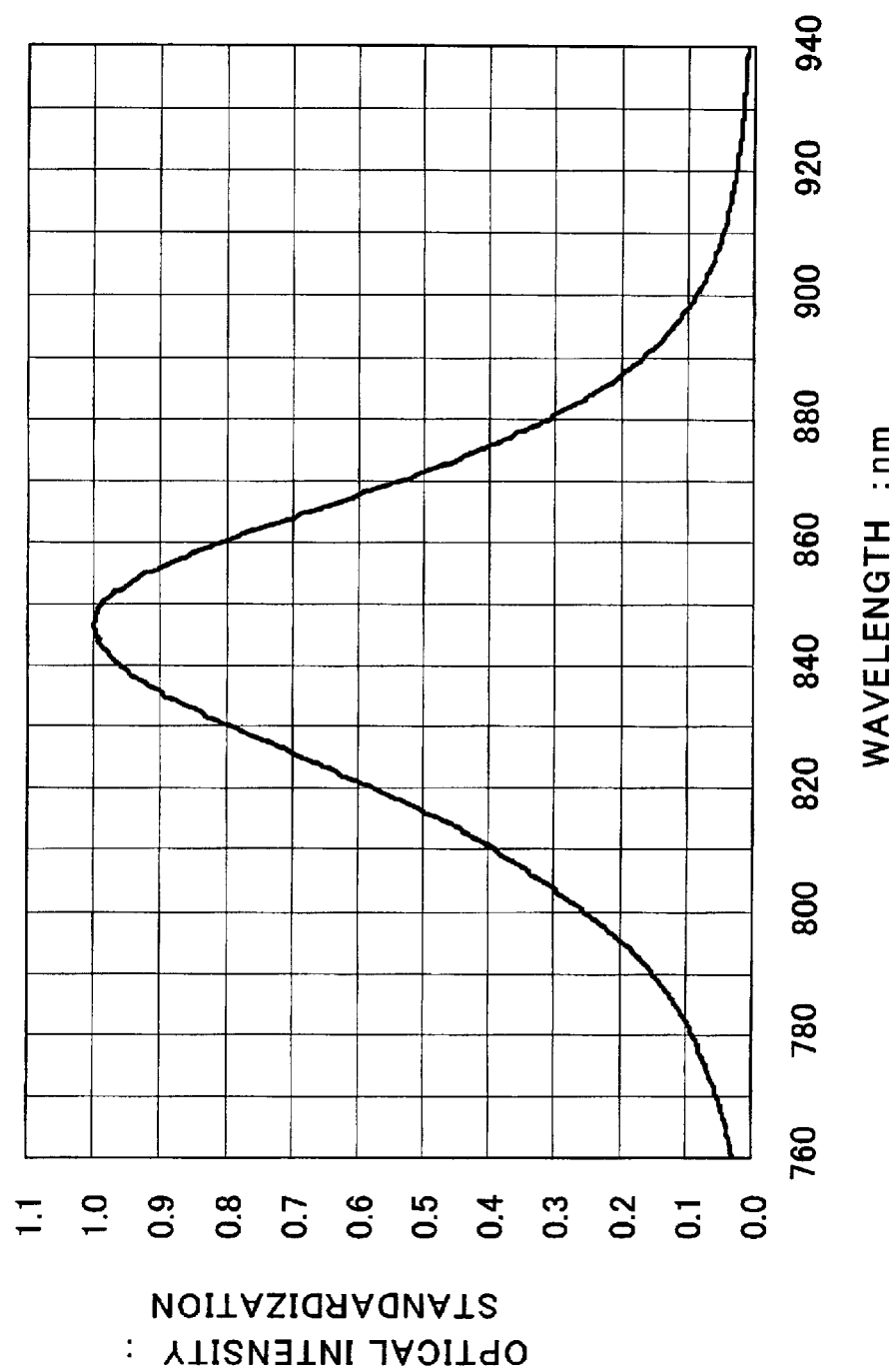
FIG. 14 is a wavelength spectrum diagram for showing a wavelength component distribution after the optical fiber for the light emitting diode (LED) is wave guided to act as a light source used in measurement of the optical reflection type Fabry-Perot optical fiber interference load cell in FIG. 10.

At first, a summary of the sensing system will be described. As the low coherence light source applied as the light source 1, LED (a light emitting diode) (L7560 [HAMAMATSU]) with a central wavelength of about 850 nm and a semi-value width of about 60 nm was used. In FIG. 14 is illustrated a wavelength spectrum after the optical fiber (G150/125, NA=0.12) of LED used in this actual measurement is wave guided.

As the optical sensor 9, the linear CCD with 5,000 pixels (KLI-5001E[Kodak: trademark]) and its evaluation board (KLI-5001EB[Kodak]) was used. In addition, as the A/D converter 11 for A/D converting the output signal from the optical sensor 9, the A/D converter (ADC-150A[KYOWA], 12 Bit, 200 kHz) with the number of quantization bits of 12 bits and a sampling frequency of 200 kHz was used. Output of the A/D converter 11 was inputted into the PC (a personal computer) acting as the signal processing part 12 through GBIB general-purpose interface.

When the actual measured data were measured, a similar signal processing was carried out under application of PC in place of DSP 121. That is, the signal taken into the PC was executed by making the signal-processing program to be described later in accordance with the present invention under application of an application development software (LabVIEW[NATIONAL INSTRUMENTS]).

As already described above, when a certain load is applied to the Fabry-Perot load cell 6, the diaphragm 6b is deformed, the gap clearance size is changed and the load is calculated by detecting the gap clearance variation. In this case, the Fabry-Perot load cell 6 actually applied for measurement is displaced by about 3 μm in respect to 9.807N (1 kgf).

In addition, the Fizeau interferometer 10 was made such that the two parallel planer substrate plates with a degree of parallelism of 5" or less in double-surface ground to have a plane precision degree of λ/10 were used, a partial reflection film composed of an inductor thin film was formed at one surface of each of the plates, the partial reflection film surfaces were oppositely faced to each other and the wedge-like gap was formed with a fine line being held at one edge.

Figure 13:
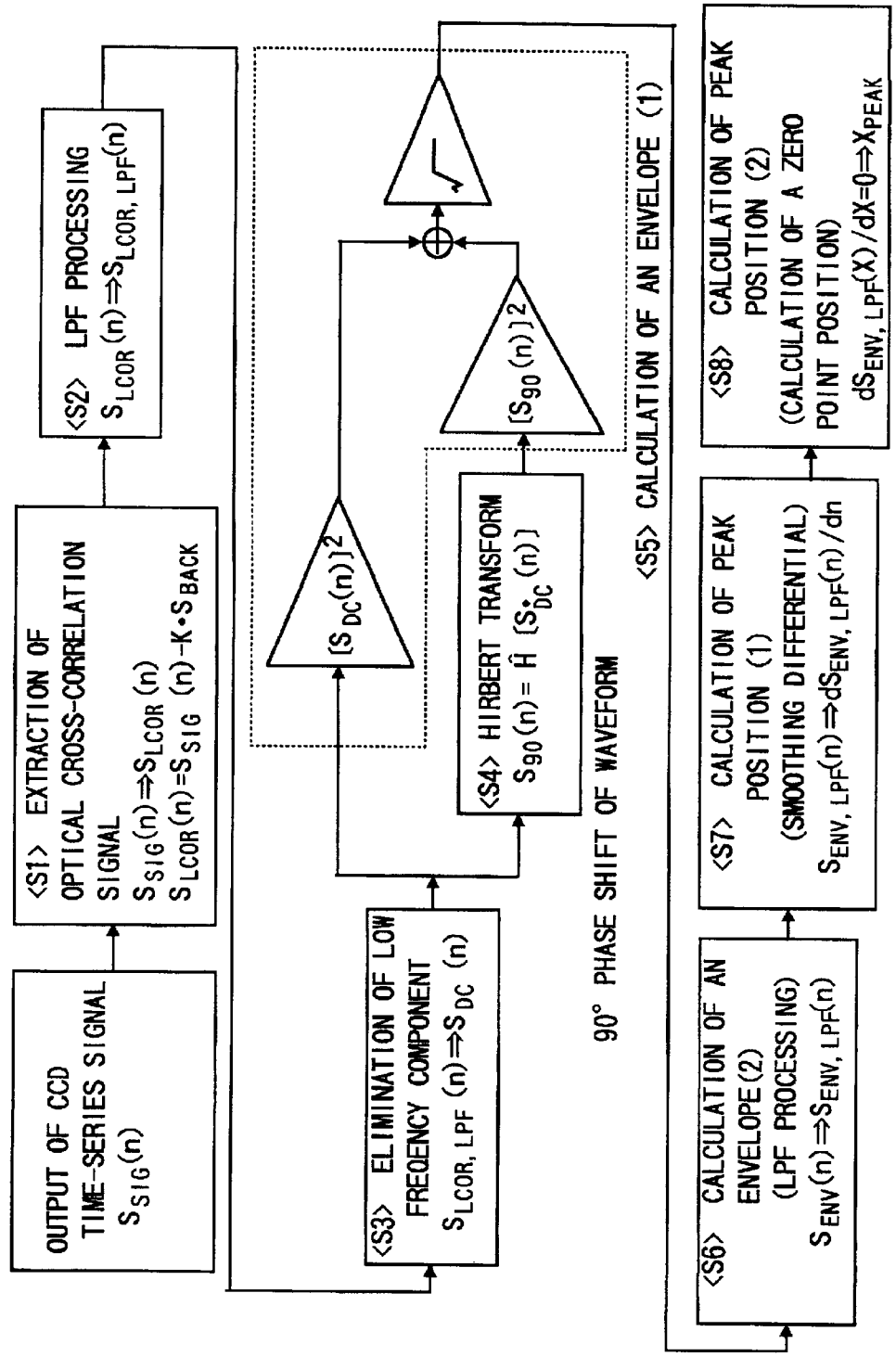
FIG. 13 is a schematic block diagram for showing an algorism of signal processing mainly at a signal processing part while a configuration of the optical reflection type Fabry-Perot optical fiber interference load cell is being employed in a fourth preferred embodiment.

Then, referring to FIGS. 12 and 13, there will be described a calibration of a sensor and a signal processing of the sensor in accordance with the method of the present invention mainly at the signal processing part 12 of the optical reflection type Fabry-Perot optical fiber interference load cell acting as the optical fiber interference sensor shown in FIGS. 10 and 2. FIG. 12 is a flow chart of a signal processing operation and FIG. 13 is a schematically showing a processing algorism. Each of the processing blocks in FIG. 13 corresponds to each of the processing steps in FIG. 12 and a common reference symbol in FIG. 12 is also applied to FIG. 13.

Figure 15:
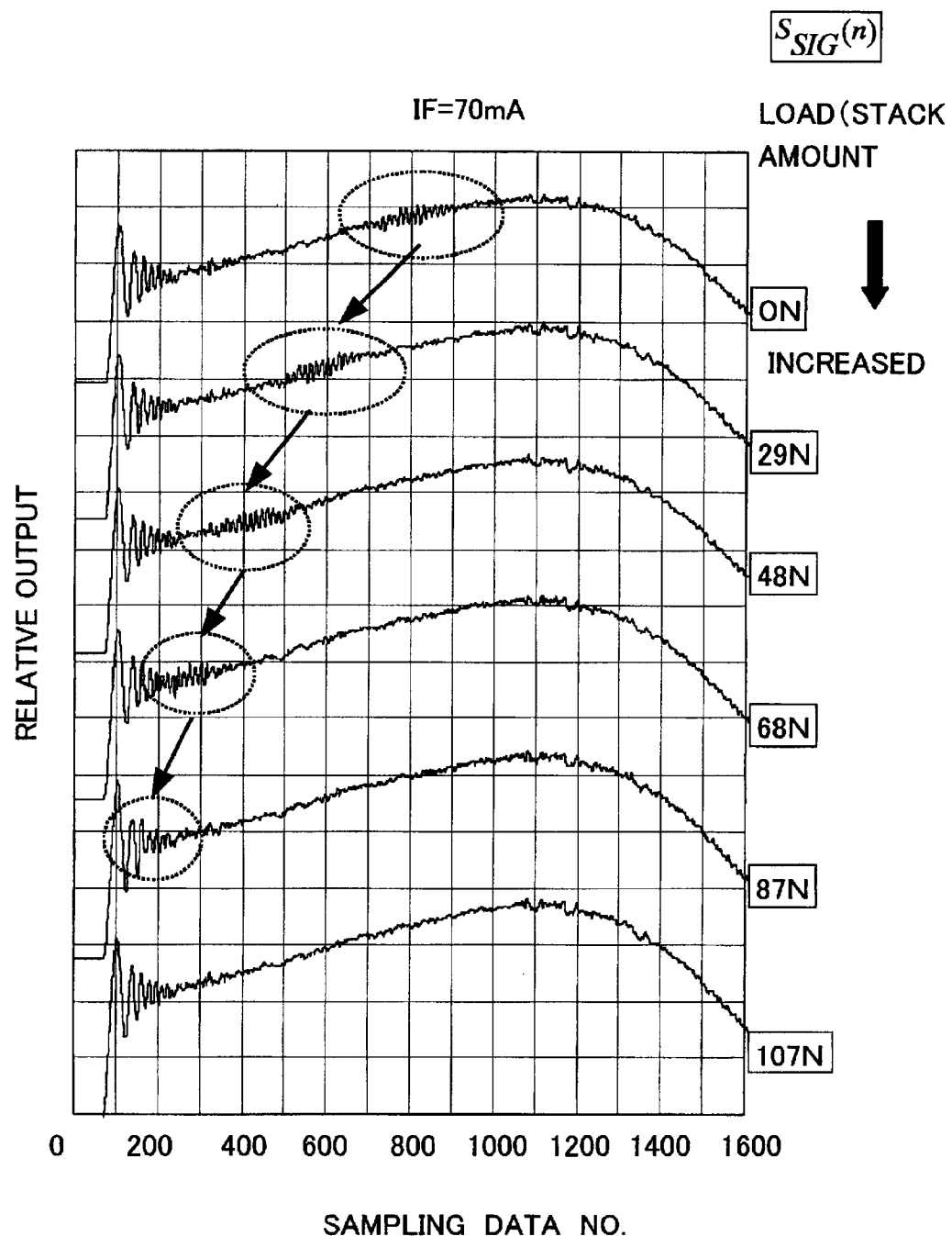
FIG. 15 is a view for showing actual data of signal outputs of a linear image sensor with CCD (a capacitance-coupled device) when a load weight is applied to the Fabry-Perot load cell without performing a fine adjustment in alignment of the optical system in the optical reflection type Fabry-Perot optical fiber interference load cell in FIG. 10

In FIG. 15 are indicated some practical data of signal outputs of the linear image sensor 24 using CCD, for example, when a load weight is applied to the Fabry-Perot load cell 6 acting as an optical reflection type Fabry-Perot optical fiber interference load cell and measured without performing any fine adjustment for alignment in an optical system such as the light condensing optical system including the collimate lens 21 and the focusing lens 22 constituting the measuring system. In FIG. 15, it is apparent that the portion enclosed by the broken line corresponds to the desired optical correlation signal and this is moved along with an increasing of the weight.

However, as apparent from FIG. 15, a large amount of non-required signal components such as low frequency fluctuation and noise or the like are included in signal output data of the linear image sensor 24 using CCD and so it is hard to detect the peak position of the optical correlation signal as it is.

In view of this fact, the present invention has employed a signal processing in which the optical correlation signal is extracted from the signal output data of the linear image sensor 24 using the aforesaid CCD or the like and a high precision measurement is realized.

That is, no optical correlation signal is contained in the signal output practical data of the linear image sensor 24 using the CCD of the weight load 107N in FIG. 15. In view of this fact, this signal is written in advance in the calibration data memory 123 comprised of EPROM or the like as the background data having no optical correlation signal and then it is used for the extraction of optical correlation signal in the signal processing to be described later. This processing is an important point of the present invention.

Then, referring to FIGS. 12 and 13, there will be described more practically the signal processing for detecting the peak position of the optical correlation signal from the output signal practical data of the optical sensor 9 using a CCD. In the following description, the output signal data of the optical sensor 9 using a CCD indicates the output signal data after A/D converted by the A/D converter 11, wherein each of the step Nos. "S1" and "S2" or the like indicates a processing step denoted by the same reference symbols in FIGS. 12 and 13, respectively.

<Step S1: An Extraction of an Optical Correlation Signal>

Figure 16:
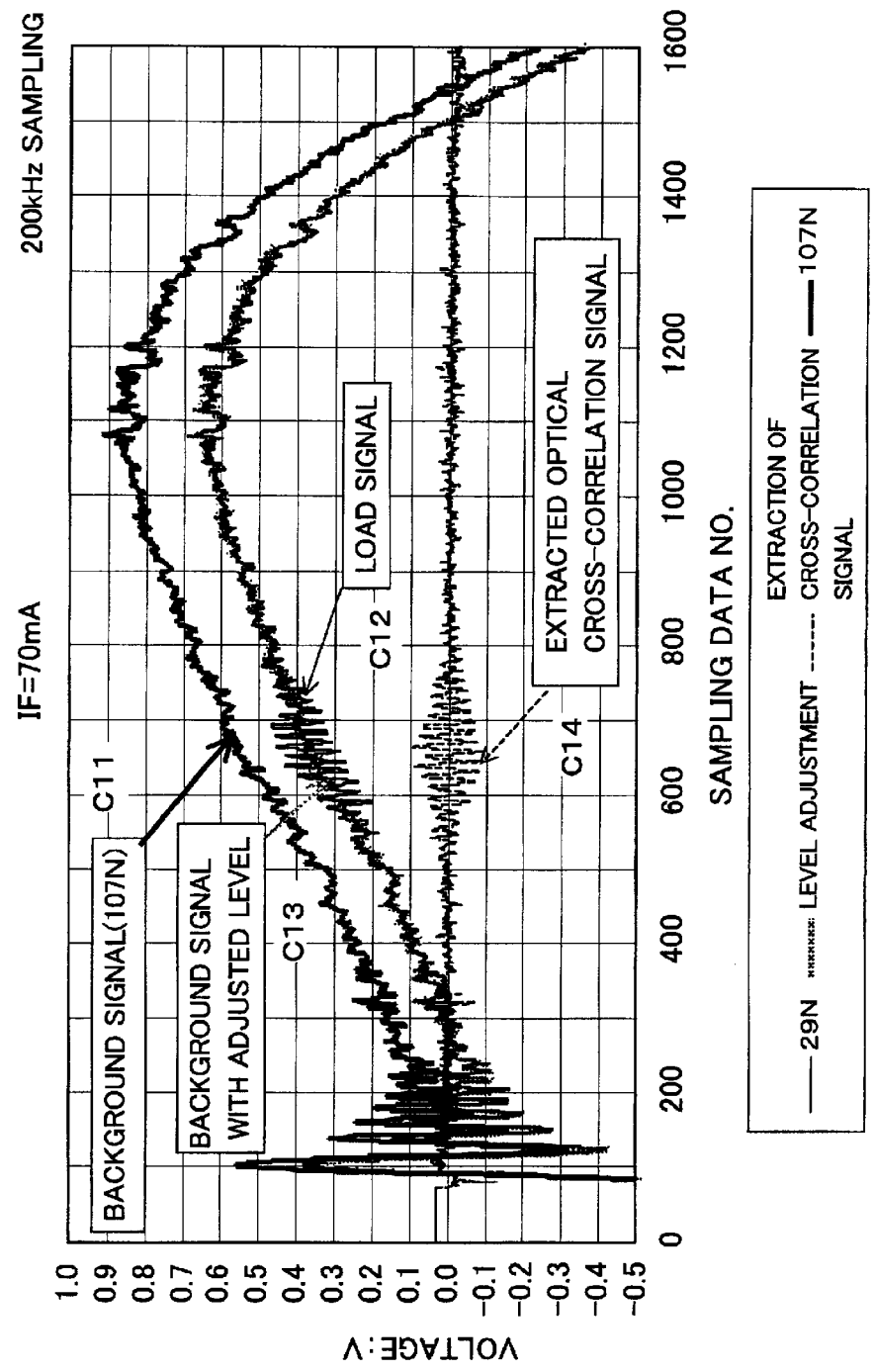
FIG. 16 is a view for showing a process for extracting an optical correlation signal from an output signal data of the CCD linear image sensor in time-series in the optical reflection type Fabry-Perot optical fiber interference load cell in FIG. 10.

In FIG. 16 is indicated a process for extracting the optical correlation signal $[S_{LCOR}(n)]$ from the output signal data $[S_{SIG}(n)]$ of the optical sensor 9 in time-series, wherein (n) denotes a data No. of the time-series signal data.

In FIG. 16, the time-series data (107N)$[S_{BACK}(n)]$ indicated by a curved line C11 is a data not containing any optical correlation signal described above, wherein this signal is written in advance into the calibration data memory 123 as a background signal and this is used when the optical correlation signal extraction is carried out from the signal output data of the optical sensor 9 when the load is applied. Even if the optical correlation signal is included in the signal acting as a background signal, it is satisfactory to move it out of the measuring range on the basis of the rated range of the sensor by applying the load more than the rated value, for example, and it is not necessary to set it to a state in which the signal is completely eliminated from the time-series signal as described above. That is, when the calibration is carried out, the load characteristic data of the wider range than the measurement range is taken and written in advance into the calibration data memory 123 comprised of EPROM or the like and the data in the measurement range is utilized as background data.

In FIG. 16, a signal (29N) indicated by a curved line C12 shows the output signal practical data $S_{SIG}(n)$ of the CCD linear image sensor 11 when the load is applied, i.e. the load signal becoming the original data extracting the optical correlation signal.

In order to extract the optical correlation signal, at first, a coefficient K is multiplied by a background signal $S_{BACK}(n)$(107N) indicated by a curved line C11 and a level of the background signal is coincided with a low frequency fluctuation level of the signal output practical data of the optical sensor 9 added with the load (the signal $K\text{\AA}ES_{BACK}(n)$ having its level adjusted indicated by a curved line C13 in FIG. 7).

After this operation, a level adjustment data indicated by the curved line C13 is subtracted from a signal (29N) at the curved line C12 indicating an output signal practical data of an optical sensor 9 applied with a load and then an optical correlation signal $S_{LCOR}(n)$ indicated in a curved line C14 is extracted.

This process is expressed with a mathematical equation as indicated by an equation (4):

$$S_{LCOR}(n)=S_{SIG}(n)-K \cdot S_{BACK}(n) \qquad (4)$$

Figure 17:
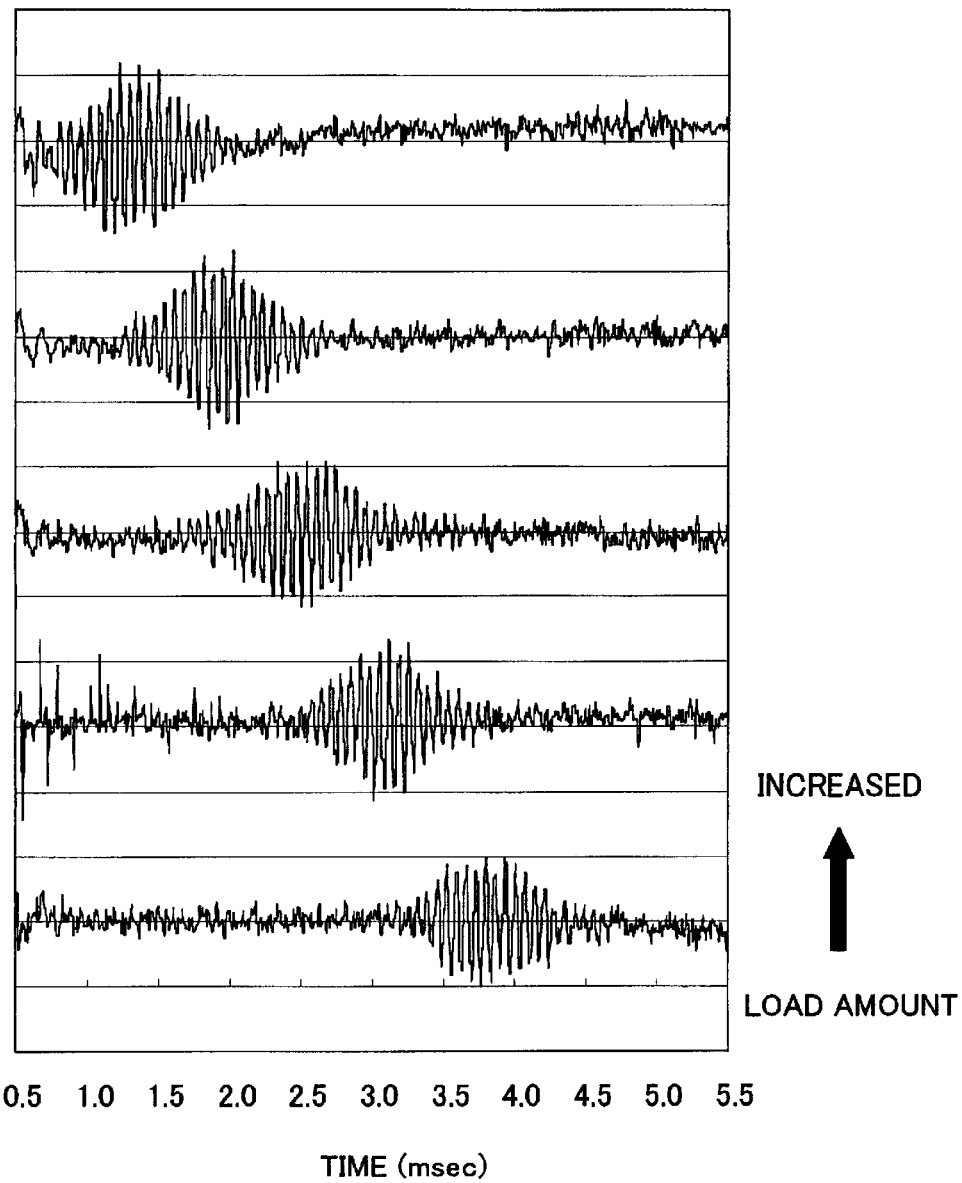
FIG. 17 is a view for showing a variation in optical correlation signal extracted from a signal output actual data of the linear image sensor when a load weight shown in FIG. 15 is applied and measured at the optical reflection type Fabry-Perot optical fiber interference load cell in FIG. 10.

In FIG. 17 is indicated a variation of the optical correlation signal $S_{LCOR}(n)$ extracted by the aforesaid method from the signal output practical data of the optical sensor 9 when the measurement is performed under application of the load weight as found in FIG. 15. It is apparent that the position of the optical correlation signal is changed in response to a size of the load. In this case, the coefficient K is adjusted in compliance with a level of output signal when measured.

Figure 18C:
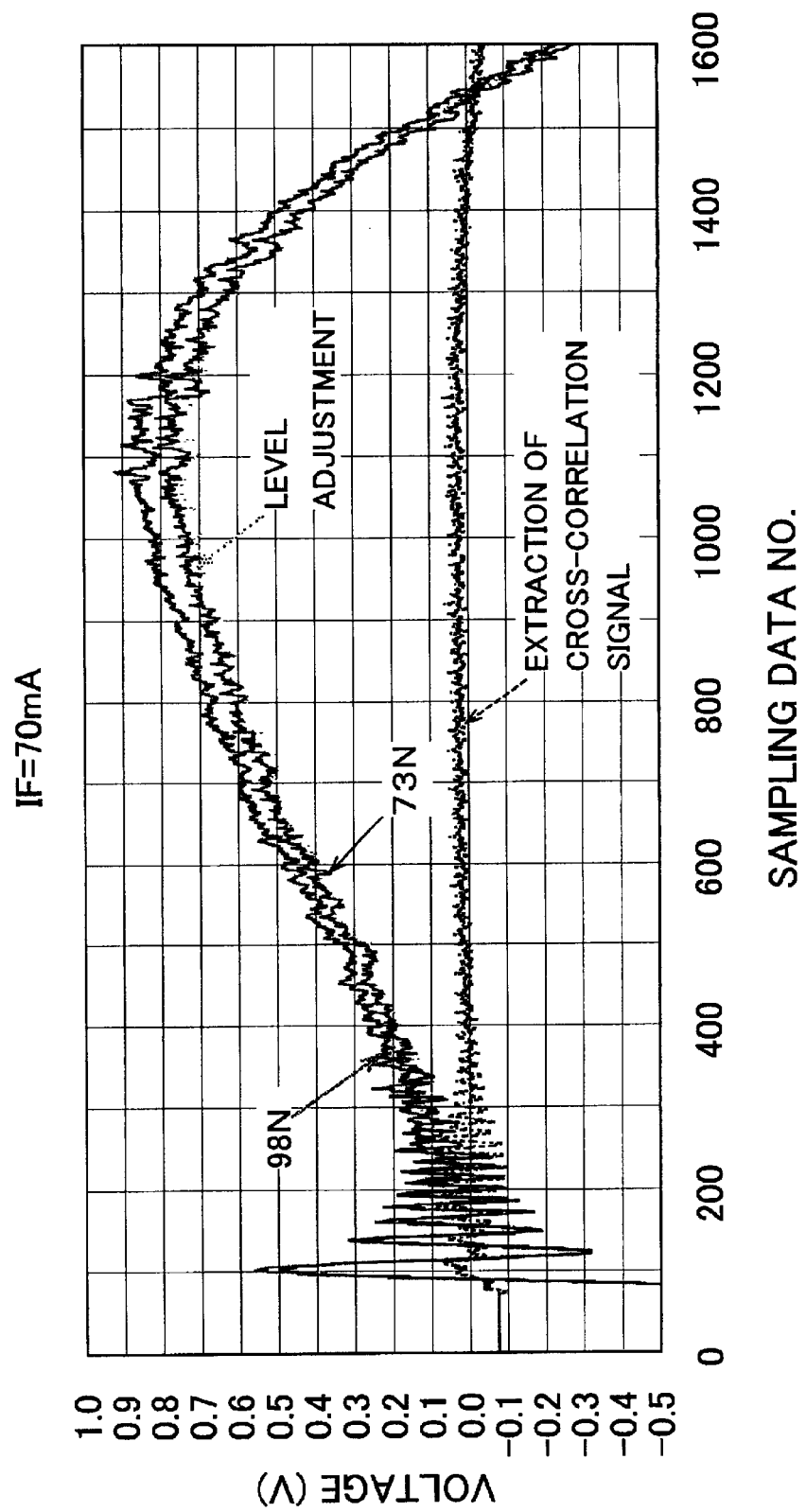
FIG. 18C is a view for showing an optical correlation signal extraction process against the loads in the optical reflection type Fabry-Perot optical fiber interference load cell in FIG. 10 with the load at being 73.

In FIGS. 18A, 18B and 18C is indicated a waveform during the optical correlation signal extracting process against a size of each of the loads when the loads are made different, respectively.

<Step S2: LPF Processing>

Figure 19:
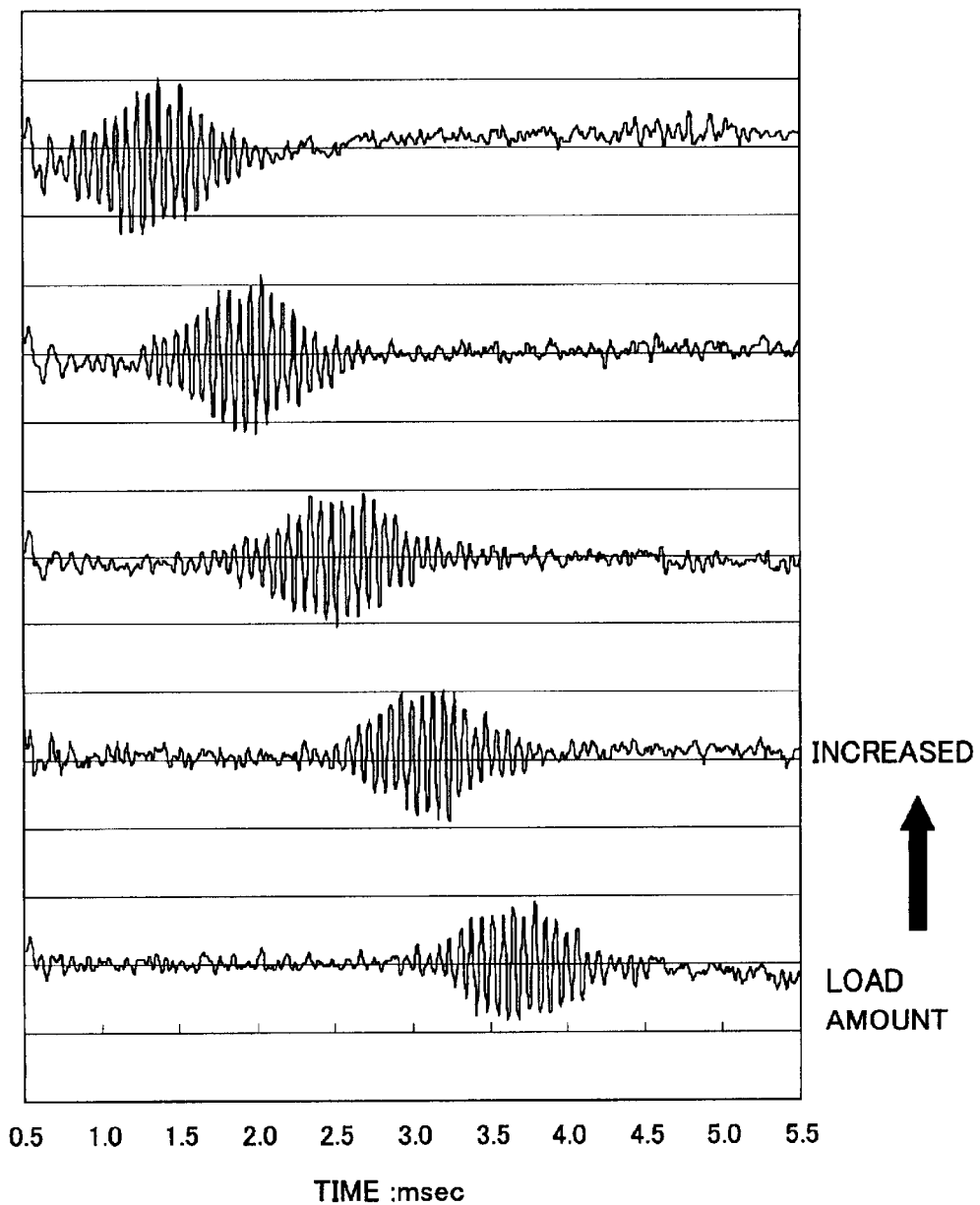
FIG. 19 is a view for showing an optical correlation signal against a plurality of different load amounts with a high frequency component being removed in the optical reflection type Fabry-Perot optical fiber interference load cell in FIG. 10.

Next, the high frequency non-required component of the optical correlation signal [$S_{LCOR}(n)$] extracted by a method as described above is removed by LPF (a low pass filter). In FIG. 19 is indicated an optical correlation signal [$S_{LCOR, LPF}(n)$] against a plurality of different load amounts with the high frequency component being removed through the LPF processing.

<Step S3: Removal of a Low Frequency Component>

The low frequency components of the optical correlation signal [$S_{LCOR, LPF}(n)$] which are processed with LPF at the step S2 are removed by the least square, i.e. the least square fitting [$S_{DC}(n)$]. Further, in order to perform this low frequency component removing process, an HPF (a high pass filter) may be used in place of the least square fitting.

It is well known in the art that the least square fitting is one of the methods for specifying a form of function and adapting the measured data to a curved line and this is widely utilized. That is, the least square fitting is a method for adapting a curved line in reference to a standard in which a square sum of a certain reference value is made minimum. As the standard value, a square sum of difference between data and value estimated by an adapted curved line, i.e. a square sum of difference is calculated, a coefficient of the curved line making it minimum, i.e. a fitting coefficient is attained by calculation of numerical value.

Figure 33A:
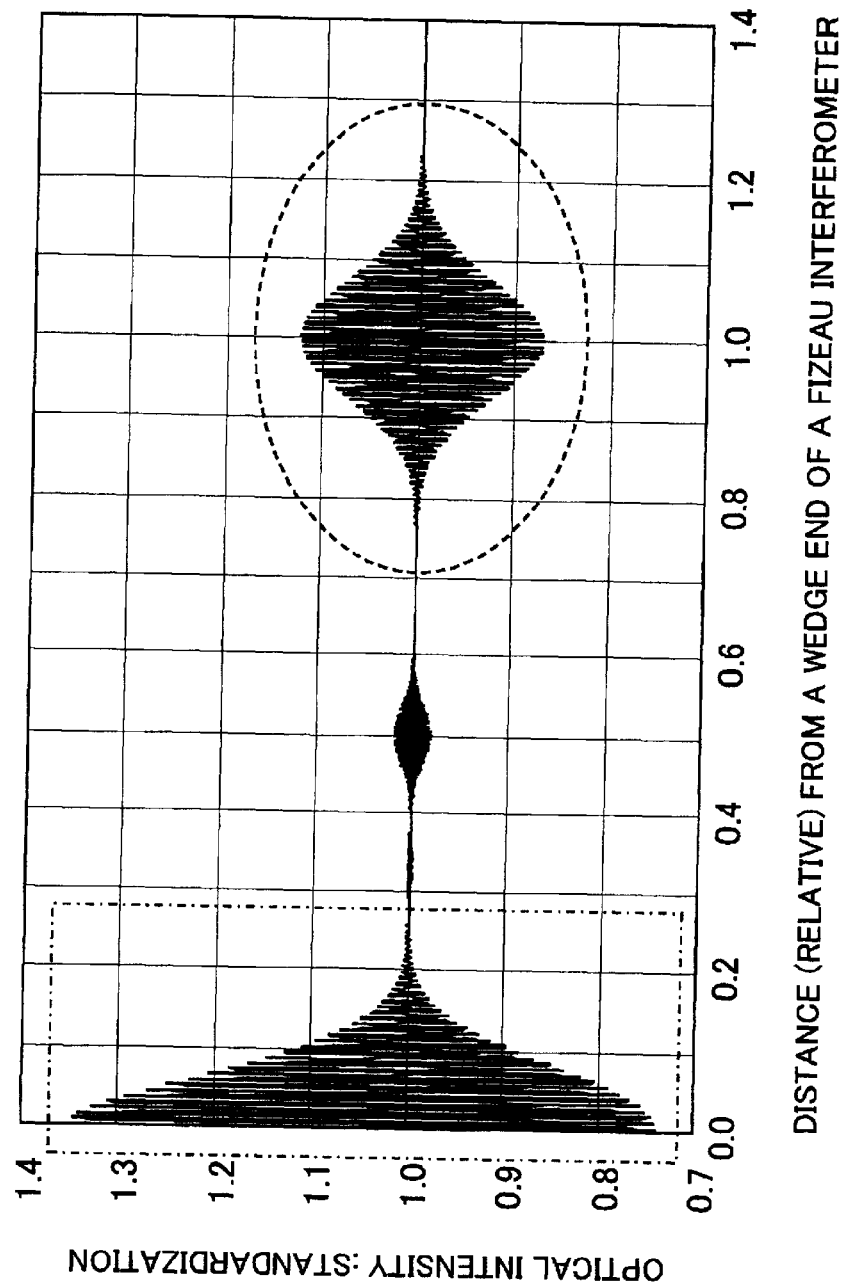
FIG. 33A is a view for showing an output example in which a signal output at the sensor measuring system is simulated.
Figure 34A:
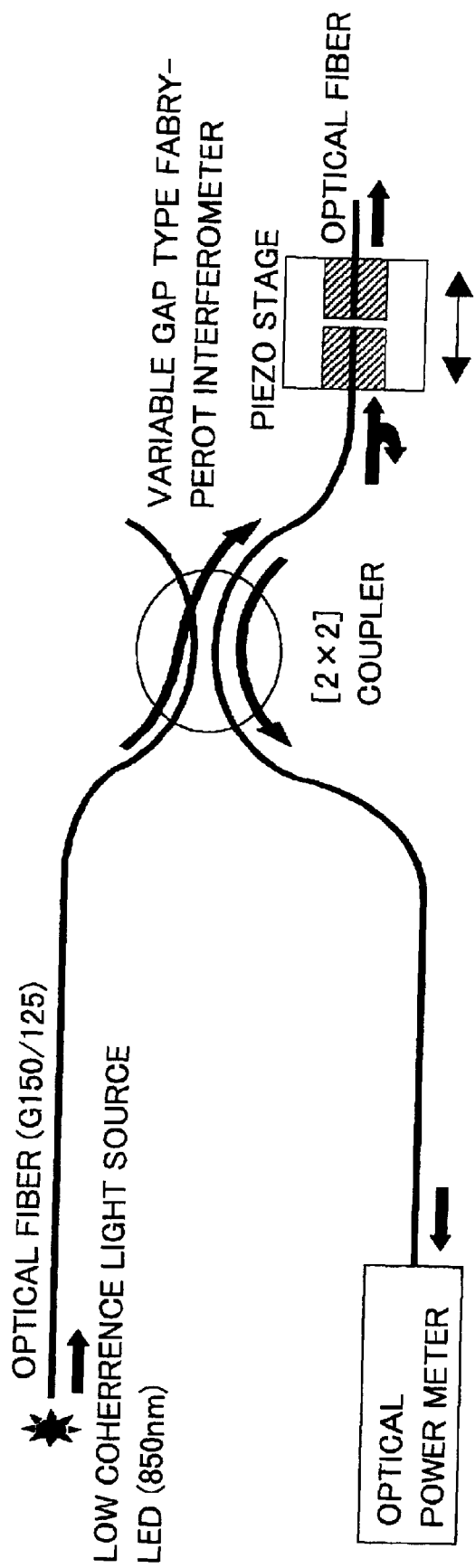
FIGS. 34A and 34B are measuring block diagram of a comparison confirmation test in reference to a difference between the optical correlation signal and a zero-pass length interference.
Figure 34B:
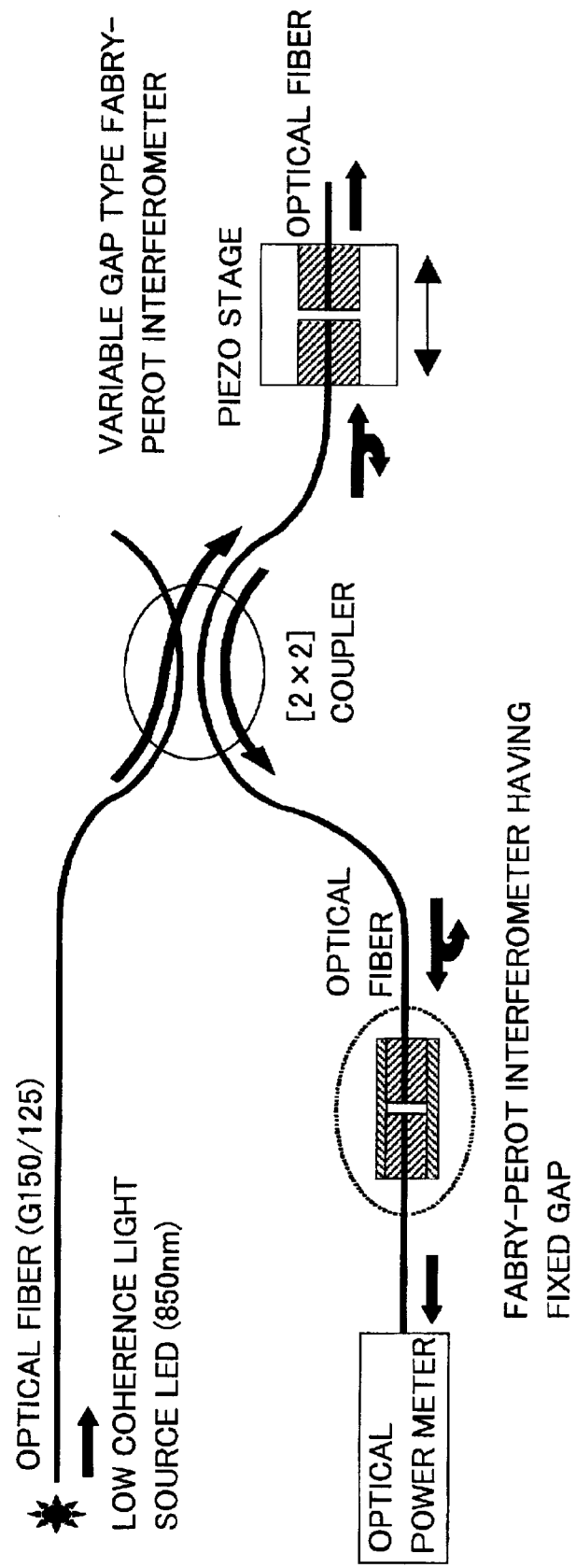
Figure 35A:
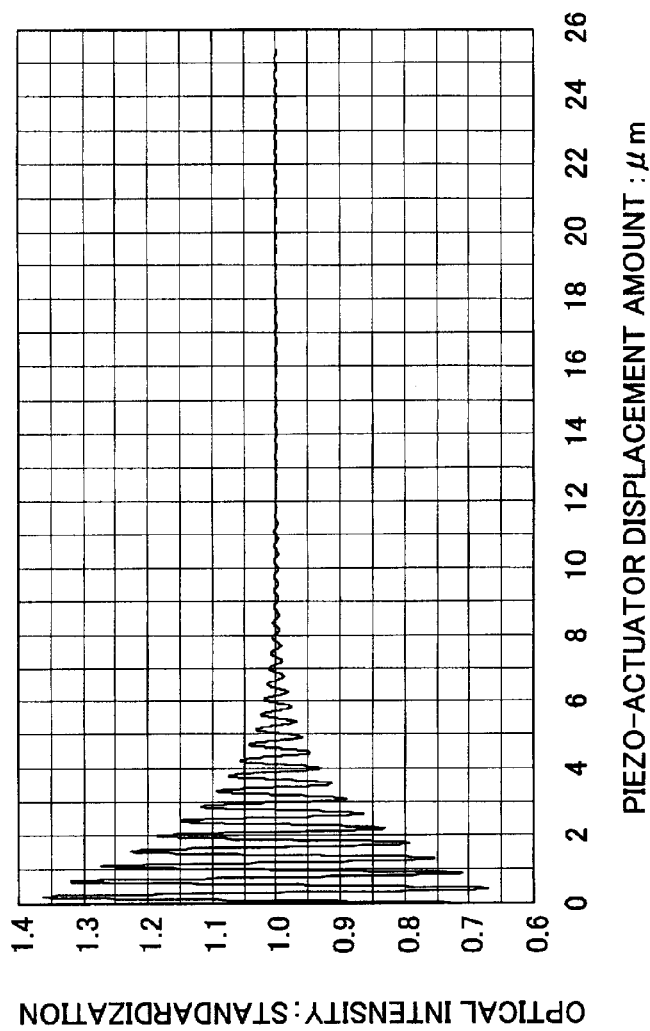
FIG. 35A is a view for showing a variation in an optical power meter output when a measurement is performed while a gap clearance size of the variable gap type Fabry-Perot interferometer is being minutely changed in the measuring system shown in FIG. 34A.
Figure 35B:
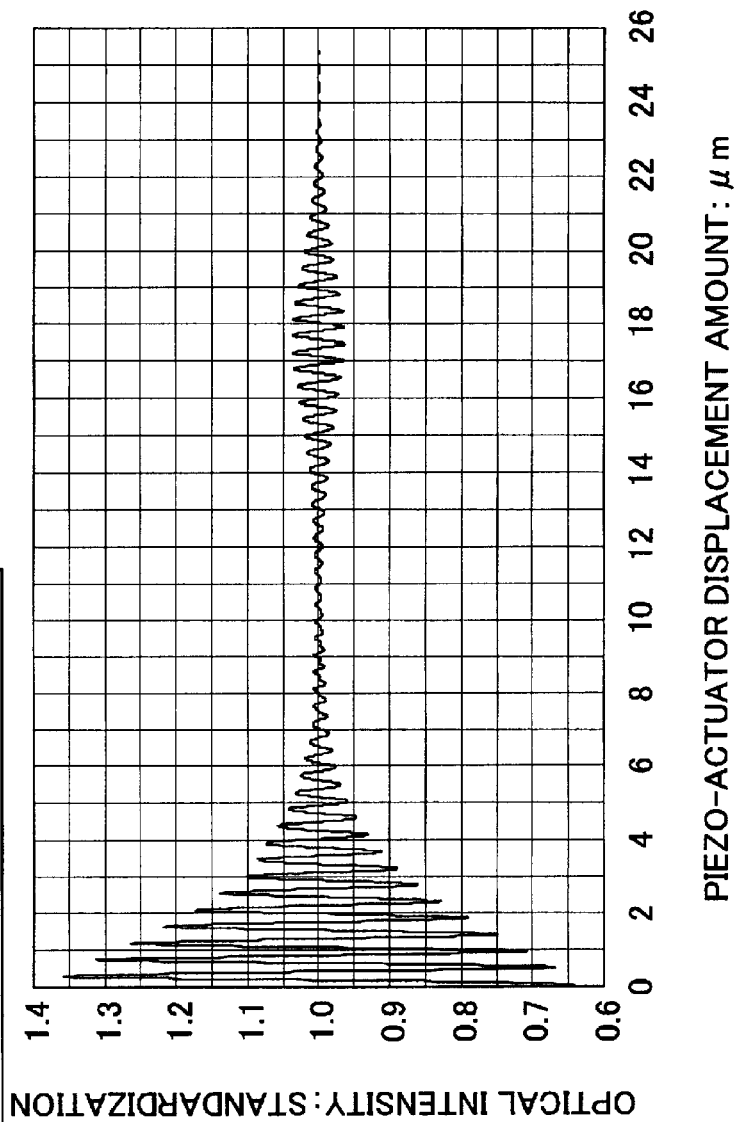
FIG. 35B is a view for showing a variation in an optical power meter output when a measurement is performed while a gap clearance size of the variable gap type Fabry-Perot interferometer is being minutely changed in the measuring system shown in FIG. 34B.
Figure 38:
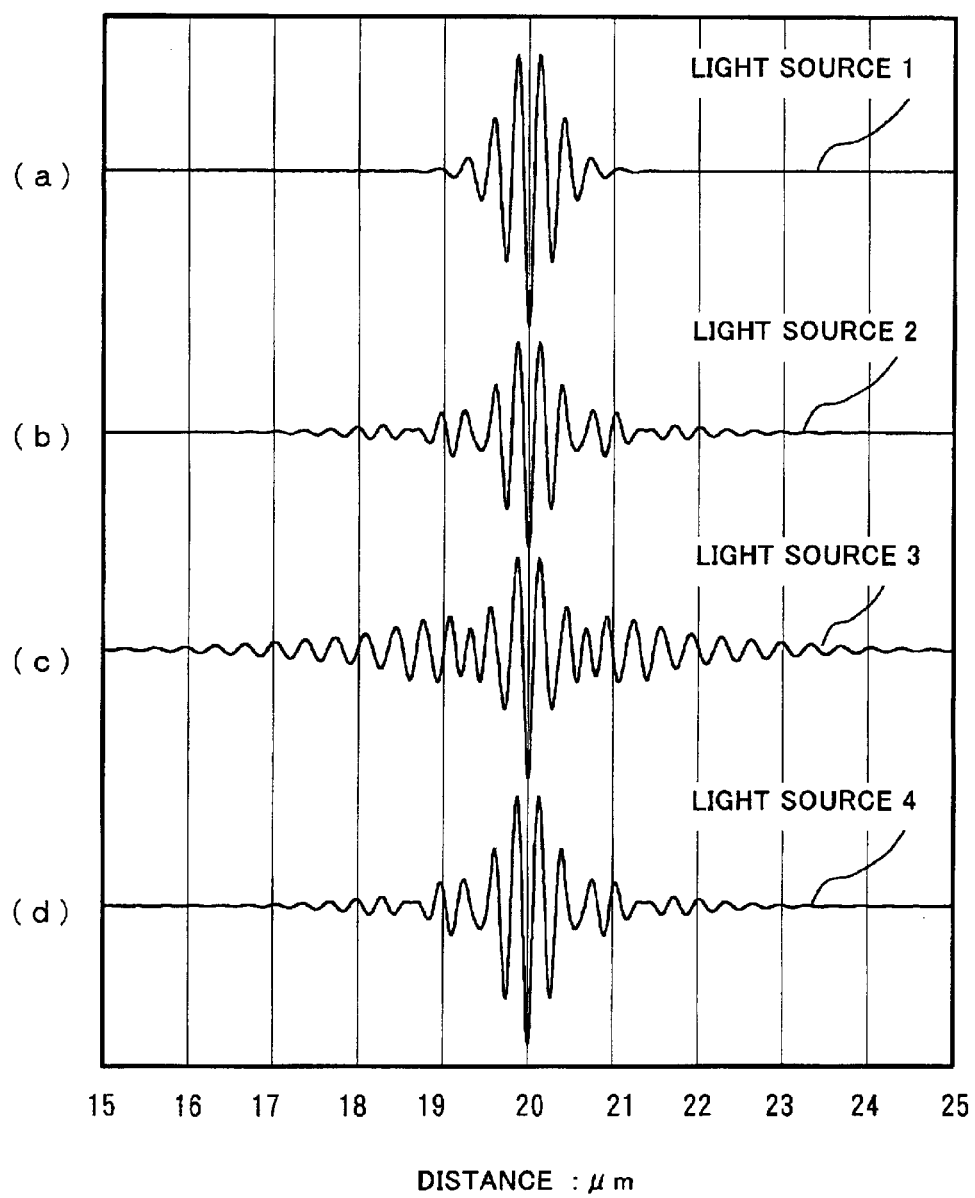
FIG. 38 is a partial enlarged waveform diagram for showing a result in which signal outputs caused by difference in light source spectra are compared and simulated.
Figure 39A:
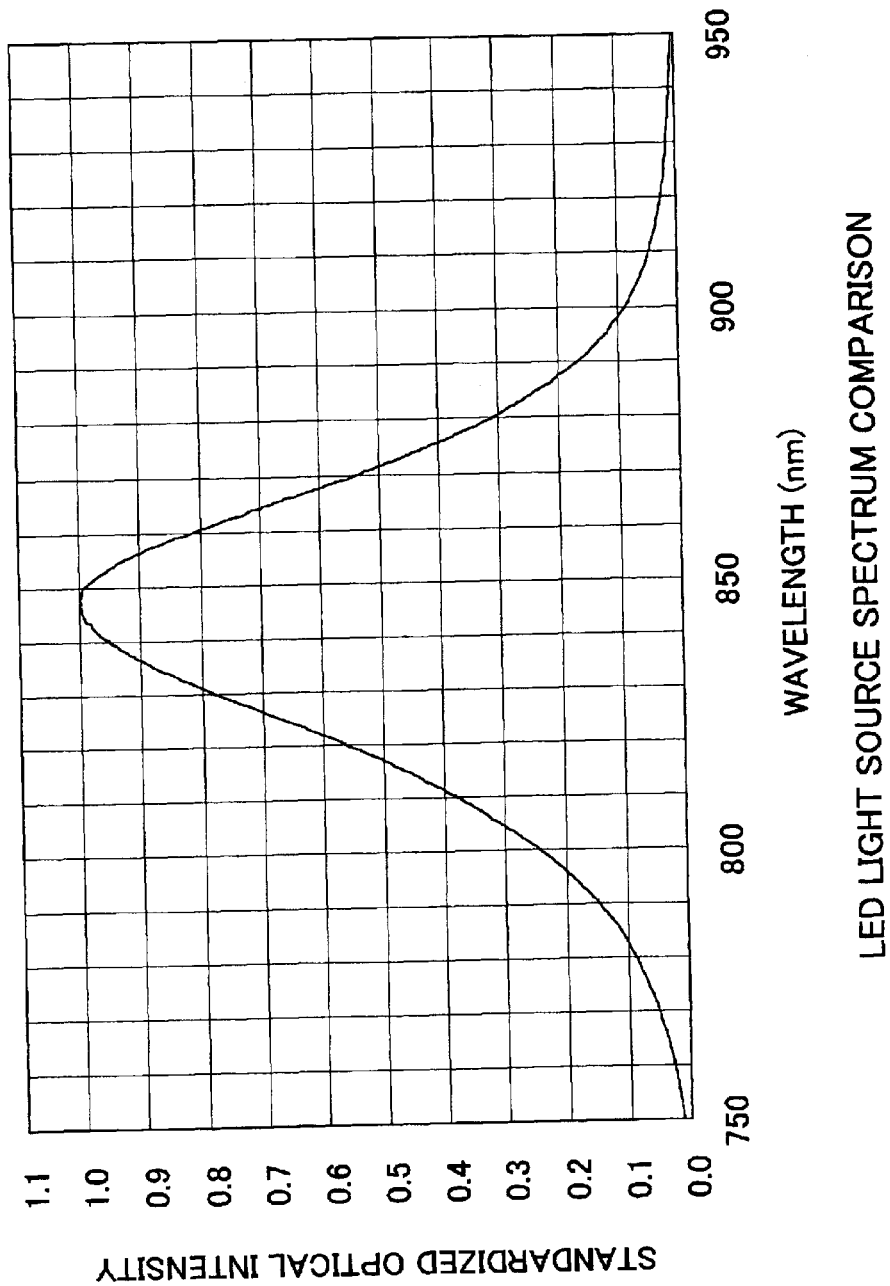
Figure 40A:
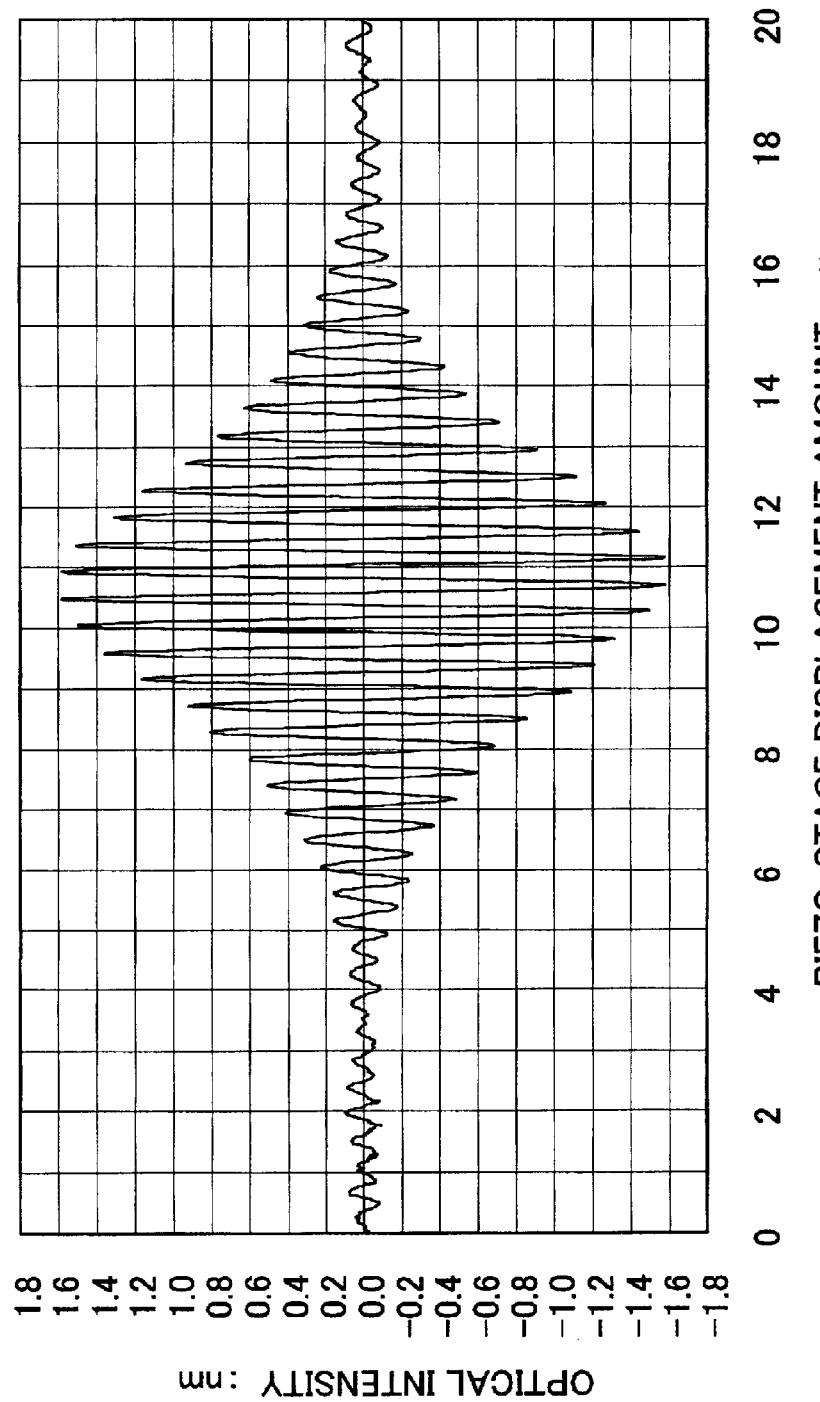
FIGS. 40A and 40B are waveform diagrams for comparing the optical correlation signals by the light emitting diode light sources having different spectrum distribution.
Figure 40B:
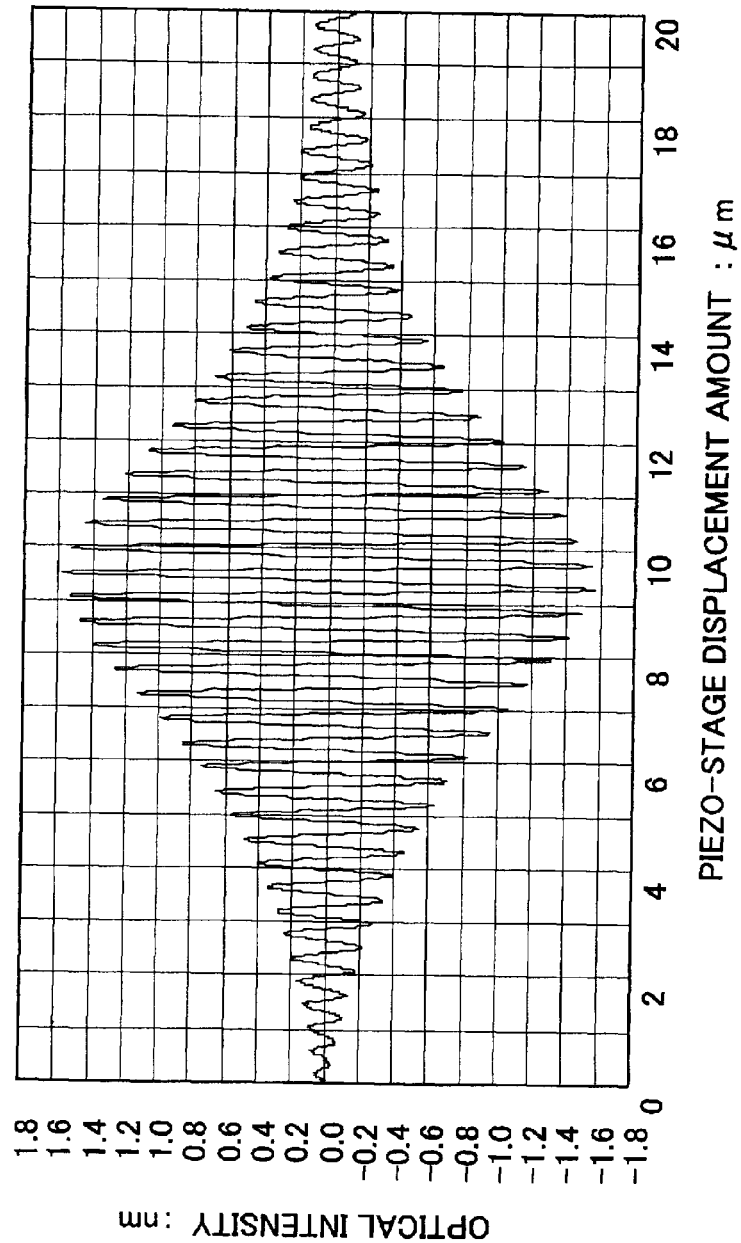

In this case, this least square fitting is used for removing the low frequency component from the measured data. The optical correlation signal to be extracted is a component equally vibrated in an upward or downward direction in respect to a predetermined reference value (1.00 in FIG. 33A) as shown in FIG. 33A. Accordingly, in the case where the low frequency component is overlapped on the optical correlation signal, it is possible to attain the optical correlation signal having no low frequency component as shown in FIG. 33A by attaining a curved line expressing a low frequency component under application of the least square fitting and by taking a difference between it and the original signal.

The processing step at the aforesaid step S2 will be expressed as indicated in an equation (5) of mathematical expression.

$$S_{DC}(n)=S_{LCOR,LPF}(n)-S_{FIT}(n) \qquad (5)$$

where, $S_{FIT}(n)$ is a curved line expressing a low frequency component calculated in reference to the measured data under application of the least square fitting and a curved line equation (multinomial) such as an equation (6), for example, is applied.

$$S_{FIT}(x)=A_0+A_1 \cdot x+A_2 \cdot x^2+\ldots+A_{10} \cdot x^9+A_{11} \cdot x^{10} \qquad (6)$$

where, $A_m$ (m=0, 1, ..., 10) denotes a coefficient of a curved line and this is calculated by a least square method in reference to measured data.

In FIG. 20A is shown an example of waveform where the low frequency component is removed from the optical correlation signal processed with LPF under application of least square fitting, and in FIG. 20B is shown an example of waveform with its abscissa being enlarged.

The processing of the aforesaid step S3 becomes necessary for performing a Hilbert transform of its subsequent process.

<Step S4: Phase Shift by 90° of a Waveform by a Hilbert Transform>

A signal [$S_{DC}(n)$] having a low frequency component removed at the step S3 is processed with a Hilbert transform to generate a signal with its phase being shifted by 90° indicated by the equation (7).

$$S_{90}(n)=\hat{H}[S_{DC}(n)] \qquad (7)$$

where, $\hat{H}$ denotes a Hilbert transform operator.

Figure 21:
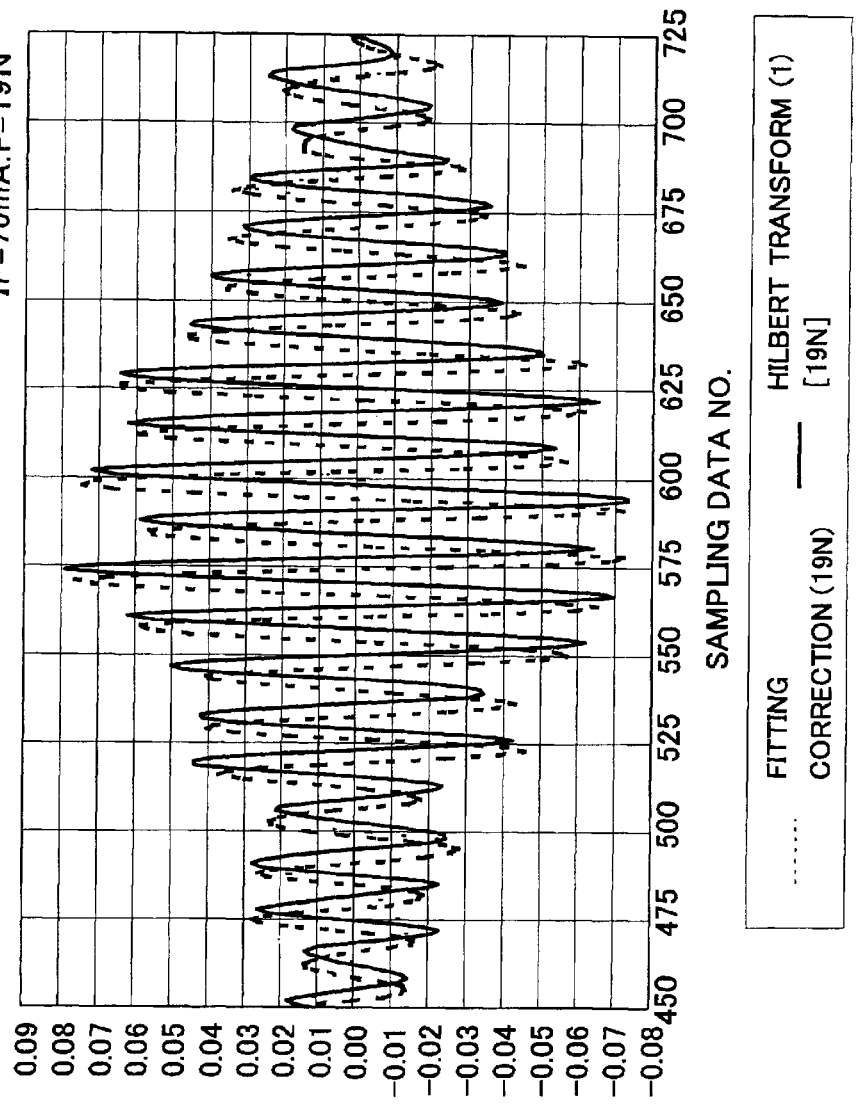
FIG. 21 is a view for showing a waveform of an original time-series signal and a waveform of Hilbert tranformed signal of the former one in a signal processing of the optical reflection type Fabry-Perot optical fiber interference load cell in FIG. 10.

Upon performing the Hilbert transform $\hat{H}[S_{DC}(n)]$, its real number part can attain a signal similar to its original waveform $S_{DC}(n)$ and its imaginary number part can attain a signal with its phase being shifted by 90° in regard to the signal at the real number part. In FIG. 21 are indicated a waveform of an original time-series signal [$S_{DC}(n)$] and a waveform of a signal [$S_{90}(n)$] with the former one being Hilbert transformed.

This method is carried out under an assumption that a biasing portion and a frequency component corresponding to the correlation signal are completely separated, i.e. no fluctuation of low frequency is present. Due to this fact, it becomes necessary that "a removal of low frequency component" at the aforesaid step S3 is performed as a pretreatment.

<Step S5: First Calculation of an Envelope>

A signal [$S_{ENV}(n)$] similar to an envelope of the original signal [$S_{DC}(n)$] is generated from a signal [$S_{DC}(n)$] with its low frequency component being removed and a signal [$S_{90}(n)$] having the former signal transformed in a Hilbert transform which are attained at the steps S3 and S4, respectively. This process is expressed as follows in an equation (8);

$$S_{ENV}(n) = \sqrt{[S_{DC}(n)]^2 + [S_{90}(n)]^2} \quad (8)$$

Figure 22:
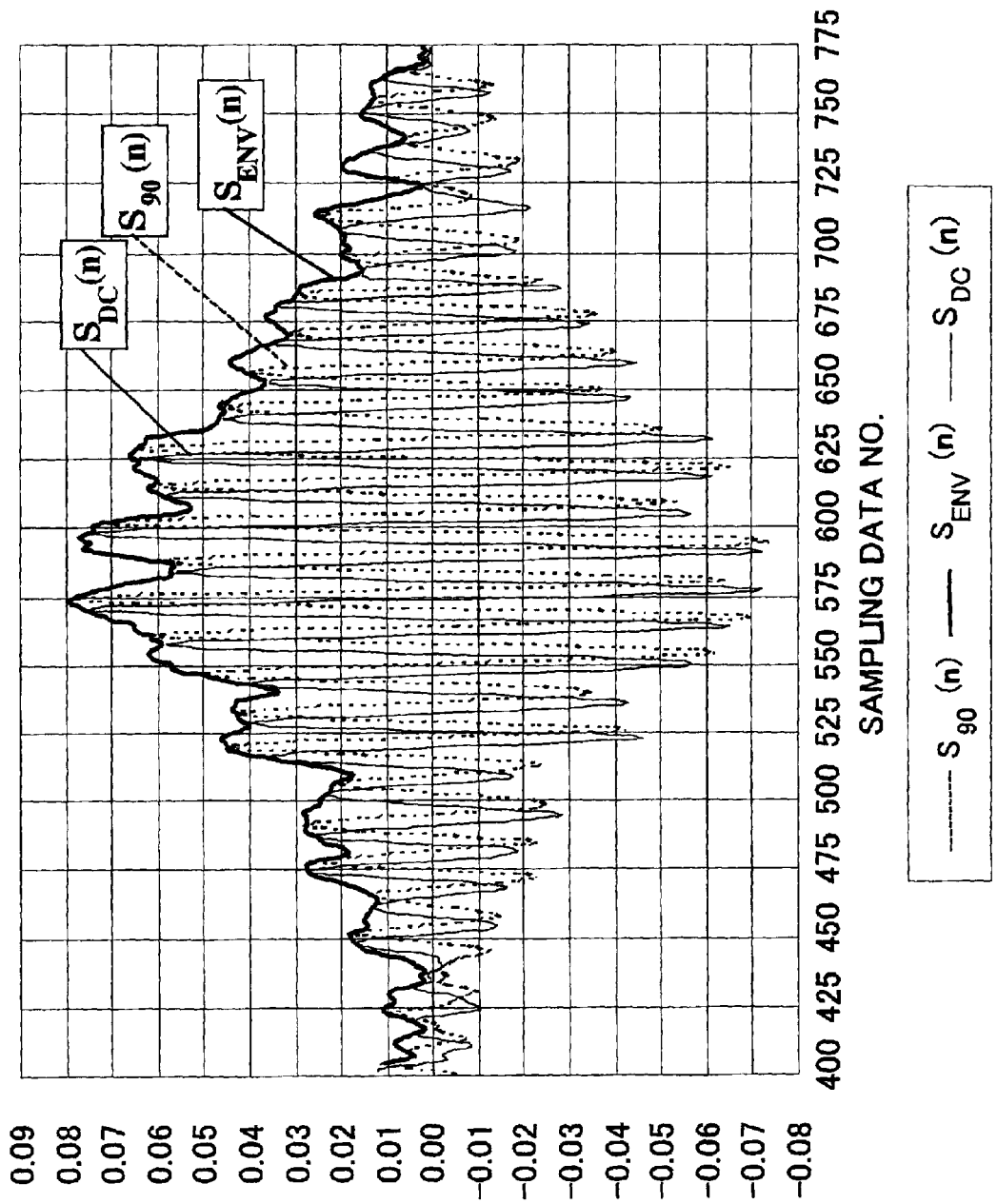
FIG. 22 is a view for showing a signal with a low frequency component being removed, a signal with the former signal being Hilbert tranformed, and a signal approximate to an envelope, respectively, in a signal processing operation in the optical reflection type Fabry-Perot optical fiber interference load cell in FIG. 10.

FIG. 22 shows each of a signal [$S_{DC}$(n)] having a low frequency component removed, a signal [$S_{90}$(n)] having the former signal transformed by a Hilbert transform and a signal [$S_{ENV}$(n)] similar to the envelope calculated by the equation (8), respectively.

Then, a straight line image of principle in which an envelope is detected by the Hilbert transform will be described in reference to a response of a vibration system with a degree of freedom 1 in attenuation. This method is already described in N. Thrane, et. al.: "Practical use of the "Hilbert transform", Application Note, B&K, Denmark, B00437-11, for example. In the following description, the present invention will be described in reference to this document.

Figure 23:
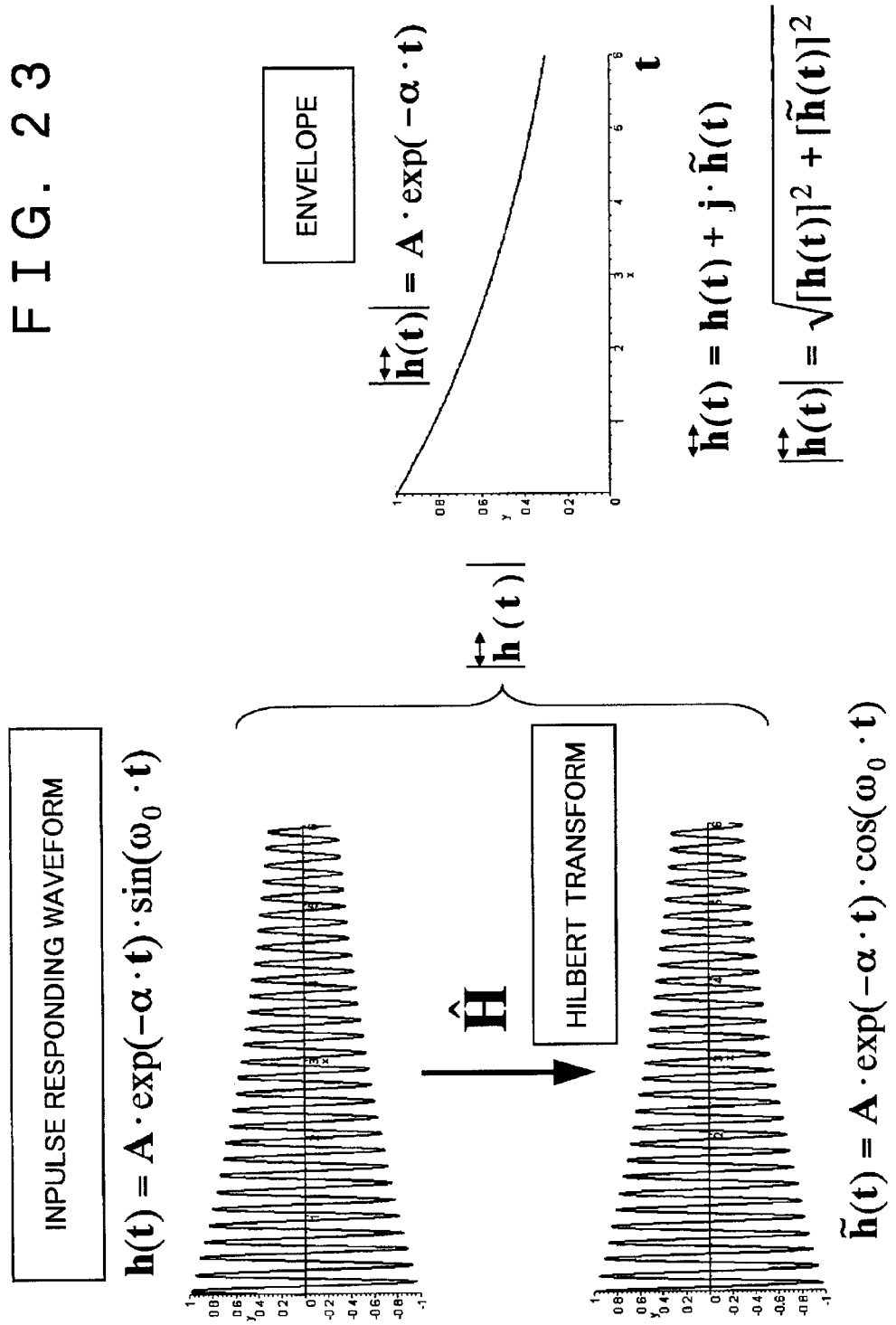
FIG. 23 is a view for schematically showing an envelope detecting concept with a Hilbert transform of an impulse response in a vibrating system with attenuation 1 degree of freedom.

In FIG. 23 is illustrated schematically a concept for detecting an envelope by a Hilbert transform for an impulse response in the vibration system with a degree of freedom 1 in attenuation.

The left upper waveform in FIG. 23 illustrates a response waveform when an impulse is inputted to the vibration system with a degree of freedom 1 in attenuation, wherein the vibration attenuates as a time elapses while the vibration is being carried out under a proper frequency. This impulse response waveform h(t) is expressed by the equation (9) with a time being indicated by (t).

$$h(t) = A \cdot exp(-\alpha \cdot t) \cdot sin(\omega_o \cdot t) \quad (9)$$

When the equation (9) is transformed by a Hilbert transform to $\hat{H}$ [h(t)], the real number of the transformed waveform $\check{h}(t)$ is changed into the original waveform h(t) and an imaginary number part is changed into a waveform h (t) (a left lower waveform in FIG. 23) with its phase being shifted by 90° in respect to the original waveform. That is, this equation may become an equation (10);

$$\hat{H}[h(t)] = h(t) = \check{h}(t) + j \cdot \tilde{h}(t) \quad (10)$$

where, h(t) and $\tilde{h}$(t) are defined as indicated in the equations (11) and (12);

$$h(t) = A \cdot exp(-\alpha \cdot t) \cdot sin(\omega_o t) \quad (11)$$

$$\tilde{h}(t) = A \cdot exp(-\alpha \cdot t) \cdot cos(\omega_o t) \quad (12)$$

Accordingly, the envelope of h(t) is calculated as indicated in the equations (13) and (14) from an absolute value $|\check{h}(t)|$ of $\hat{H}$ [h(t)]=$\check{h}$(t).

$$\left|\check{h}(t)\right| = \sqrt{[h(t)]^2 + [\tilde{h}(t)]^2} \quad (13)$$

$$\left|\check{h}(t)\right| = A \cdot exp(-\alpha \cdot t) \quad (14)$$

The waveform of the envelope shown in the equation (14) corresponds to the right side waveform of FIG. 23.

<Step S6: Second Calculation of an Envelope>

Then, an LPF processing is applied to the signal [$S_{ENV}$(n)] similar to the envelope attained at the step S5 to eliminate the high frequency non-required component and generate a time-series signal [$S_{ENV,LPF}$(n)] approximate more to the envelope.

Figure 24:
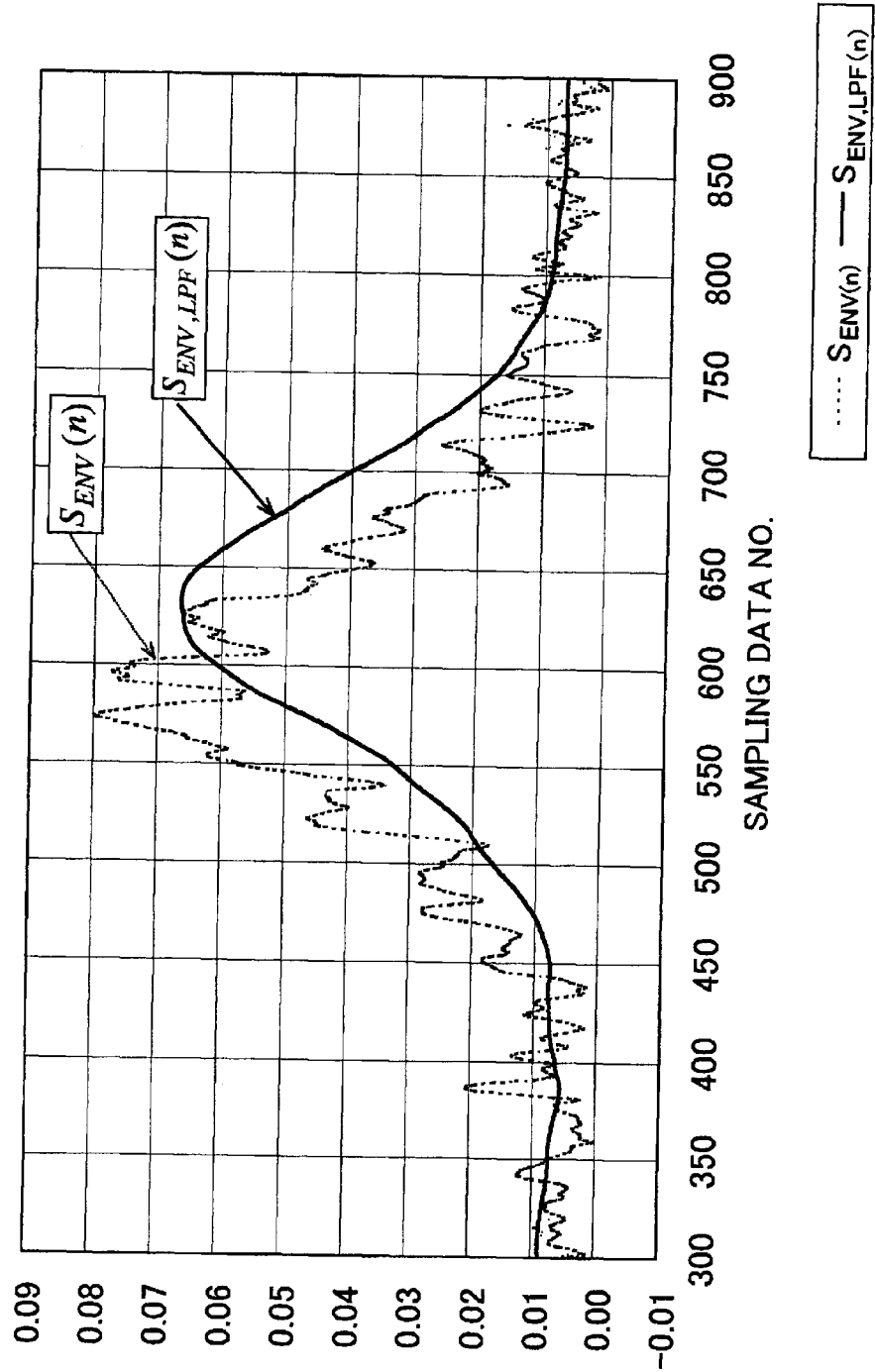
FIG. 24 is a view for showing each of a signal approximate to an envelope and a signal with the former signal being LPF processed in calculation of a second envelope in the optical reflection type Fabry-Perot optical fiber interference load cell in FIG. 10.

In FIG. 24 is indicated each of the original signal [$S_{ENV}$(n)] and the signal [$S_{ENV,LPF}$(n)] applied with the LPF processing, respectively.

<Step S7: A First Calculation of Peak Position (a Smoothing Differentiating Operation)>

Then, a smoothing differentiating operation is carried out to calculate the peak position of the signal [$S_{ENV,LPF}$(n)] applied with the LPF processing at the step S6.

Figure 25:
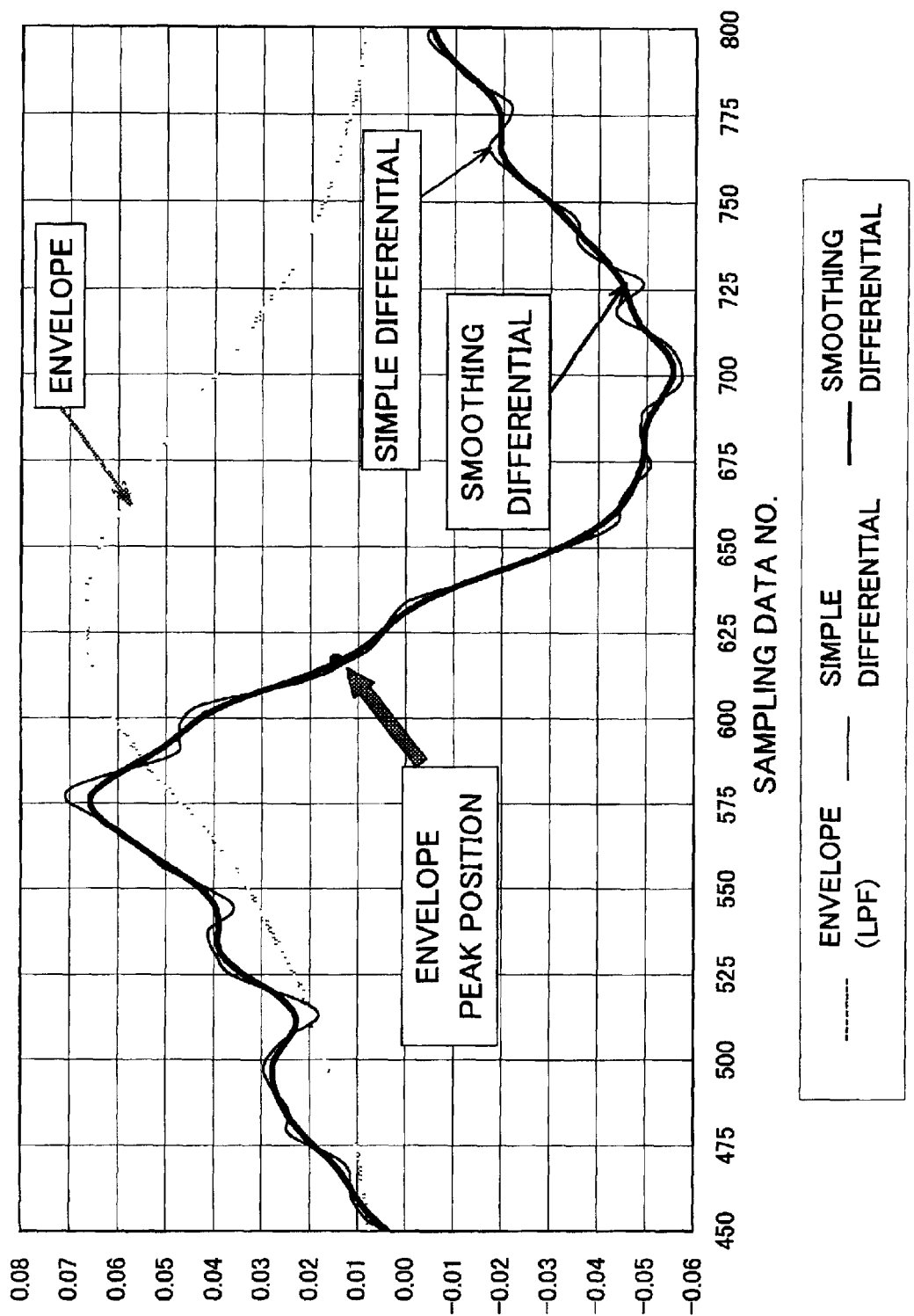
FIG. 25 is a view for showing a waveform of a time-series signal and a waveform of signal processed with a simple differential processing and a smooth differential processing in a signal processing of the optical reflection type Fabry-Perot optical fiber interference load cell in FIG. 10.

For a sake of comparison, FIG. 25 shows a time-series signal [$S_{ENV,LPF}$(n)] and its signal waveform processed by a simple differentiating operation and a smoothing simple differentiating operation and a smoothing differentiating operation. The smoothing differentiating operation is meant by a process for calculating a differentiated waveform of an observed waveform, i.e. the measured data through a multinominal adaptation smoothing method, wherein the smoothing operation is concurrently applied to the differentiated waveform to be calculated.

The multinomial adaptation smoothing method in this case is one of the smoothing methods for removing the high frequency signal component out of the observed waveforms and smoothing the waveform. The smoothing value at one measuring point is calculated by adapting the measured values near both sides of the measuring point to the multinomial under application of the least square method. The values are calculated in sequence for every measuring points to calculate the entire smoothing waveforms.

<Step S8: A Second Calculation of Peak Position (a Calculation of Zero-Point Position)>

Lastly, the zero-point position is calculated in reference to the time-series signal where the envelope is processed with a smoothing differentiating at the step S7.

As shown in FIG. 25, the point where the dipole waveforms of the time-series signals having the envelope smoothed and differentiated cross with a base line of the level zero corresponds to a peak position to be calculated.

Figure 26:
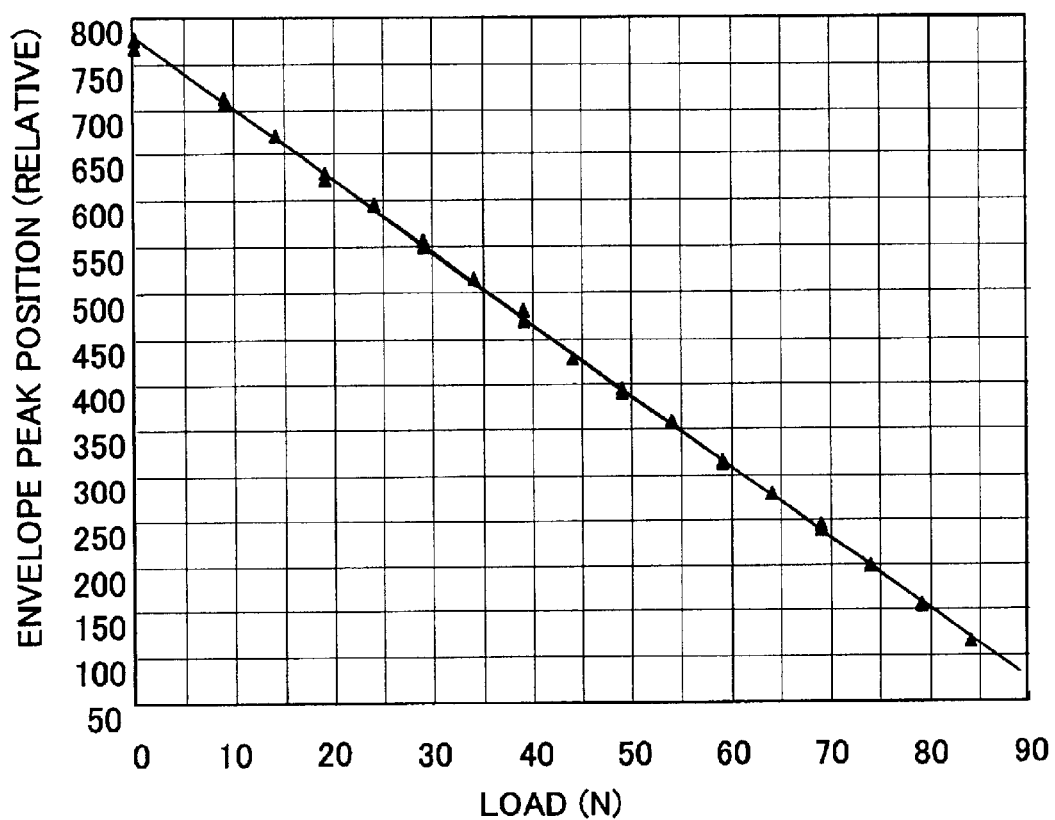
FIG. 26 is a view for showing a test and a result of data processing in which an envelope peak position of the optical correlation signal against a loaded weight by a trial making and signal processing of a measurement system of FIG. 10 in the optical reflection type Fabry-Perot optical fiber interference load cell in FIG. 10.
Figure 27A:
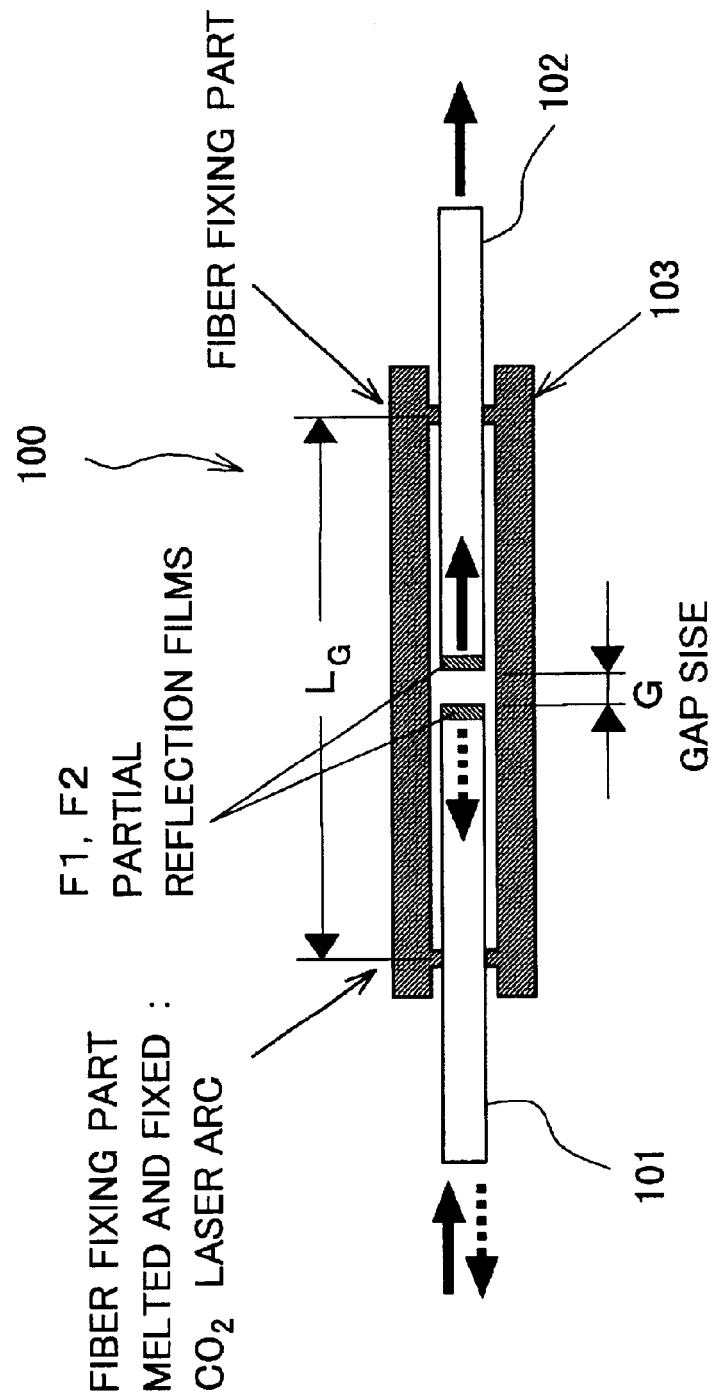
FIGS. 27A and 27B are indicated a schematic configuration of a Fabry-Perot type optical interference strain sensor.
Figure 27B:
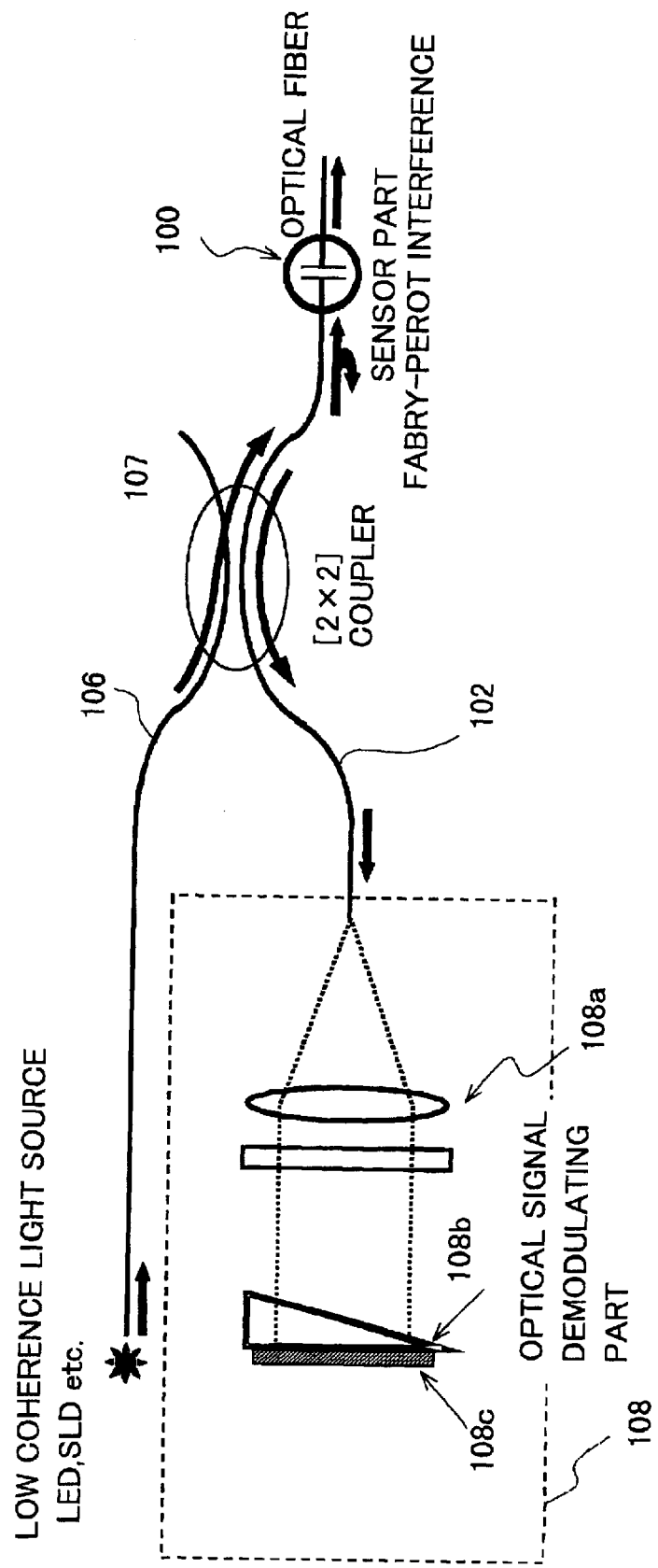
Figure 28:
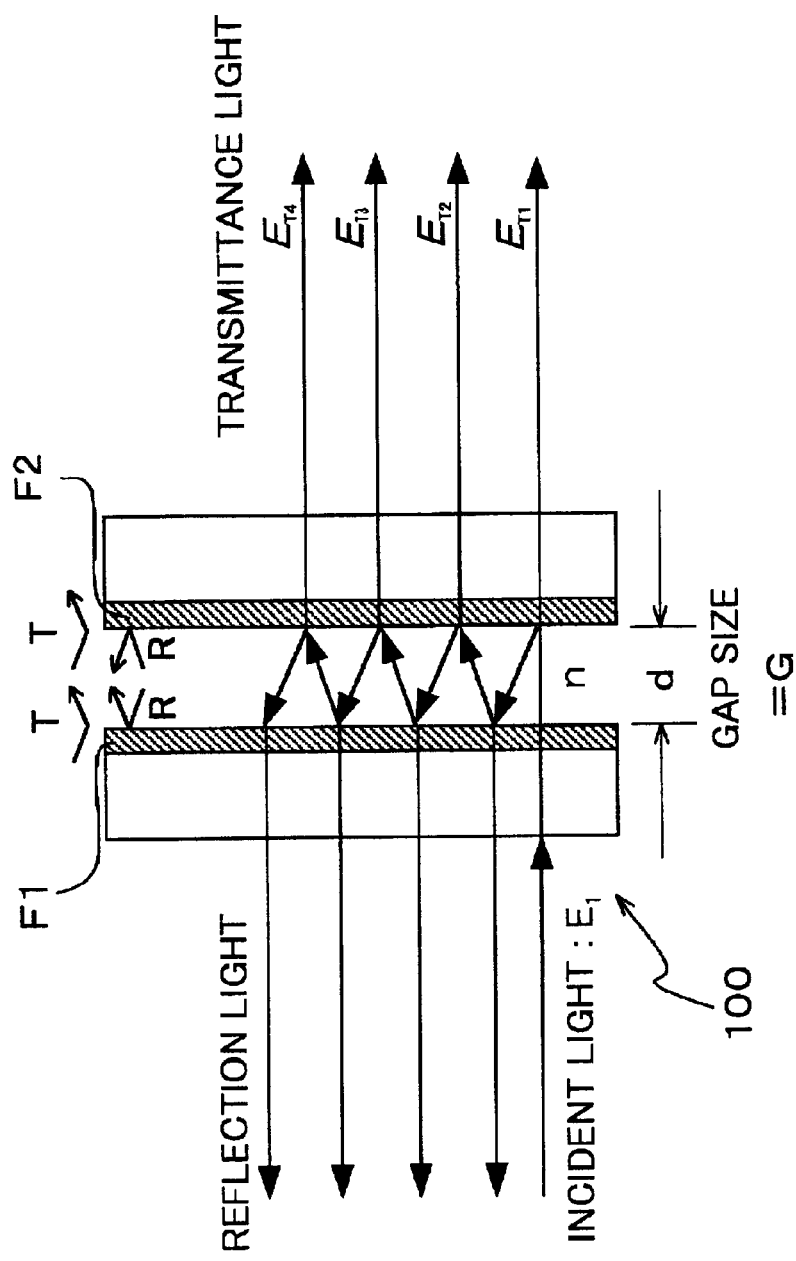
FIG. 28 is a schematic sectional view for illustrating a practical configuration of the Fabry-Perot interferometer shown in FIGS. 27A and 27B
Figure 29:
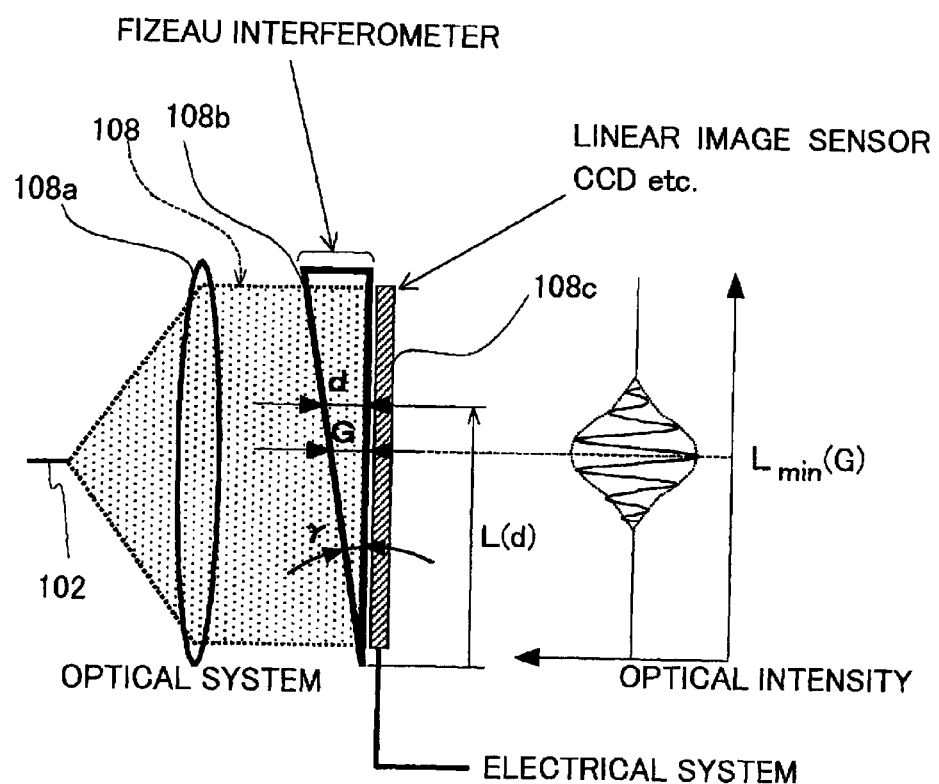
FIG. 29 is a schematic view for illustrating a sensing principle of the Fabry-Perot optical fiber interference strain sensor.
Figure 30:
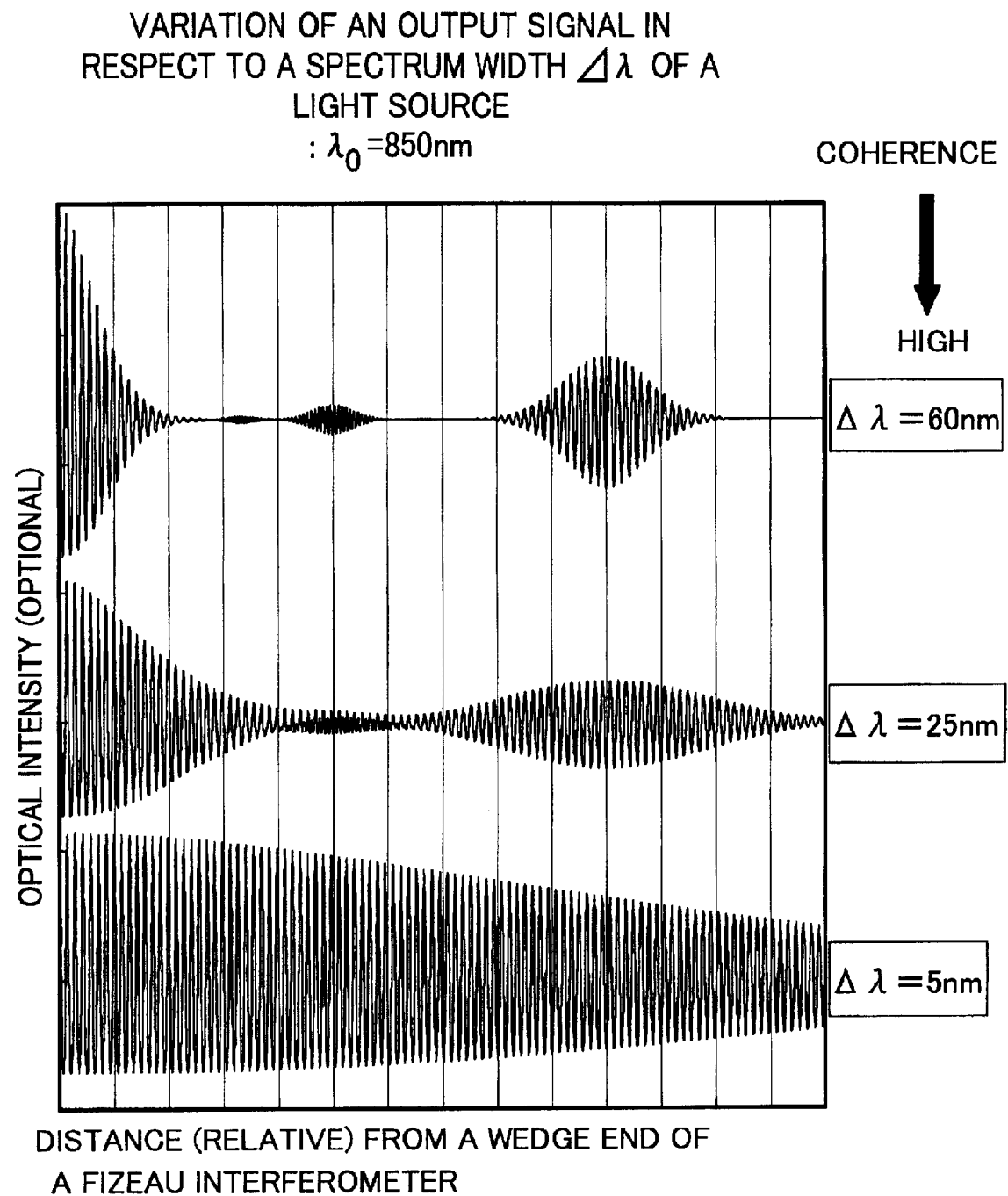
FIG. 30 is a simulation view for showing a sensor system output in which a wavelength spectrum of the light source has a Gauss distribution.
Figure 31:
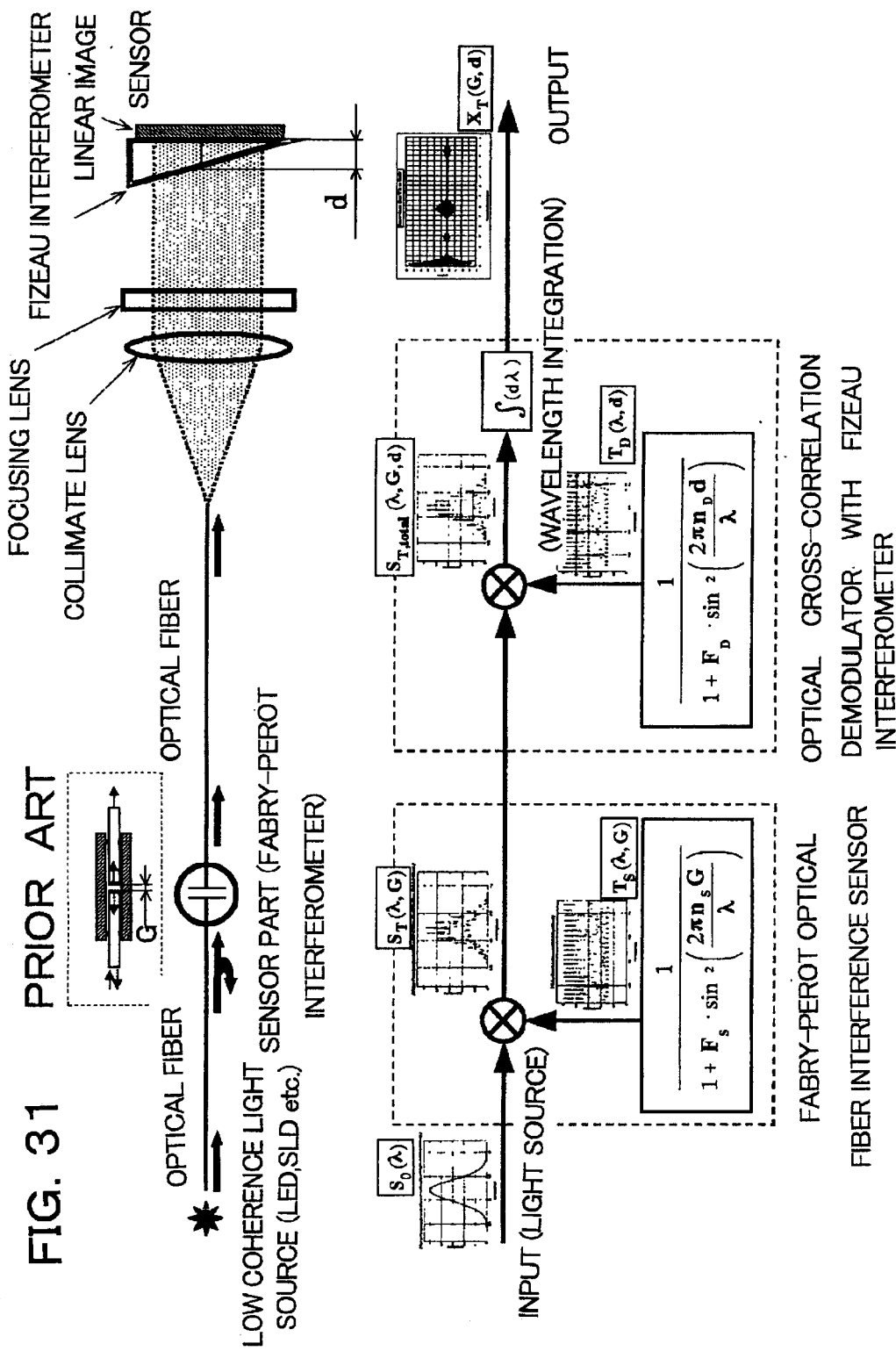
FIG. 31 is a schematic block diagram for showing a configuration of a transmission type measuring system.
Figure 32:
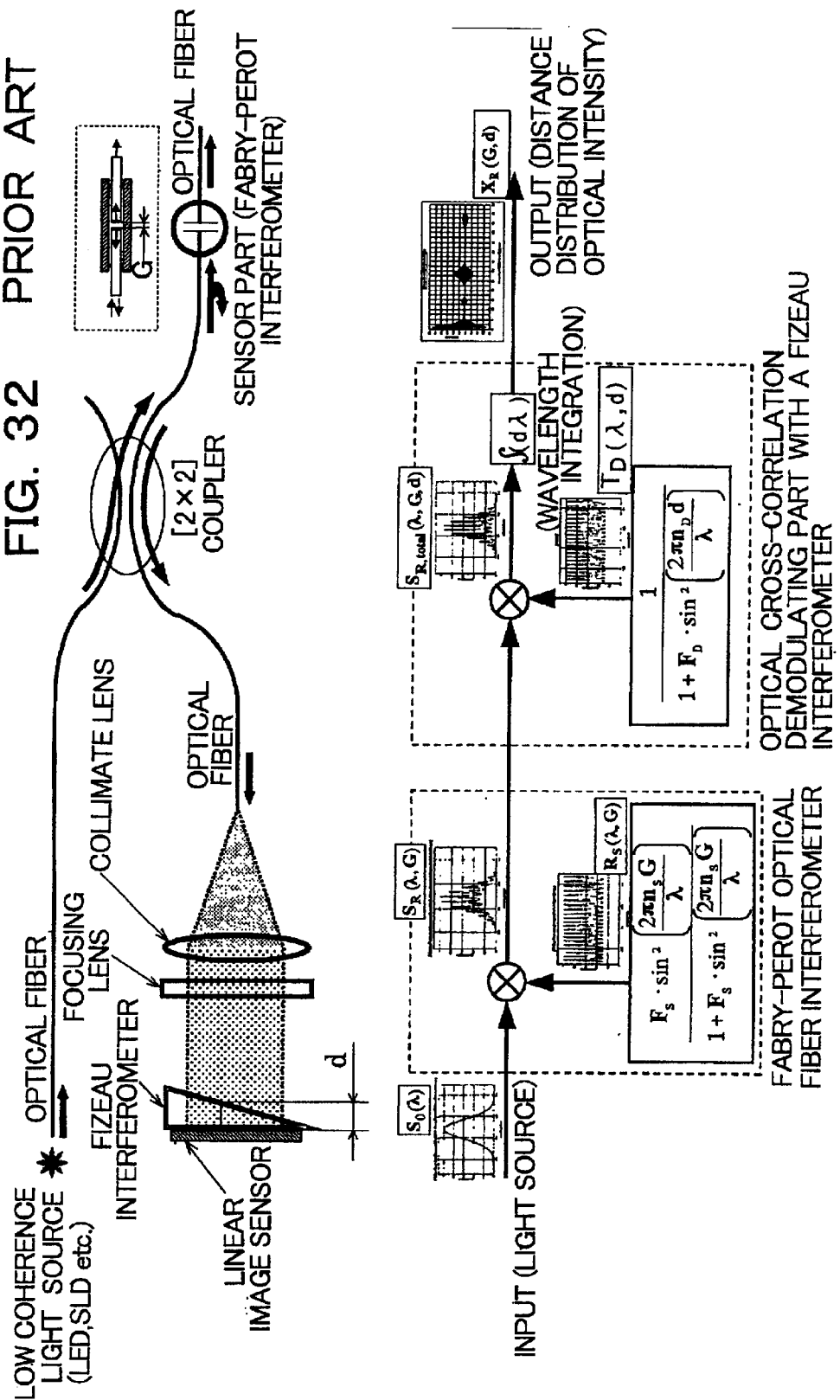
FIG. 32 is a schematic block diagram for showing a configuration of a reflection type measuring system.

In FIG. 26 are indicated a test and a result of data processing operation where an optical reflection Fabry-Perot load cell is made in trial, the measuring system shown in FIG. 10 is applied, the aforesaid signal processing is carried out and a peak position of the envelope of the optical correlation signal against the load weight is attained.

The aforesaid method is not limited to the configuration shown in FIG. 10, but can be executed in the same manner as that described above, wherein as the interferometer at the signal demodulating part is used as either a Mickelson interferometer or a variable gap Fabry-Perot interferometer. In the foregoing description, although FIG. 11 has been described as the third preferred embodiment, the content of FIG. 11 adapted to indicate the fifth preferred 73 embodiment. Although in FIG. 11 is illustrated a configuration of the optical fiber interference sensor system constructed as an optical reflection type Fabry-Perot interference load cell in accordance with a fifth preferred embodiment of the present invention where the interferometer at the signal demodulating part is applied as a Mickelson interferometer, the constitution except that the signal processing part 12A is constructed as shown in the aforesaid fourth preferred embodiment is common to that of the third preferred embodiment, so that its detailed description will be eliminated.

In the foregoing description, although FIG. 1 has been described as the first preferred embodiment, the content of FIG. 1 is adapted to indicate the sixth preferred embodiment here. That is, it is assumed that this FIG. 1 indicates a constitution of the optical fiber interference sensor system constructed as the optical reflection type Fabry-Perot optical fiber interference load cell in accordance with a sixth preferred embodiment of the present invention while the interferometer at the signal demodulation part is applied as the variable gap type interferometer.

Also in FIG. 1, the light source 1, the first optical fiber 2, the [2×2] coupler 3, the second optical fiber 4, the third optical fiber 5, the Fabry-Perot load cell 6 and the fourth optical fiber 7 are similar to that shown in FIG. 10, wherein there are provided the variable gap type Fabry-Perot interferometer 8 and the optical sensor 9, and the optical power meter 10 similar to that shown in FIG. 11 in place of the configuration of the signal demodulating part comprised of the collimate lens 21, the focusing lens 22, the Fizeau interferometer 23, the linear image sensor 24 and the image sensor control part 25 shown in FIG. 10.

The variable gap type Fabry-Perot interferometer 8 has a variable gap type interferometer 8a, and the gap clearance of the variable gap type interferometer 8a can be changed by a Piezo-actuator (not shown) or the like. It is possible to attain an optical correlation signal similar to that described above near the sensor gap clearance of the Fabry-Perot load cell 6 by changing this gap clearance. This optical correlation signal is given from the optical sensor 9 to the optical power meter 10 and is measured.

The signal processing part 12 also in the sixth preferred embodiment is similar to that described in reference to the aforesaid fourth preferred embodiment.

The signal processing system of the optical fiber interference sensor of the present invention can be realized by using the normal or usual computer system in place of configuration of the exclusive system. For example, a program is installed into a computer system through media such as a floppy disc, CD-ROM and the like storing the program for executing the aforesaid operation, thereby it may also constitute the signal processing system of the optical fiber interference sensor executing the aforesaid processing. The program is stored in a medium such as a hard-disc in the computer system through this installing operation to constitute the signal processing system for the optical fiber interference sensor and this is adapted for its execution.

In addition, it is also applicable that the program is registered in an FTP (File Transfer Protocol) server installed in a communication network such as an internet or the like and the program is distributed to the FTP client through the network. It is also applicable that the program is registered in an electronic bulletin board (BBS: Bulletin Board System) of the communications network and the program is distributed through the network. Then, this program is excited and executed under a control of OS (Operating System), resulting in that the aforesaid processing can be accomplished. Further, the aforesaid processing can be accomplished by performing its excitation and execution while the program is being transferred through the communications network.

EFFECTS OF THE INVENTION

As described above, in accordance with the present invention, it is possible to provide an optical fiber interference sensor, a signal processing system for the optical fiber interference sensor and a recording medium in which influences caused by some non-required signal components such as a low frequency fluctuation and noises are effectively restricted by a simple configuration and a high precision result of measurement can be attained by a convenient adjustment of an optical system and a simple signal processing for the sensing signal.

That is, in accordance with the optical fiber interference sensor of an embodiment of the present invention, there is provided a Fabry-Perot optical fiber interference sensor having a sensor part having opposed surfaces formed as parallel planes to each other in a measured clearance varied in response to physical quantities such as force, strain, pressure and temperature and the like, having a partial reflection mirror or an end surface of one optical fiber formed with a partial reflection mirror arranged in one surface side of said opposed surfaces, and having an end surface of the other optical fiber formed with a partial reflection mirror arranged in the other surface side of said opposed surfaces, in which a light of low coherence light source is guided to said the other optical fiber, either a reflected light or a transmission light modulated in wavelength in correspondence with a clearance size of said measured clearance through multiple reflection at said measured clearance is guided by the optical fiber, optical intensities in time-series corresponding to a clearance variation are attained by an optical intensity distribution sensor, either a minimum optical intensity position or a maximum optical intensity position is detected to attain said measured clearance and a value of said physical quantity is measured, and a wide range light source having a wide wavelength spectrum distribution acting as said low coherence light source is used; a desired optical correlation signal is extracted from the output signal in time-series of said optical intensity distribution sensor by the optical correlation signal extracting means;

either a minimum position or a maximum position at said optical correlation signal is calculated by an extreme value position calculating means in reference to said optical correlation signal outputted from said optical correlation signal extracting means, thereby influence caused by some non-required signal components such as low frequency fluctuation and noise or the like can be effectively restricted by a simple configuration, a high precision result of measurement can be attained by a simple adjustment of an optical system and by a simple signal processing for the detected signal and in particular, a high precision result of measurement can be attained even with the simple configuration including the signal processing system.

Further, in accordance with the optical fiber interference sensor of an embodiment of the present invention, there is provided a Fabry-Perot optical fiber interference sensor in which a wide range light source having a wide wavelength spectrum distribution is used as said low coherence light source; a desired optical correlation signal is extracted from the output signal in time-series of said optical intensity distribution sensor; a high frequency non-required component in the optical correlation signal outputted from said optical correlation signal extracting means is removed by a high frequency component removing and processing means; and either a minimum position or a maximum position at said optical correlation signal is attained by an extreme value position calculating means in reference to said optical correlation signal having the high frequency non-required component removed which is outputted from said high frequency component removing and processing means, thereby in particular, an effective measurement can be carried out even in the case that a high frequency non-required component is contained in the measured signal.

In accordance with the optical fiber interference sensor of a further embodiment of the present invention, in particular, a high precision measurement can be realized by a simple configuration by an arrangement in which said wide range light source is one of a halogen lamp and a white light emitting diode.

In accordance with the optical fiber interference sensor of a further embodiment of the present invention, said optical correlation signal extracting mean includes a background signal removing means for removing a background signal varied in response to said measured clearance from an output of said optical intensity distribution sensor, thereby in particular, the non-required component can be removed or restricted more effectively.

In accordance with the optical fiber interference sensor according to a further embodiment of the present invention, said background signal removing means includes means for estimating a background signal by a least square multinomial fitting and for removing the background signal varied in reference to said measured clearance from an output of said optical intensity distribution sensor, thereby in particular, either removal or restriction of the non-required component can be realized by a simple and effective processing.

In accordance with the optical fiber interference sensor of a further embodiment of the present invention, said background signal removing means includes means for removing a background signal varied in reference to said measured clearance from an output of said optical intensity distribution sensor while an actual measured practical data under a state not including an optical correlation signal in a desired measuring range is being applied as a background signal, thereby in particular, either removal or restriction of the non-required component can be realized by a simple and effective processing.

In accordance with the optical fiber interference sensor of a further embodiment of the present invention, said extreme value position calculating means includes;

a smoothing differential processing means for smoothing differential processing said optical correlation signal in response to a multinomial adaptation smoothing method; and a zero-cross point calculating means for calculating a zero-cross point where an output of said smoothing differential processing means crosses with a level zero, thereby in particular, a non-required component can be removed or restricted more effectively and a high precision measurement can be realized.

In accordance with the optical fiber interference sensor according to a further embodiment of, said high frequency component removing and processing means includes a low-pass filter, thereby in particular, a high precision measurement can be realized by an easy configuration.

Further, in accordance with the signal processing system of an optical fiber interference sensor of claim 9 of the present invention that is a signal pressing system of a signal processing system of a Fabry-Perot optical fiber interference sensor having a sensor part having opposed surfaces formed as parallel planes to each other in a measured clearance, having a partial reflection mirror or an end surface of one optical fiber formed with a partial reflection mirror arranged in one surface side of said opposed surfaces, and having an end surface of the other optical fiber formed with a partial reflection mirror arranged in the other surface side of said opposed surfaces, in which a light of low coherence light source is guided to said the other optical fiber, either a reflected light or a transmission light modulated in wavelength in correspondence with a clearance size of said measured clearance through multiple reflection at said measured clearance is guided by the optical fiber, optical intensities in time-series corresponding to a clearance variation are attained by an optical intensity distribution sensor, either a minimum optical intensity position or a maximum optical intensity position is attained to measure said measured clearance, wherein a wide range light source having a wide wavelength spectrum distribution acting as said low coherence light source is used; a desired optical correlation signal is extracted from the output signal in time-series of said optical intensity distribution sensor by an optical correlation signal extracting means; and either a minimum position or a maximum position at said optical correlation signal is attained by an extreme value position calculating means in reference to the optical correlation signal outputted from said optical correlation signal extracting means, thereby in particular, even a simple configuration including the signal processing system can become possible to attain a high precision result of the measurement.

In addition, in accordance with the signal processing system for the optical fiber interference sensor of a further embodiment of the present invention of the present invention that is a signal processing system of a signal processing system of a Fabry-Perot optical fiber interference sensor having a sensor part having opposed surfaces formed as parallel planes to each other in a measured clearance, having a partial reflection mirror or an end surface of one optical fiber formed with a partial reflection mirror arranged in one surface side of said opposed surfaces, and having an end surface of the other optical fiber formed with a partial reflection mirror arranged in the other surface side of said opposed surfaces, in which a light of low coherence light source is guided to said the other optical fiber, either a reflected light or a transmission light modulated in wavelength in correspondence with a clearance size of said measured clearance through multiple reflection at said measured clearance is guided by the optical fiber, optical intensities in time-series corresponding to a clearance variation are attained by an optical intensity distribution sensor, either a minimum optical intensity position or a maximum optical intensity position is attained to measure said measured clearance, wherein a wide range light source having a wide wavelength spectrum distribution is used as said coherence light source; a desired optical correlation signal is extracted by said optical correlation signal extracting means from the output signal in time-series of said optical intensity distribution sensor; a high frequency non-required component in the optical correlation signal outputted from said optical correlation signal extracting means is removed by a high frequency component removing and processing means, either a minimum position or a maximum position at said optical correlation signal is attained by an extreme value position calculating means from an optical correlation signal having high frequency non-required component outputted from said high frequency component and removing means, thereby in particular, an effective measurement can be carried out even when the high frequency non-required component is contained in the measured signal.

In addition, in accordance with a recording medium capable of being read by a computer of a further embodiment of the present invention of the present invention, when a signal processing is carried out by a Fabry-Perot optical fiber interference sensor having a sensor part having opposed surfaces formed as parallel planes to each other in a measured clearance, having a partial reflection mirror or an end surface of one optical fiber formed with a partial reflection mirror arranged in one surface side of said opposed surfaces, and having an end surface of the other optical fiber formed with a partial reflection mirror arranged in the other surface side of said opposed surfaces, in which a light of low coherence light source having a wide range of wavelength spectrum distribution is guided to said the other optical fiber, either a reflected light or a transmission light modulated in wavelength in correspondence with a clearance size of said measured clearance through multiple reflection at said measured clearance is guided by the optical fiber, optical intensities in time-series corresponding to a clearance variation are attained by an optical intensity distribution sensor, either a minimum optical intensity position or a maximum optical intensity position is attained to measure said measured clearance, a program to cause a computer to act as an optical correlation signal extracting means for extracting a desired optical correlation signal from an output signal in time-series of said optical intensity distribution sensor; and an extreme value position calculating means for attaining either a minimum position or a maximum position in said optical correlation signal from the optical correlation signal outputted from said optical correlation signal extracting means;

is recorded and executed, in particular as to the signal processing of the optical fiber interference sensor by the computer, it becomes possible to attain a high precision result of measurement even with the simple configuration including the signal processing system In addition, in accordance with the recording medium capable of being read by a computer of the present invention, there is recorded and executing a program to cause the computer to act as;

an optical correlation signal extracting means for extracting a desired optical correlation signal from an output signal in time-series of an optical intensity distribution sensor;

a high frequency component removing and processing means for removing a high frequency non-required component in the optical correlation signal outputted from said optical correlation signal extracting means; and an extreme value position calculating means for attaining either a minimum position or a maximum position in said optical correlation signal from the optical correlation signal outputted from said high frequency component removing and processing means and having a high frequency non-required component removed;

when a signal processing is carried out at a Fabry-Perot optical fiber interference sensor having a sensor part having opposed surfaces formed as parallel planes to each other in a measured clearance, having a partial reflection mirror or an end surface of one optical fiber formed with a partial reflection mirror arranged in one surface side of said opposed surfaces, and having an end surface of the other optical fiber formed with a partial reflection mirror arranged in the other surface side of said opposed surfaces, in which a light of low coherence light source having a wide range of wavelength spectrum distribution is guided to said the other optical fiber, either a reflected light or a transmission light modulated in wavelength in correspondence with a clearance size of said measured clearance through multiple reflection at said measured clearance is guided by the optical fiber, optical intensities in time-series corresponding to a clearance variation are attained by said optical intensity distribution sensor, either a minimum optical intensity position or a maximum optical intensity position is attained to measure said measured clearance, thereby in particular, as for the signal processing at the optical fiber interference sensor performed by the computer, an effective measurement can be carried out even in the case that a high frequency non-required component is contained in the measured signal.

In addition, in accordance with the optical fiber interference sensor of the present invention, there is provided a Fabry-Perot optical fiber interference sensor having a sensor part having opposed surfaces formed as parallel planes to each other in a measured clearance varied in response to physical quantities such as force, strain, pressure and temperature and the like, having a partial reflection mirror or an end surface of one optical fiber formed with a partial reflection mirror arranged in one surface side of said opposed surfaces, and having an end surface of the other optical fiber formed with a partial reflection mirror arranged in the other surface side of said opposed surfaces, in which a light of low coherence light source is guided to said the other optical fiber, any one of a reflected light and a transmission light modulated in wavelength in correspondence with said clearance size through multiple reflection at said measured clearance is guided by the optical fiber, the light is condensed linearly in a uniform optical intensity distribution, radiated onto a linear image sensor through a Fizeau interferometer, a maximum optical intensity position at said linear image sensor is detected from an output of said linear image sensor to attain said measured clearance, wherein a desired optical correlation signal is extracted from the output signal in time-series of said linear image sensor by an optical correlation signal extracting means; a high frequency non-required component and a low frequency non-required component are removed by a non-required component removing and processing means; an envelope component is attained by an envelope calculating means in response to the signal and signal shifted by 90°.with a phase shift processing means; and at the same time, the envelope component is differentiated by a peak position calculation means, a zero-cross point where said differentiated value crosses with the level zero is attained, a peak position indicating the gap clearance size corresponding to said physical quantities is calculated, thereby influence caused by fluctuation of the low frequency and non-required signal components such as noise can be removed or restricted effectively by a simple configuration and a high precision result of measurement can be attained also by an easy adjustment of the optical system.

In addition, in accordance with the optical fiber interference sensor of the present invention, said non-required component removing and processing means includes;

a low-pass filter processing means for removing a high frequency noise component from an output of said optical correlation signal extracting means through the low-pass filter processing; and a high-pass filter processing means for removing a low frequency non-required component from an output of said low-pass filter processing means through a high-pass filter processing, thereby in particular, both high frequency non-required and low frequency components can be removed or restricted effectively.

In addition in accordance with the optical fiber interference sensor of the present invention, said non-required component removing and processing means is comprised of;

a low-pass filter processing means for removing a high frequency noise component from an output of said optical correlation signal extracting means by a low-pass filter processing; and a least square processing means for removing a low frequency non-required component from said low pass filter processing means by a least square fitting method, thereby in particular, high frequency non-required and low frequency components can be removed or restricted effectively.

In accordance with the optical fiber interference sensor of the present invention, said phase shift processing means includes a phase shift processing means for shifting a phase of an output of said non-required component removing and processing means by 90° by performing a Hilbert transform against an output of said non-required component removing and processing means.

In accordance with the optical fiber interference sensor of the present invention, said envelope calculating means includes;

means for calculating a square root of square sum to attain an envelope component of an output of said non-required component removing and processing means by calculating a square root of square sum of an output of said non-required component removing and processing means and an non-required component removing and processing means and an output of a phase shift processing means with its phase being shifted by 90°, thereby an envelope component of the output of said non-required component removing and processing means; and a high frequency removing means for removing a high frequency non-required component of output of said means for calculating a square root of square sum by a low-pass filter processing, thereby in particular, the non-required component can be removed or restricted effectively and a high precision measurement can be realized.

In accordance with the optical fiber interference sensor, said peak position calculating means includes;

a smoothing and differentiating processing means for smoothing and differentiating processing an output of said envelope calculating means in response to a multinomial adaptation smoothing method; and a zero-cross point calculating means for attaining a zero cross-point where an output of said smoothing and differentiating processing means crosses with a level zero, thereby in particular, the non-required components can be removed or restricted effectively and a high precision measurement can be measured.

In accordance with the signal processing system of an optical fiber interference sensor of the present invention, there is provided a signal processing system of a Fabry-Perot optical fiber interference sensor having a sensor part having opposed surfaces formed as parallel planes to each other in a measured clearance, having a partial reflection mirror or an end surface of one optical fiber formed with a partial reflection mirror arranged in one surface side of said opposed surfaces, and having an end surface of the other optical fiber formed with a partial reflection mirror arranged in the other surface side of said opposed surfaces, in which a light of low coherence light source is guided to said the other optical fiber, one of a reflected light and a transmission light modulated in wavelength in correspondence with a clearance size of said measured clearance through multiple reflection at said measured clearance is guided by the optical fiber, light is condensed in a linear manner under a uniform optical intensity distribution, radiated onto a linear image sensor through a Fizeau interferometer to measure said measured clearance, a desired optical correlation signal is extracted from the output signal in time-series of said linear image sensor by an optical correlation signal extracting means; a high frequency non-required component and a low frequency non-required component of an output of said optical correlation signal extracting means are removed by the non-required component removing and processing means; a phase of output of said non-required component removing and processing means is shifted by 90° by the phase shift processing means, the envelope component of output of said non-required component removing and processing means is attained by the envelope calculating means in response to an output of said non-required component removing and processing means and an output of the phase shift processing means with its phase being shift by 90 Åã, an output of said envelope calculating means is differentiated by a peak position calculating means to attain a zero-cross point where the differentiated value may cross with the level zero, thereby in particular, a high precision result of measurement can be attained even with a simple configuration.

There is provided a signal processing system for the aforesaid optical fiber interference sensor, wherein;

said non-required component removing and processing means is comprised of:

a low-pass filter processing means for removing a high frequency noise component from an output of said optical correlation signal extracting means through a low-pass filter processing; and a high-pass filter processing means for removing a low frequency non-required component from an output of said low-pass filter processing means through a high-pass filter processing, thereby in particular, both a non-required high frequency component and a low frequency non-required component can be effectively removed and restricted.

In addition, in the signal processing system for said optical fiber interference sensor;

said non-required component removing and processing means is comprised of;

a low-pass filter processing means for removing a high frequency noise component from an output of said optical correlation signal extracting means through the low-pass filter processing; and a least square processing means for removing a low frequency non-required component from a output of said optical correlation signal extracting means by a least square fitting method, thereby in particular, both a high frequency non-required component and a low frequency non-required component can be effectively removed or restricted.

In addition, in accordance with the signal processing system for said optical fiber interference sensor, said phase shift processing means is comprised of a phase shift processing means for shifting its phase by 90 Åãby performing a Hilbert transform against an output of said non-required component removing and processing means, thereby in particular, the non-required component can be removed or restricted more effectively.

Further, in accordance with the signal processing system for said optical fiber interference sensor, said envelope calculating means is comprised of;

means for calculating a square root of square sum to attain an envelope component of an output of said non-calculating a square root of square sum of an output of said non-required component removing and processing means and an output of a phase shift and processing means with its phase being shifted by 90°; and a high frequency removing means for removing a high frequency non-required component of an output of said means for calculating a square root of square sum by the low pass filter processing, thereby in particular the non-required component can be effectively removed or restricted and a high precision measurement can be realized.

Further, in accordance with the signal processing system for said optical fiber interference sensor, said peak position calculating means is comprised of;
  a smoothing differentiating processing means for smoothing and differentiating an output of said envelope calculating means in response to a multinomial adaptation smoothing method; and
  a zero cross point calculating means for attaining a zero cross point where an output of said smoothing differentiating processing means crosses with a level zero, thereby in particular, the non-required component can be removed or restricted more effectively and a high precision measurement can be realized.

In accordance with a recording medium capable of being read by a computer of the present invention, there is provided a signal processing system of a Fabry-Perot there is provided a signal processing system of a Fabry-Perot optical fiber interference sensor having a sensor part having opposed surfaces formed as parallel planes to each other in a measured clearance, having a partial reflection mirror or an end surface of one optical fiber formed with a partial reflection mirror arranged in one surface side of said opposed surfaces, and having an end surface of the other optical fiber formed with a partial reflection mirror arranged in the other surface side of said opposed surfaces, in which a light of low coherence light source is guided to said the other optical fiber, one of a reflected light and a transmission light modulated in wavelength in correspondence with a clearance size of the measured clearance through multiple reflection at said measured clearance is guided by the optical fiber, light is condensed in a linear manner under a uniform optical intensity distribution, radiated onto a linear image sensor through a Fizeau interferometer to calculate an optical intensity maximum position at said linear image sensor in reference to an output of said linear image sensor and to measure said measured clearance, there is recorded a program to cause a computer to act as;

an optical correlation signal extracting means for extracting a desired optical correlation signal from an output signal in time-series of said linear image sensor;
  a non-required component removing and processing means for removing a high frequency non-required component and a low frequency non-required component of an output of said optical correlation signal extracting means;
  a phase shift processing means for shifting by 90° a phase of an output of said non-required component removing and processing means;
  an envelope calculating means for attaining an envelope component of the output of said non-required component removing and processing means in response to an output of said non-required component removing and processing means and an output of a phase shift processing means with its phase being shifted by 90°; and
  a peak position calculating means for differentiating an output of said envelope calculating means to attain a zero-cross point where said differentiated value may cross with a level zero; thereby in particular, as for the signal processing by the optical fiber interference sensor, a high precision result of measurement can be attained even under application of a simple configuration of the measurement system.

Although the present invention has been described with reference to the preferred embodiments, it is apparent that the present invention is not limited to the aforesaid preferred embodiments, but various modifications can be attained without departing from its scope.

What is claimed is:

1. A Fabry-Perot optical fiber interference sensor having a sensor part having opposed surfaces formed as parallel planes to each other in a measured clearance varied in response to physical quantities such as force, strain, pressure and temperature and the like, having a partial reflection mirror or an end surface of one optical fiber formed with a partial reflection mirror arranged in one surface side of said opposed surfaces, and having an end surface of the other optical fiber formed with a partial reflection mirror arranged in the other surface side of said opposed surfaces, in which a light of low coherence light source is guided to said the other optical fiber, either a reflected light or a transmission light modulated in wavelength in correspondence with a clearance size of said measured clearance through multiple reflection at said measured clearance is guided by the optical fiber, optical intensities in time-series corresponding to a clearance variation are attained by an optical intensity distribution sensor, either a minimum optical intensity position or a maximum optical intensity position is detected to attain said measured clearance and a value of said physical quantity is measured, wherein the same is comprised of;
  a wide range light source having a wide wavelength spectrum distribution acting as said low coherence light source;
  an optical correlation signal extracting means for extracting a desired optical correlation signal from the output signal in time-series of said optical intensity distribution sensor; and
  an extreme value position calculating means for attaining either a minimum position or a maximum position at said optical correlation signal in reference to the optical correlation signal outputted from said optical correlation signal extracting means.

2. A Fabry-Perot optical fiber interference sensor having a sensor part having opposed surfaces formed as parallel planes to each other in a measured clearance varied in response to physical quantities such as force, strain, pressure and temperature and the like, having a partial reflection mirror or an end surface of one optical fiber formed with a partial reflection mirror arranged in one surface side of said opposed surfaces, and having an end surface of the other optical fiber formed with a partial reflection mirror arranged in the other surface side of said opposed surfaces, in which a light of low coherence light source is guided to said the other optical fiber, either a reflected light or a transmission light modulated in wavelength correspondence with a clearance size of said measured clearance through multiple reflection at said measured clearance is guided by the optical fiber, optical intensities in time-series corresponding to a clearance variation are attained by an optical intensity distribution sensor, either a minimum optical intensity position or a maximum optical intensity position is detected to attain said measured clearance and a value of said physical quantity is measured, wherein the same is comprised of;
  a wide range light source having a wide wavelength spectrum distribution acting as said low coherence light source;
  an optical correlation signal extracting means for extracting a desired optical correlation signal from the output signal in time-series of said optical intensity distribution sensor;

a high frequency component removing and processing means for removing a high frequency non-required component in the optical correlation signal outputted from said optical correlation signal extracting means; and an extreme value position calculating means for attaining either a minimum position or a maximum position at said optical correlation signal in reference to the optical correlation signal having the high frequency non-required component removed which is outputted from said high frequency component removing and processing means.

3. An optical fiber interference sensor according to claim 1, wherein said wide range light source is one of a halogen lamp and a white light emitting diode.

4. An optical fiber interference sensor according to claim 1, wherein said optical correlation signal extracting mean includes a background signal removing means for removing a background signal varied in response to said measured clearance from an output of said optical intensity distribution sensor.

5. An optical fiber interference sensor according to claim 4, wherein said background signal removing means includes means for estimating a background signal by a least square multinomial fitting and removing the background signal varied in reference to said measured clearance from an output of said optical intensity distribution sensor.

6. An optical fiber interference sensor according to claim 4, wherein said background signal removing means includes means for removing a background signal varied in reference to said measured clearance from an output of said optical intensity distribution sensor while an actual measured practical data under a state not including an optical correlation signal in a desired measuring range is being applied as a background signal.

7. An optical fiber interference sensor according to claim 1, wherein said extreme value position calculating means includes;

a smoothing differential processing means for smoothing differential processing said optical correlation signal in response to a polynomial adaptation smoothing method; and a zero-cross point calculating means for calculating a zero-cross point where an output of said smoothing differential processing means crosses with a level zero.

8. An optical fiber interference sensor according to claim 2, wherein said high frequency component removing and processing means includes a low-pass filter.

9. A signal processing system of a Fabry-Perot optical fiber interference sensor having a sensor part having opposed surfaces formed as parallel planes to each other in a measured clearance, having a partial reflection mirror or an end surface of one optical fiber formed with a partial reflection mirror arranged in one surface side of said opposed surfaces, and having an end surface of the other optical fiber formed with a partial reflection mirror arranged in the other surface side of said opposed surfaces, in which a light of low coherence light source is guided to said the other optical fiber, either a reflected light or a transmission light modulated in wavelength in correspondence with a clearance size of said measured clearance through multiple reflection at said measured clearance is guided by the optical fiber, optical intensities in time-series corresponding to a clearance variation are attained by an optical intensity distribution sensor, either a minimum optical intensity position or a maximum optical intensity position is attained to measure said measured clearance, wherein the same is comprised of;

a wide range light source having a wide wavelength spectrum distribution acting as said low coherence light source;

an optical correlation signal extracting means for extracting a desired optical correlation signal from the output signal in time-series of said optical intensity distribution sensor; and an extreme value position calculating means for attaining either a minimum position or a maximum position at said optical correlation signal in reference to the optical correlation signal outputted from said optical correlation signal extracting means.

10. A signal processing system of a Fabry-Perot optical fiber interference sensor having a sensor part having opposed surfaces formed as parallel planes to each other in a measured clearance, having a partial reflection mirror or an end surface of one optical fiber formed with a partial reflection mirror arranged in one surface side of said opposed surfaces, and having an end surface of the other optical fiber formed with a partial reflection mirror arranged in the other surface side of said opposed surfaces, in which a light of low coherence light source is guided to said the other optical fiber, either a reflected light or a transmssion light modulated in wavelength in correspondence with a clearance size of said measured clearance through multiple reflection at said measured clearance is guided by the optical fiber, optical intensities in time-series corresponding to a clearance variation are attained by an optical intensity distribution sensor, either a minimum optical intensity position or a maximum optical intensity position is attained to measure said measured clearance, wherein the same is comprised of;

a wide range light source having a wide wavelength spectrum distribution acting as said low coherence light source;

an optical correlation signal extracting means for extracting a desired optical correlation signal from the output signal in time-series of said optical intensity distribution sensor;

a high frequency component removing and processing means for removing a high frequency non-required component in the optical correlation signal outputted from said optical correlation signal extracting means; and an extreme value position calculating means for attaining either a minimum position or a maximum position at said optical correlation signal in reference to the optical correlation signal outputted from said optical correlation signal extracting means and having high frequency non-required component removed.

11. A Fabry-Perot optical fiber interference sensor having a sensor part having opposed surfaces formed as parallel planes to each other in a measured clearance varied in response to physical quantities such as force, strain, pressure and temperature and the like, having a partial reflection mirror or an end surface of one optical fiber formed with a partial reflection mirror arranged in one surface side of said opposed surfaces, and having an end surface of the other optical fiber formed with a partial reflection mirror arranged in the other surface side of said opposed surfaces, in which a light of low coherence light source is guided to said the other optical fiber, any one of a reflected light and a transmission light modulated in wavelength in correspondence with a clearance size of said measured clearance through multiple reflection at said measured clearance is guided by the optical fiber, the light is condensed linearly in a uniform optical intensity distribution, radiated onto a linear image sensor through a Fizeau interferometer, a maximum optical intensity position at said linear image sensor is detected from an output of said linear image sensor to attain said measured clearance and a value of said physical quantity is measured, wherein the same is comprised of;

an optical correlation signal extracting means for extracting a desired optical correlation signal from the output signal in time-series of said linear image sensor;

a non-required component removing and processing means for removing a high frequency non-required component and a low frequency non-required component of the output of said optical correlation signal extracting means;

a phase shift processing means for shifting by 90° a phase of the output of said non-required component removing and processing means;

an envelope calculating means for attaining an envelope component of the output of said non-required component removing and processing means in reference to an output of said non-required component removing and processing means and an output of said phase shift processing means with its phase being shifted by 90°; and a peak position calculating means for differentiating an output of said envelope calculating means and attaining a zero-cross point where said differentiated value may cross with a level zero.

12. An optical fiber interference sensor according to claim 11, wherein, said non-required component removing and processing means includes;

a low-pass filter processing means for removing a high frequency noise component from an output of said optical correlation signal extracting means through the low-pass filter processing; and a high-pass filter processing means for removing a low frequency non-required component from an output of said low-pass filter processing meansoptical correlation signal extracting means through a high-pass filter processing.

13. An optical fiber interference sensor according to claim 11, wherein, said non-required component removing and processing means is comprised of;

a low-pass filter processing means for removing a high frequency noise component from an output of said optical correlation signal extracting means by a low-pass filter processing; and a least square processing means for removing a low frequency non-required component from an output of said low pass filter processing means by a least square fitting method.

14. An optical fiber interference sensor according to claim 11, wherein said phase shift processing means includes a phase shift processing means for shifting a phase of an output of said non-required component removing and processing means by 90° by performing a Hilbert transform.

15. An optical fiber interference sensor according to claim 11, wherein said envelope calculating means includes;

means for calculating a square root of square sum to attain an envelope component of an output of said non-required component removing and processing means by calculating a square root of square sum of an output of said non-required component removing and processing means and an output of said phase shift processing means with its phase being shifted by 90°; and a high frequency removing means for removing a high frequency non-required component of output of said means for calculating a square root of square sum by a low-pass filter processing.

16. An optical fiber interference sensor according to claim 11, wherein said peak position calculating means includes;

a smoothing and differentiating processing means for smoothing and differentiating processing an output of said envelope calculating means in reference to a multinomial adaptation smoothing method; and a zero-cross point calculating means for attaining a zero cross-point where an output of said smoothing and differentiating processing means crosses with a level zero.

17. A signal processing system of a Fabry-Perot optical fiber interference sensor having a sensor part having opposed surfaces formed as parallel planes to each other in a measured clearance, having a partial reflection mirror or an end surface of one optical fiber formed with a partial reflection mirror arranged in one surface side of said opposed surfaces, and having an end surface of the other optical fiber formed with a partial reflection mirror arranged in the other surface side of said opposed surfaces, in which a light of low coherence light source is guided to said the other optical fiber, any one of a reflected light and a transmission light modulated in wavelength in correspondence with a clearance size of said measured clearance through multiple reflection at said measured clearance is guided by the optical fiber, the light is condensed in a linear manner under a uniform optical intensity distribution, radiated onto a linear image sensor through a Fizeau interferometer, the maximum optical intensity position at said linear image sensor is attained in reference to an output of said linear image sensor to measure said measured clearance, wherein the same is comprised of;

an optical correlation signal extracting means for extracting a desired optical correlation signal from the output signal in time-series of said linear image sensor;

a non-required component removing and processing means for removing a high frequency non-required component and a low frequency non-required component of an output of said optical correlation signal extracting means;

a phase shift processing means for shifting by 90° a phase of an output of said non-required component removing and processing means;

an envelope calculating means for attaining an envelope component of output of said non-required component removing and processing means in reference to an output of said non-required component removing and processing means and an output of said phase shift processing means with its phase being shifted by 90°; and a peak position calculating means for differentiating an output of said envelope calculating means to attain a zero-cross point where said differentiated value crosses with a level zero.

* * * * *